United States Patent [19]

Takahara et al.

[11] Patent Number: 5,737,050
[45] Date of Patent: Apr. 7, 1998

[54] LIGHT VALVE HAVING REDUCED REFLECTED LIGHT, HIGH BRIGHTNESS AND HIGH CONTRAST

[75] Inventors: Hiroshi Takahara, Neyagawa; Hideki Ohmae, Suita, both of Japan

[73] Assignee: Matsushita Electric Industrial Co., Ltd., Osaka, Japan

[21] Appl. No.: 586,421

[22] Filed: Jan. 16, 1996

Related U.S. Application Data

[63] Continuation of Ser. No. 101,717, Aug. 4, 1993, abandoned.

[30] Foreign Application Priority Data

Aug. 25, 1992 [JP] Japan .................. 4-224483
Aug. 25, 1992 [JP] Japan .................. 4-224484

[51] Int. Cl.$^6$ .................................. G02F 1/1333
[52] U.S. Cl. ............................. 349/122; 349/10
[58] Field of Search ................. 359/72, 82, 83, 359/40, 41, 51, 68, 74, 580, 588, 79; 349/5, 10, 58, 60, 122, 158

[56] References Cited

U.S. PATENT DOCUMENTS

| | | | |
|---|---|---|---|
| 3,185,020 | 5/1965 | Thelen . | |
| 3,356,522 | 12/1967 | Libbert | 359/588 |
| 3,432,225 | 3/1969 | Rock . | |
| 3,736,047 | 5/1973 | Gelber et al. | 359/74 |
| 4,248,502 | 2/1981 | Bechteler et al. | 359/82 |
| 4,505,547 | 3/1985 | Sekimura | 359/82 |
| 4,521,079 | 6/1985 | Leenhouts et al. | 359/74 |
| 4,529,272 | 7/1985 | Krüges et al. | 359/74 |
| 4,580,876 | 4/1986 | Stolov et al. | 359/82 |
| 4,613,207 | 9/1986 | Ferguson | 350/331 |
| 5,108,172 | 4/1992 | Flasck | 359/68 |
| 5,148,298 | 9/1992 | Shigeta et al. | 359/72 |
| 5,170,271 | 12/1992 | Lackner et al. | 359/72 |
| 5,260,815 | 11/1993 | Takizawa | 359/42 |
| 5,353,133 | 10/1994 | Bernkopf | 359/51 |
| 5,359,441 | 10/1994 | Mori et al. | 359/51 |

FOREIGN PATENT DOCUMENTS 5346697  4/1978  Japan .................. 359/74

OTHER PUBLICATIONS

"Proceedings of the 9th International Display Research Conference", Oct. 16–18, 1989, pp. 584–587 and pp. 256–259.
"Optics", Hecht et al, Addison–Wesley, pp. 313–314, 1974.
"Liquid Crystal TV Displays", KTK Scientific Publishers, Kaneko, 1987, pp. 26, 282, 291.

Primary Examiner—William L. Sikes
Assistant Examiner—James A. Dudeck
Attorney, Agent, or Firm—Wenderoth, Lind & Ponack

[57] ABSTRACT

In a light valve, a liquid crystal layer made of liquid crystal/resin composite is interposed between a transparent substrate with a counterelectrode and a reflection substrate with reflection electrodes. The size of the transparent substrate is designed so that the light modulated by the liquid crystal layer is prevented from again entering into the liquid crystal layer after reflected at an interface of the transparent substrate with air. The transparent substrate may be combined with a transparent plate or flat concave lens with a transparent coupling material. Each pixel has a reflection electrode and liquid crystal molecules above the reflection electrode are aligned according to the signals supplied to thin film transistors. The counterelectrode is formed as a multi-layer film of dielectric films and a transparent electrically conductive film. The dielectric films are made of a material having a refractive index of 1.6–1.8, and the optical thickness of the dielectric films is $\lambda/4$ while that of the transparent electrically conductive film is $\lambda/2$. Thus, the reflection of light is prevented by the interference in the multi-layer film. By using the light valve apparatus, the incident light entering from the side of the counterelectrode is scattered or it is transmitted through the liquid crystal layer, reflected by the reflection electrodes and leaves through the counterelectrode. By using the light valve apparatus in a projection display system, an image of high brightness and high contrast can be realized.

41 Claims, 34 Drawing Sheets

LIGHT VALVE HAVING REDUCED REFLECTED LIGHT, HIGH BRIGHTNESS AND HIGH CONTRAST

This application is a Continuation of now abandoned application Ser. No. 08/101,717, filed Aug. 4, 1993.

BACKGROUND OF THE INVENTION

1. Field of the Invention

The present invention relates to a light valve apparatus for modulating an incident light to form an optical image and a projection display system which uses the light valve apparatus and amplifies an image displayed in the light valve apparatus.

2. Description of the Prior Art

A display device employing a liquid crystal display panel has been researched and developed widely because of its compact size and its light weight. Recently, pocket television sets employing a twisted nematic (TN) mode liquid crystal display panel have been used practically. Furthermore, projection television systems, viewfinders, and the like using a liquid crystal display panel as a light valve have also been used practically. It is difficult to produce a liquid crystal panel of a size of a large image. However, a projection system enlarges a display image of a liquid crystal panel and can project a large image on a screen.

A TN mode liquid crystal display panel has disadvantages such as low display brightness because two polarization plates are needed for light modulation. The transmittance of a polarization plate in the incident side is about 40%, while that of the other polarization plate is about 80%. Therefore, the total transmittance of the two polarization plates is about 40×80=30%. That is, a TN mode liquid crystal display panel cannot exploit light effectively.

Further, another factor which decreases the light in a TN mode display panel is the aperture ratio of a pixel. A pixel comprises a pixel electrode made of indium tin oxide (ITO), a switching element such as a thin film transistor for applying signals to the pixel electrode and signal lines for transmitting signals to the switching element. The aperture ratio is defined as a ratio of the area of a pixel electrode to the area of a pixel. The aperture ratio decreases with decrease in the pixel size due to the area occupied by the thin film transistors and the signal lines. For example, the aperture ratio is about 30% for a liquid crystal panel having a diagonal length of three inches of effective display area including 0.35 million pixels. The effective display area denotes an area or a region wherein the pixels are arranged. However, a light valve for a high definition television (HDTV) system has a much larger number of pixels than one million pixels and the aperture ratio is predicted to decrease to, for example, 10%.

As explained above, because a TN light valve needs polarization plates, the light can not be exploited sufficiently. Therefore, if the aperture ratio becomes as low as 10%, the brightness of an image on a screen becomes very low and the light valve cannot be used practically.

A twisted nematic light valve of the reflection type has been suggested (refer, for example, to Proceedings of the 9th International Display Research Conference, Oct. 16–18, 1989, pp. 584–587 and pp. 256–259). Because this light valve is of a reflection type, the aperture ratio does not depend on the number of apertures. However, P polarization light is needed for optical modulation, and this decreases the ratio of light to be used for display. It is also a problem in that rubbing is needed for a twisted nematic liquid crystal.

There are available light valves which form an optical image by using a change in their scattering state, without polarization plates. For example thermal addressing mode, dynamic scattering mode, liquid crystal/resin composite and ferroelectric liquid crystals are known.

Recently, display panels using liquid crystal/resin composites have attracted attention as a light valve for a projection television system because the operation rate thereof is relatively fast. U.S. Pat. No. 4,613,207 discloses a projection television system with a display panel using liquid crystal/resin composite. It also discloses a projection television system with a reflection type display panel in FIG. 17 of the patent. However, it does not disclose a display panel which can display an image of high quality, for example, of a contrast of 100 or more.

SUMMARY OF THE INVENTION

An object of a light valve apparatus of the present invention is to provide a light valve with an optical modulation layer wherein light is scattered for displaying a very fine image of high contrast.

Another object of a light valve apparatus of the present invention is to provide a light valve with a liquid crystal layer wherein unnecessary reflection of light at the interface can be reduced.

An object of a projection display system of the present invention is to provide a projection television which can project a very fine image of high contrast.

In a light valve apparatus according to the present invention, an optical modulation layer comprising, for example, a liquid crystal/resin composite is interposed between a first substrate and a second substrate. The first electrode has a shape such that light scattered in the optical modulation layer does not enter again through the first substrate into the optical modulation layer. For example, a following relationship holds:

$$t \geq \frac{d}{4} \sqrt{n^2 - 1}$$

where "t" denotes the thickness of the first substrate at the center, "n" denotes the refractive index of the first substrate and "d" denotes the maximum size of the effective display area of the optical modulation layer. In a modified example, the first substrate has a concave plane. In this case, even if the above-mentioned relationship does not hold, the image quality is not deteriorated so badly. Furthermore, a convex lens may be fitted to the concave plane. Furthermore, a light-absorbing member may be applied to an ineffective area of the first substrate.

If the thickness of the first substrate does not satisfy the relationship, a transparent plate is connected optically to a first substrate, and the transparent plate is selected to satisfy the above-mentioned relationship where "t" denotes the total thickness of the first substrate and the transparent plate. Thus, light scattered randomly in the array substrate can be prevented. Preferably, another transparent plate may be connected optically to the second substrate in order to prevent the light from being reflected randomly in the second substrate.

A counterelectrode in the display panel has a multi-layer structure which comprises a transparent electrically conducting layer used as a counterelectrode and one or more dielectric layers. Thus, the counterelectrode acts as an anti-reflection layer as well as a counterelectrode. For example, the multi-layer structure comprises a dielectric film of an optical thickness of about λ/4 and a transparent electrically conducting film of an optical thickness of about λ/2 wherein λ denotes wavelength of incident light, and the refractive index of the dielectric film is selected to be between 1.5 and 1.7. The reflection can be decreased largely by using the optical interference effect due to the multi-layer structure over a wide wavelength range. In another example, the multi-layer structure comprises a first dielectric film of an optical thickness of about λ/4, a transparent electrically conducting film of an optical thickness of about λ/2 and a second dielectric film of optical thickness of about λ/4 and the refractive index of the dielectric film is selected to be between 1.6 and 1.8. Preferably, the refractive indices $n_1$ of the dielectric films and $n_2$ of the electrically conducting film satisfy a relationship $n_2 > n_1 > n_3$ wherein $n_3$ denotes the refractive index of the liquid crystal/resin composite when an electric field is not applied.

Preferably, a multi-layer anti-reflection film of two-layer (V-coat type) or of three-layer (multi-coat type) is applied to an interface of the light valve with air in order to reduce the reflection at the interface.

In a projection display system according to the present invention, a light valve apparatus explained above is used as a light valve. The projection display system comprises a light source such as a metal halide lamp, an optical system for leading the light from the light source to the light valve, and a lens system for projecting the light modulated by the light valve. In order to project a color image, three light valves for red, green and blue are used. For each light valve, the structure of a multi-layer anti-reflection counterelectrode as mentioned above is controlled according to the central wavelength, because the bandwidth for red, green or blue is as narrow as about 100–50 nm. Thus, the unnecessary reflection at the interface can be prevented relatively easy for a color image by using a multi-layer anti-reflection structure, and very good anti-reflection film can be provided for a projection display system for a color image.

An advantage of a display panel of the present invention is that the display contrast is improved because unnecessary reflection light is reduced.

A second advantage of a display panel of the present invention is that the display contrast is improved because the reflection at one or more interfaces of the display panel is reduced.

A third advantage of a display panel of the present invention is that thin film transistors can be prevented from being irradiated by light so that the photoconductor phenomenon can be prevented.

An advantage of a projection display system of the present invention is that the projected image has a high brightness and a high contrast.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
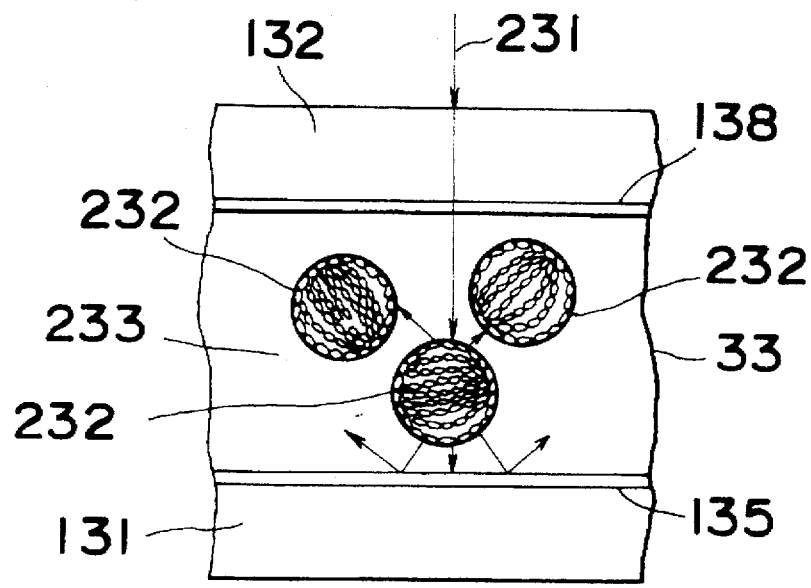
FIG. 1 is a schematic sectional view of a polymer dispersion liquid crystal in the scattering mode.

Referring now to the drawings, wherein like reference characters designate like or corresponding parts, embodiments of the present invention will be explained below.

A liquid crystal/resin composite is a composite of a liquid crystal component and a resin component, and the liquid crystal component extends in the matrix made of the resin (polymer) component. The structure of the liquid crystal/resin composite changes according to the ratio of the liquid crystal component to the resin component, and it is classified typically into two types according to the ratio of the liquid crystal component to the polymer (resin) component. In one type of composite having a small ratio of the liquid crystal component, droplets of liquid crystal are dispersed in the voids of the resin layer, and the liquid crystal exists discontinuously, as shown schematically in FIGS. 1 and 2. This type is called a polymer dispersed liquid crystal. If the amount of the liquid crystal component is increased, droplets contact each other to form a continuous phase. In the other type of composite having a large ratio of liquid crystal component, a network of the resin component is formed and the liquid crystal exists not as droplets, but extends in the network continuously. This structure is analogous to a sponge impregnated with liquid crystal. This type is called a polymer network liquid crystal.

Figure 2:
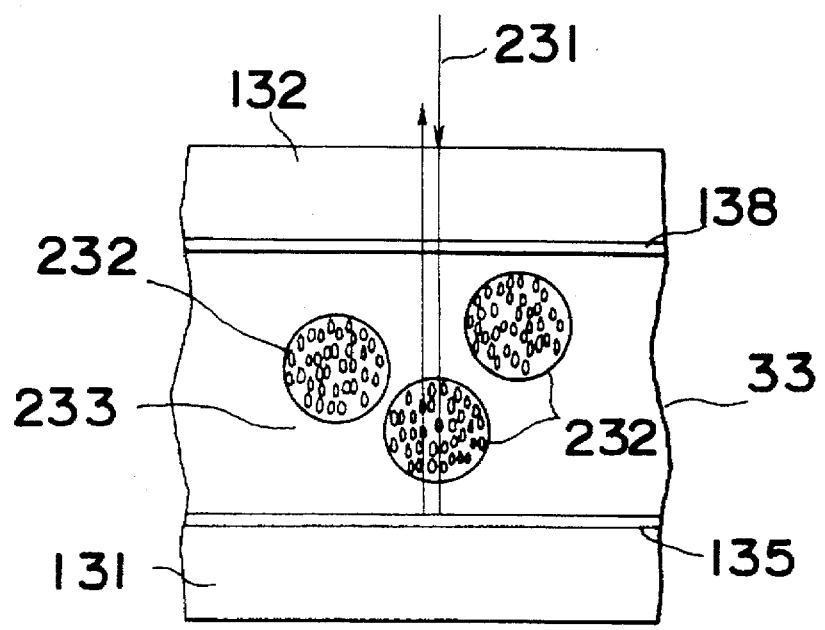
FIG. 2 is a schematic sectional view of a polymer dispersion liquid crystal in the transmission mode.

The above-mentioned two types of liquid crystal/polymer composites can be used to display an image by controlling the scattering and transmission of light. A display panel using the polymer dispersed liquid crystal uses a property that the refractive index of the liquid crystal varies with the orientation direction of the liquid crystal molecules. FIG. 1 shows schematically a polymer dispersion liquid crystal layer 33 interposed between two substrates 131 and 132 with reflection electrodes 135 being connected to thin film transistors (not shown) and the substrate 132 being connected to a counterelectrode 138. The polymer dispersion liquid crystal layer 33 comprises liquid crystal droplets 232 in the polymer matrix 233. Without applying a voltage to the liquid crystal layer 33, the liquid crystal molecules in the droplets 232 align in irregular directions, as shown in FIG. 1. In this state, a difference in refractive index exists between the liquid crystal droplets 232 and the polymer 233 to scatter the incident light at the interfaces of the droplets 232 with the polymer 233. On the contrary, by applying a voltage to the liquid crystal layer 33, the liquid crystal molecules are aligned in a direction, as shown in FIG. 2. Because the refractive index of the liquid crystal component oriented in the direction is controlled preliminarily to coincide with that of the resin component, the incident light is not scattered in the liquid crystal, but is transmitted straight through it and is reflected by the reflection electrodes 135. On the other hand, the polymer network liquid crystal uses the irregularity itself of the orientation of the liquid crystal molecules for scattering the light. In the irregular orientation state, or without applying a voltage to the liquid crystal, the incident light is scattered through the liquid crystal, while when the molecules align in a direction by applying a voltage to the liquid crystal, the light is transmitted through the liquid crystal. The above-mentioned liquid crystal/resin composite does not need a polarizer and an analyzer in order to modulate the light in contrast to a twisted nematic type liquid crystal. Therefore, it can display an image at a high brightness which is two or more times that of a display panel using a twisted nematic liquid crystal.

Figure 3:
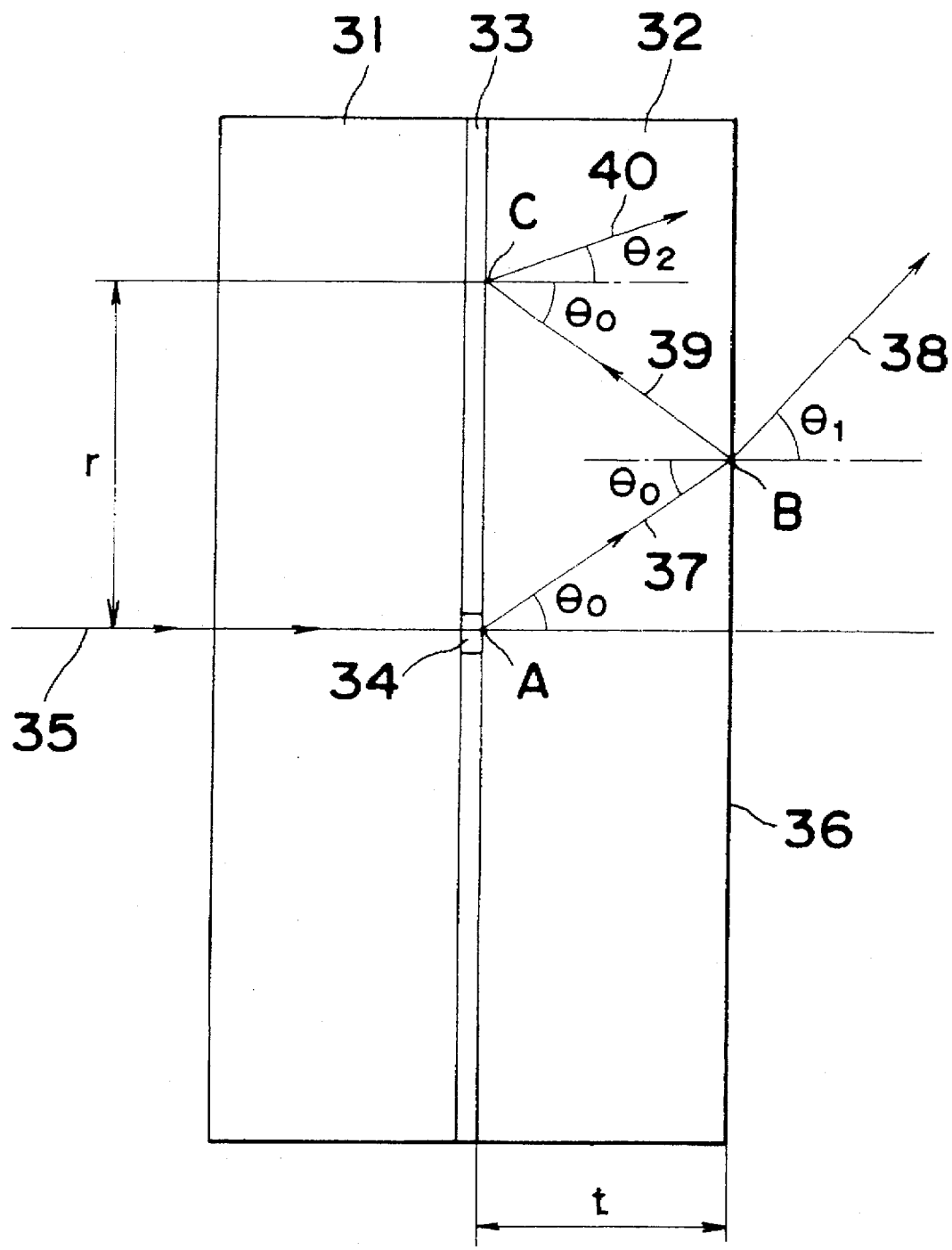
FIG. 3 is a schematic sectional view explanatory of operation of a model of a light valve apparatus.

FIG. 3 shows optical paths in a model of a light valve apparatus of the present invention which can prevent unnecessary secondary scattering which reduces the contrast. A liquid crystal layer 33 made of liquid crystal/resin composite is interposed between two transparent substrates 31 and 32. It is assumed that the thickness of the transparent substrate 31 in the incident side is sufficiently larger than the size of the display area. First, an electric field is not applied to the liquid crystal layer 33, and a narrow parallel beam 35 enters from the incoming side only into a very small region 34 with a center "A" in the display area. Then, the brightness $B_0$ of a forward scattering light in the $\theta_0$ direction is in the substrate 32 expressed as follows:

$$B_0(\theta_0) = \frac{1}{\pi} G_F(\theta_0) E_0 \quad (1)$$

wherein $E_0$ denotes the illuminance at the incident plane in the liquid crystal layer 33. $\theta_0$ denotes an angle of the outgoing light from the normal of the liquid crystal layer 33 and $G_F(\theta_0)$ is called a forward scattering gain in the $\theta_0$ direction. The light intensity $I_0(\theta_0)$ of the region 34 in the $\theta_0$ direction is expressed as follows:

$$I_0(\theta_0) = B_0(\theta_0) S \cos \theta_0 \quad (2)$$

wherein S denotes the area of the vary small region 34.

The outgoing light 37 from the point A in $\theta_0$ direction splits at a point B in an outgoing plane 36 of the transparent substrate 32 into a transmitted light 38 and a reflected light 39. If "n" denotes the refractive index of the transparent substrate 32 and $\theta_1$ denotes the outgoing angle of the transmitted light 38, Snell's law results in the following relationship:

$$\sin \theta_1 = n \cdot \sin \theta_0 \quad (3)$$

If the forward scattering light from the liquid crystal layer 33 is a natural light, the reflectance $R(\theta_0)$ at the outgoing plane 36 is expressed as follows:

$$R(\theta_0) = \begin{cases} \frac{1}{2} \left( \frac{\sin^2(\theta_0 - \theta_1)}{\sin^2(\theta_0 + \theta_1)} + \frac{\tan^2(\theta_0 - \theta_1)}{\tan^2(\theta_0 + \theta_1)} \right) & (0 \leq \theta_0 \leq \theta_{0T}) \\ 1 & (\theta_{0T} \leq \theta_0 \leq \pi/2) \end{cases} \quad (4)$$

wherein $\theta_{0T}$ denotes the critical angle of total reflection.

$$\theta_{0T} = \sin^{-1} \frac{1}{n} \quad (5)$$

The light reflected totally at the point B returns into the liquid crystal layer 33 at a point C. The incident angle of the reflected light 39 at the point C is $\theta_0$ and the length of the optical path from the point A to C is $2t/\cos \theta_0$. Then, the illuminance $E(\theta_0)$ of the reflected light 39 at the point C is expressed as follows:

$$E(\theta) = \frac{I \cos \theta_0 R(\theta_0)}{(2t/\cos \theta_0)^2} \quad (6)$$

wherein "t" denotes the thickness of the transparent substrate 32. After the reflected light 39 enters into the liquid crystal layer 33, the scattering light 40 propagates forward again from the liquid crystal layer 33 to the substrate 32 in the $\theta_2$ direction due to backward scattering. This corresponds to the generation of a secondary light source. The brightness $B(\theta_2)$ of the re-outgoing light (secondary scattering light) 40 from the point C in the $\theta_2$ direction is expressed as follows:

$$B(\theta_2) = G_R(\theta_2, \theta_0) \frac{E}{\pi} \qquad (7)$$

wherein $G_R(\theta_2, \theta_0)$ is called a backward scattering gain of the light entering in the $\theta_0$ direction and outgoing in the $\theta_2$ direction.

By summing up Eqs. (1), (2), (6) and (7), the following relationship holds.

$$B(\theta_2) = \frac{G_F(\theta_0) G_R(\theta_2, \theta_0) R(\theta_0) E_0 S \cos^4 \theta_0}{4\pi^2 r^2} \qquad (8)$$

The distance "r" between the points A and C is expressed below.

$$r = 2t \tan \theta_0 \qquad (9)$$

By using Eqs. (8) and (9), the brightness distribution of the re-outgoing light can be obtained.

Next, Eq. (8) is simplified and the meaning of Eq. (8) is explained. In order to improve the contrast of an image displayed in a liquid crystal panel with a liquid crystal/resin composite, it is necessary that the light is scattered completely when no electric field is applied. If it is assumed that the light is scattered completely forward and backward, $G_F(\theta_0) = \frac{1}{2}$ and $G_R(\theta_2, \theta_0) = \frac{1}{2}$. Then, Eq. (8) reduces to the following relationship:

$$B(\theta_2) = \frac{R(\theta_0) E_0 S \cos^4 \theta_0}{16 \pi^2 r^2} \qquad (10)$$

Figure 4:
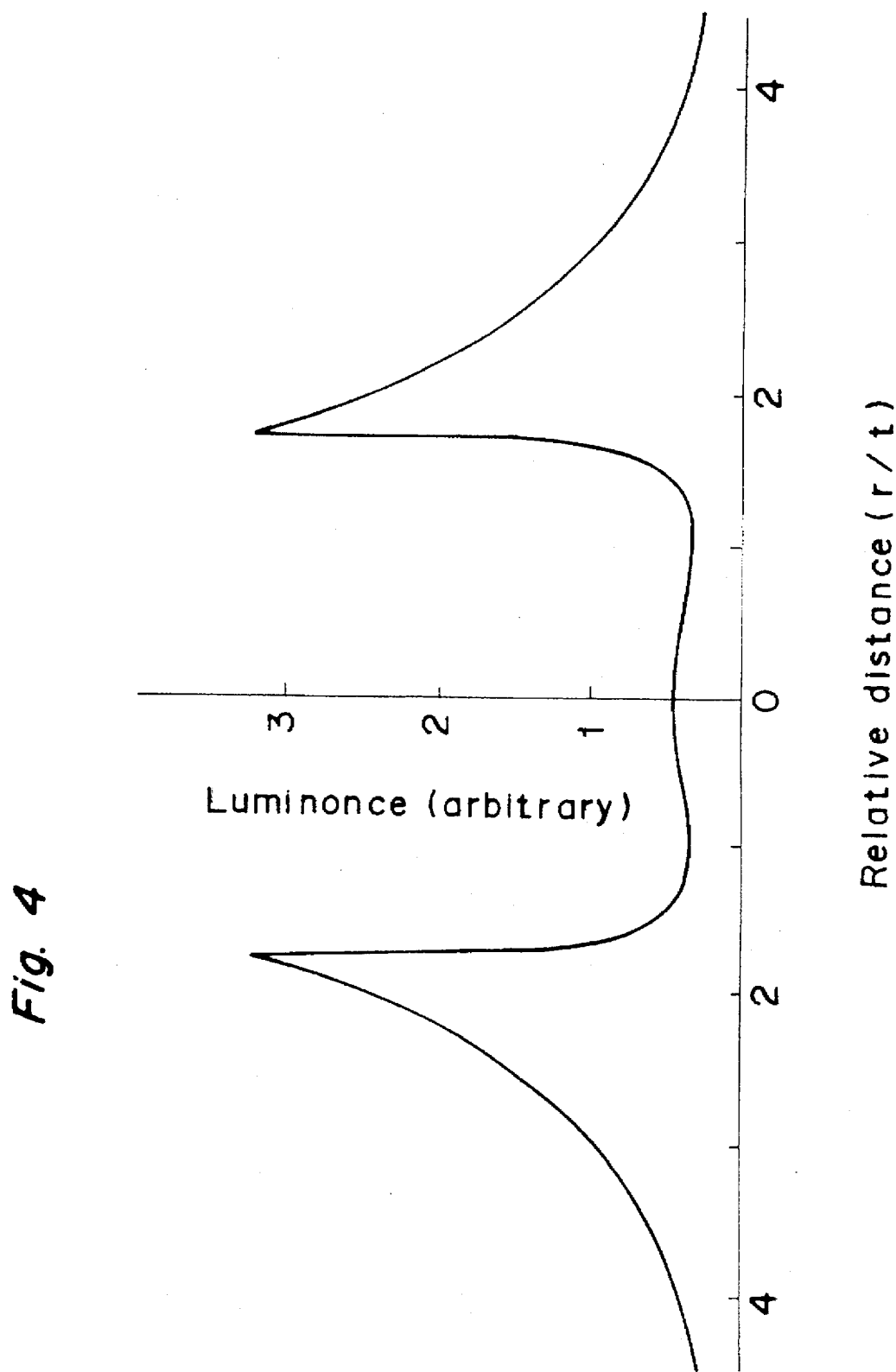
FIG. 4 is a graph showing a characteristic curve of a model of a light valve apparatus.

Therefore, $B(\theta_2)$ is a function of $\theta_0$. Then, the brightness distribution of the re-outgoing light from the liquid crystal layer 33 has rotational symmetry as to the narrow incident parallel beam 35. The relationship of $B(\theta_2)$ and r is obtained from Eqs. (9) and (10), and this is displayed in FIG. 4. FIG. 4 shows that the brightness distribution has a maximum. The value of $\theta_0$ in correspondence to the maximum is almost equal to $\theta_{0T}$. Therefore, the brightness distribution has a ring-like shape, and the radius $r_R$ of the ring is given below.

$$r_R = 2t \cdot \tan \theta_{0T} \qquad (11)$$

Eq. (11) can be converted to the following relationship by using Eq. (5):

$$r_R \geq \frac{2t}{\sqrt{n^2 - 1}} \qquad (12)$$

If light scattered from a pixel enters other pixels which have to be expressed as black, secondary light sources are generated there due to scattering reflections, and the brightness 5 of the other pixels becomes high. Therefore, it is found that the above-mentioned mechanism is one of the factors which affects the bad contrast of a light valve using liquid crystal/resin composite, besides the low gain under no electric field.

Next, a light valve apparatus of the present invention is explained. Eq. (10) shows that if the thickness "t" of the transparent substrate 32 in the outgoing side increases, the brightness $B(\theta_2)$ of the re-outgoing light decreases. Therefore, in this invention, the thickness of the transparent substrate 32 is increased in order to improve the contrast of the display image. This is one function of a light valve of the present invention.

Figure 5:
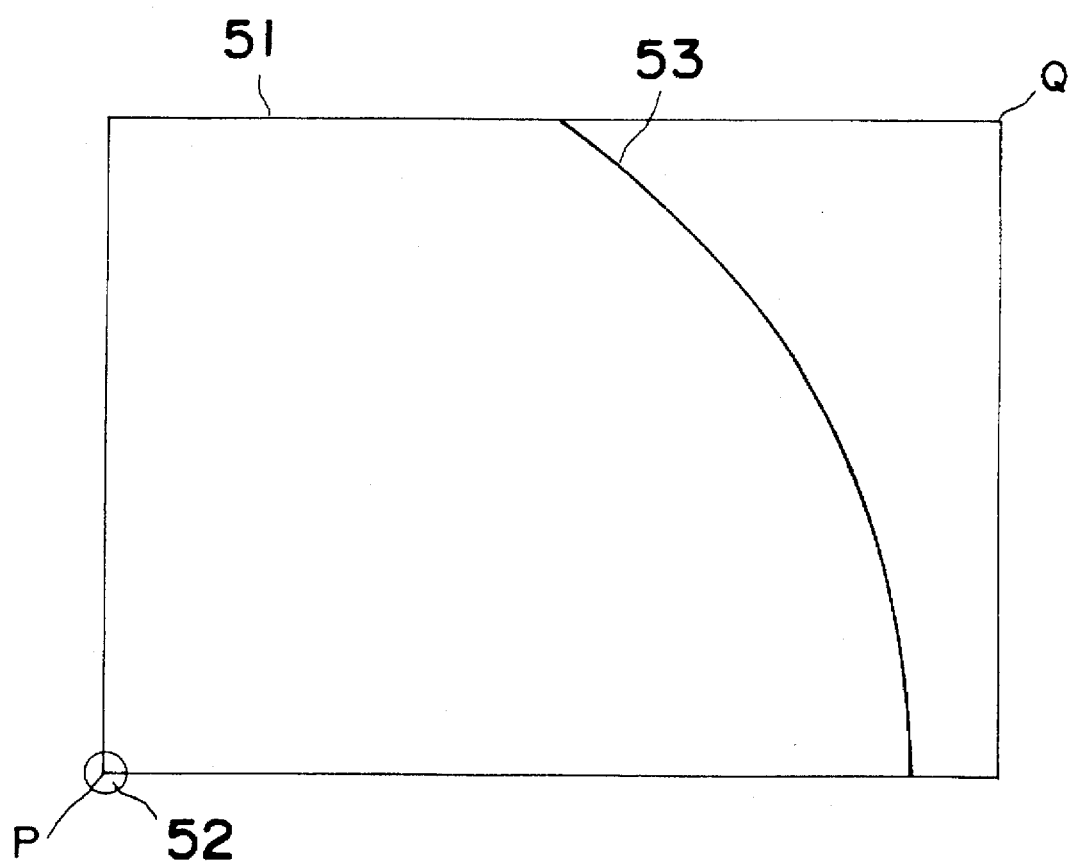
FIG. 5 is a schematic diagram explanatory of luminance distribution of a model of a light valve apparatus.

As shown in FIG. 5, two points for providing the maximum size or a diagonal of the effective display area 51 of the liquid crystal layer are denoted as P and Q and a parallel beam is assumed to illuminate only a very small area 52 around the point P. The effective display area 51 means an area where a matrix of pixels is arranged. Then, a ring 53 of re-outgoing light appears on the liquid crystal layer 33 due to the light outgoing from the point P and reflected at the outgoing plane 36. In order to suppress the brightness due to the re-outgoing light in the entire effective display area 51, the point Q is required to exist within the ring 53. Therefore, the distance d between the points P and Q is required to satisfy the following relationship:

$$r_R \geq d \qquad (13)$$

By eliminating $\theta_{0T}$ and $r_R$ from Eqs. (5), (11) and (12), $$t \geq \frac{d}{2} \sqrt{n^2 - 1} \qquad (14)$$

If the conditions of Eq. (13) is satisfied, the increase in brightness due to unnecessary light is suppressed over the entire effective display area 51 and the contrast is improved. In this invention, the radius of the ring $r_R$ is increased in order to improve the contrast.

Further, the inventors confirmed from experimental data that the contrast is improved sufficiently to be used practically if the maximum size of the effective display area 51 is smaller than the diameter of the ring, or $$2 r_R \geq d \qquad (15)$$

In this case, by eliminating $\theta_{0T}$ and $r_R$ from Eqs. (5), (11) and (12), $$t \geq \frac{d}{4} \sqrt{n^2 - 1} \qquad (16)$$

Therefore, the thickness "t" of the transparent substrate 32 is selected to satisfy Eq. (16).

The contrast is not improved sharply when t satisfies Eq. (16). The contrast is improved gradually with increasing "t", and if "t" satisfies Eq. (16), the contrast is not improved any more with further increase in "t". In an example, if "t" has a value which is a half of the value needed to satisfy Eq. (16), an effect of about 80% of the improvement of the contrast is realized.

Figure 6:
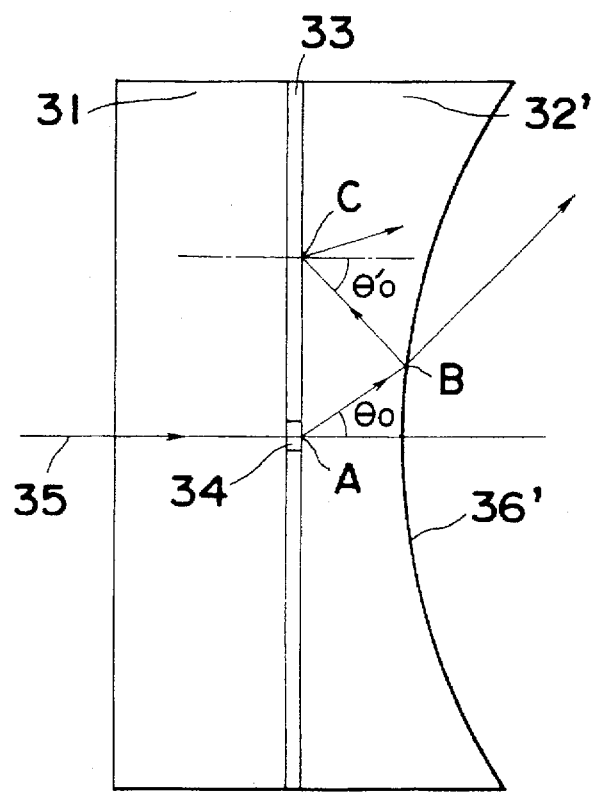
FIG. 6 is a schematic sectional view explanatory of the operation of another model of a light valve apparatus.

Next, a modified case shown in FIG. 6 is explained wherein the outgoing plane 36' of a transparent substrate 32' is concave. This light valve apparatus is the same as that shown in FIG. 3 except for the concave plane 36'. When an electric field is not applied to the liquid crystal layer 33, a narrow parallel beam 35 enters from the incoming side only into a very small area 34 with a center "A" in the display area. Then, light goes out from the point A in a direction $\theta_0$ and is split at a point B by the concave plane 36'. The light reflected at the point B enters into a point C on the liquid crystal layer 33. Because the plane 36' is concave, the length from a virtual image of the very small region 34 to the point C becomes longer, and the incident angle $\theta'_0$ at the point C becomes larger. Therefore, the brightness of the re-outgoing light decreases as found from Eq. (10). Because the length "r" from the point A to C becomes longer, the diameter of the ring $r_R$ becomes larger. Therefore, the concave outgoing plane 36' of the transparent substrate 32 makes the brightness of the re-outgoing light decrease and this improves the display contrast. This means that even if the thickness of the substrate 32' at the center is small, the effect of the improvement of the contrast is large.

Figures 7, 8:
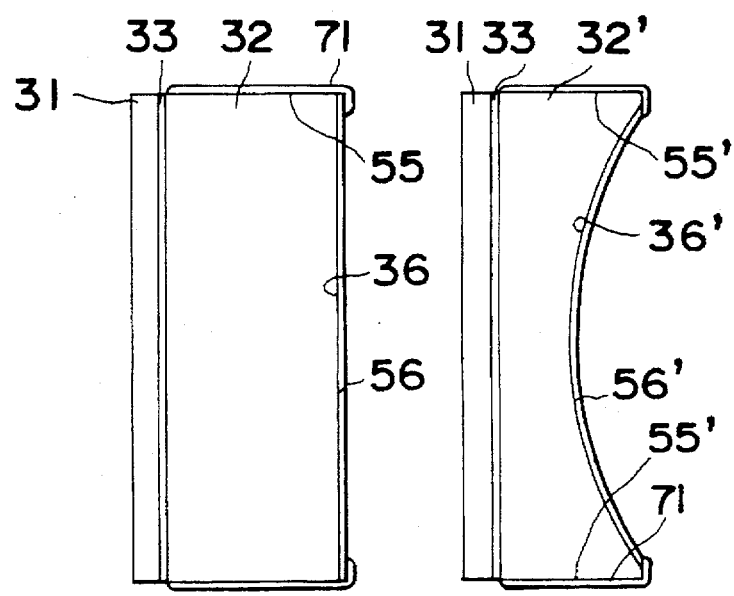
FIG. 7 is a schematic sectional view of another light valve apparatus.
FIG. 8 is a schematic sectional view of another light valve apparatus.

If light is scattered at an ineffective area, the light returns to the liquid crystal layer 33 and the brightness increases at the pixels to be displayed as black. As shown in FIGS. 7 and 8, this problem is solved by forming light absorbing film 71 on the ineffective area 55 and 55' of the transparent substrates 32 and 32' in order to absorb unnecessary light. Further, anti-reflection films 56 and 56' are applied to the effective display area on the outgoing planes 36 and 36' of the transparent substrates 32 and 32'. Then, the reflectance of the outgoing light from the liquid crystal layer 33 is reduced at the outgoing planes 36 and 36' and the increase in brightness can be reduced at the pixels to be displayed as black.

The light valve apparatuses explained above are transmission type light valves. However, a reflection type light valve can also be constructed similarly. In this case, the incident light 35 enters from the transparent substrates 32 and 32' and is reflected without entering the other substrate 31.

In order to reduce unnecessary reflected light, a thick transparent plate may be adhered to a liquid crystal panel with a light coupling layer so as to satisfy Eq. (14) or (16). FIGS. 9(a)–9(g) show several examples. A liquid crystal panel 15 consists of a first substrate 31, a second substrate 132 and a liquid crystal layer 33 interposed between them. The liquid crystal layer 33 is sealed with a sealant resin 81. That is, a transparent plate 32 is adhered to a second substrate 132 optically with a optical-coupling layer 133 made from a material such as an ultraviolet rays setting resin, having a refractive index similar to glass, in order to optically couple the transparent plate 32 with the second substrate 132. The optical-coupling layer 133 may also be made from a transparent silicone resin, an epoxy transparent adhesive or an ethylene glycol. It is needed to prevent the mixing of air in the optical-coupling layer 133 when the transparent plate 32 is adhered to the counterelectrode substrate 132. It is preferable that the difference of the refractive index as compared with that of the second substrate 132 is 0.05 or less. The transparent plate 32 is a thick plate or, in detail, a columnar or square glass plate, having a diameter larger than the maximum diameter of the effective display area of the display panel. It is also made of an acrylic resin, a polycarbonate resin or the like. These are relatively cheap and can be produced to have any shape. Further, they are light weight. Further, a light-absorbing film 71 made of a black paint or the like is applied to the ineffective area of the transparent substrate 32, such as the sides thereof.

Figure 9A:
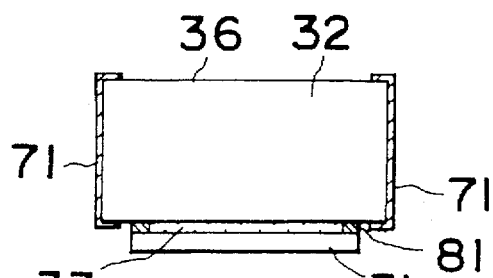
FIGS. 9(a), 9(b), 9(c), 9(d), 9(e), 9(f) and 9(g) are schematic sectional views of light valve apparatuses.

The total thickness "t" of the transparent plate 32 and the second substrate 132 at the center is selected to satisfy the following relationship:

$$t \geq \frac{d}{4} \sqrt{n^2 - 1} \qquad (17)$$

wherein "d" denotes the maximum size of the effective display area of the liquid crystal panel and "n" denotes the refractive index of the glass or substrates. However, if the substrate 32 is thick enough to satisfy Eq. (17) as shown in FIG. 9(a), the transparent plate 32 is not omitted or a thick transparent substrate 32 is used without adhering a transparent plate thereto. In this case, an adherence step can be omitted and unnecessary reflections at the interface can be avoided.

FIGS. 9(b)–9(g) illustrate several modified examples of transparent plate of the light valve.

Figure 9B:
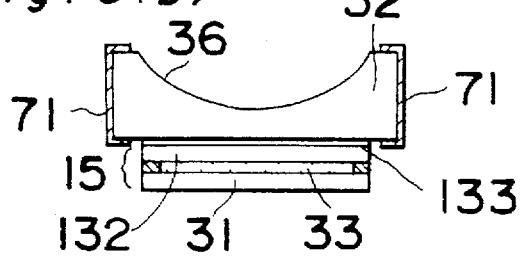

FIG. 9(b) shows a light valve comprising a liquid crystal panel 15, a transparent plate 32' having a shape of a flat concave lens and having an optical-coupling layer 133 disposed between them. An anti-reflection film 139 is formed at an incident plane 36 of the flat concave lens 32, while a light-absorbing film 71 of black paint is applied to the sides of the substrate 32'. The flat concave lens 32' is made of an acrylic resin and is produced by molding with a die. If this light valve apparatus is used for a projection display system, the optical system such as the projection lens or the focus control is designed by taking the flat concave lens 32' into account. This holds also for other light valves explained below.

Figure 9C:
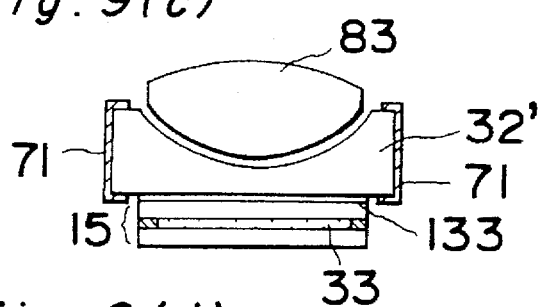

FIG. 9(c) shows a light valve comprising a liquid crystal panel 15, a flat concave lens 32', a convex lens 83 and a optical-coupling layer 133 disposed between them. The convex lens 83 is located near the flat concave lens 32' so that the curvature radius of the concave plane of the lens 32' agrees with that of a convex plane of the convex lens 83. A thin air gap is formed between the concave plane and the convex plane. A black paint 71 is applied to the sides of the flat concave lens 32'. Anti-reflection films are deposited on the concave plane of the flat concave lens 32' and on both convex planes of the lens 83. The curvature of the convex plane at the side of the liquid crystal panel 15 is preferably equal to or smaller than that of the concave plane of the flat concave lens 32'. Then, the convex lens 83 fits in the convex plane of the flat convex lens 32', and the distance between the optical modulation layer 33 to the top of the convex lens 83 at the side of projection lens (not shown).

A liquid crystal/resin composite used in the light valves does not have such a large dependence on the incident angle of the optical properties as compared with a twisted nematic liquid crystal panel. However, if the incident angle becomes too large, the optical path in the optical modulation layer 33 becomes too long so as to change the scattering characteristics. That is, if the incident angle entering the optical modulation layer 33 changes at different positions, the image quality on the liquid crystal panel is not homogenous. By using the structure shown in FIG. 9(b), the curvature of the concave plane can be decreased by entering light having a large conversion angle or by enlarging the effective diameter of the lens. However, light having a large conversion angle makes the image quality of the projected light inhomogeneous, while the enlargement of the effective diameter increases the size of the projection lens. If the scattering characteristic of the incident angle dependence of liquid crystal panel 15 is large, the structure shown in FIG. 9(c) can make parallel light enter into the liquid crystal panel 15, and the homogeneity of the projected image can be obtained surely.

Figure 9D:
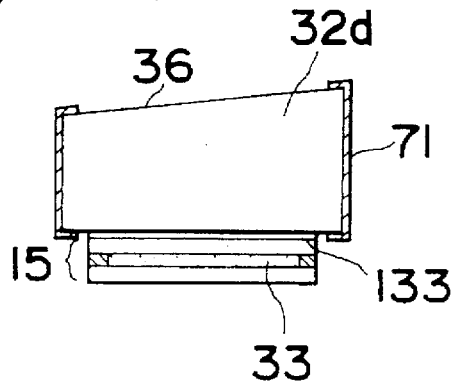
Figure 9E:
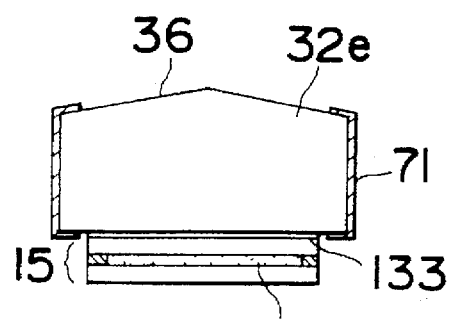
Figure 9F:
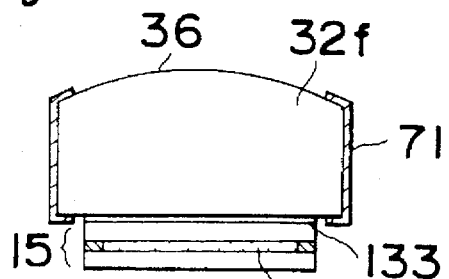

FIG. 9(d) shows a light valve comprising a transparent plate 32d having a tilted plane at the interface with air. FIG. 9(e) shows a light valve comprising a transparent plate 32e having a conical shape at the interface with air. Further, FIG. 9(f) shows a light valve comprising a transparent plate 32f having an arc shape at the interface with air. An anti-reflection film 36 of V-coat or multi-coat type may be formed at an interface with air, but it is difficult to decrease the reflectance to zero. In a light valve apparatus for a projection display system, unnecessary reflected light at the interface has to be decreased to as small a value as possible because it greatly affects a projected image as explained above. The structures shown in FIGS. 9(d)–9(f) have a sloped or curved plane so that unnecessary reflected light can be greatly reduced and so that the contrast is improved to a great extent.

Figure 9G:
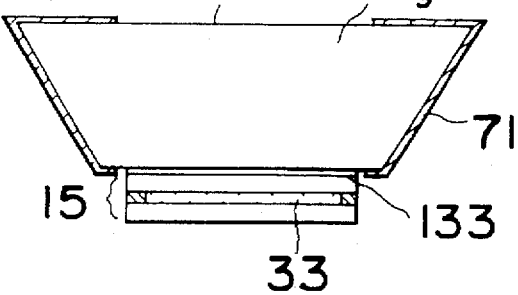

FIG. 9(g) shows a light valve having a transparent plate 32g which has a wider area at the interface with air than the interface with the counterelectrode substrate. A light-absorbing film 71 is formed at the sides of the transparent plate 32g except for the effective display area. Thus, the light modulated in the optical modulation layer and reflected at the interface with air is prevented from entering again into the optical modulation layer 33 because it is absorbed by the light-absorbing film 71. Therefore, the contrast can be improved.

One of the problems of a prior art light valve is that the display contrast becomes worse due to the reflection at interfaces of a light valve.

In a light valve apparatus of the present invention, an anti-reflection film is made by including an indium tin oxide film as a counterelectrode. In a reflection type light valve, the light reflected without entering the liquid crystal layer is unnecessary and it deteriorates the display contrast. Because the refractive index of an indium tin oxide film is very different from that of the counterelectrode substrate, the indium tin oxide film reflects about 10% of the incident light. Therefore, the contrast becomes at most ten percent without any means to solve this problem. By using an anti-reflection counterelectrode, the reflectance can be reduced to a very low value. Thus, a sufficient contrast can be realized. Especially for a color display using three light valves, the low reflectance can be realized easily because the optical bandwidth of the incident light is narrow for each light valve.

Figure 10:
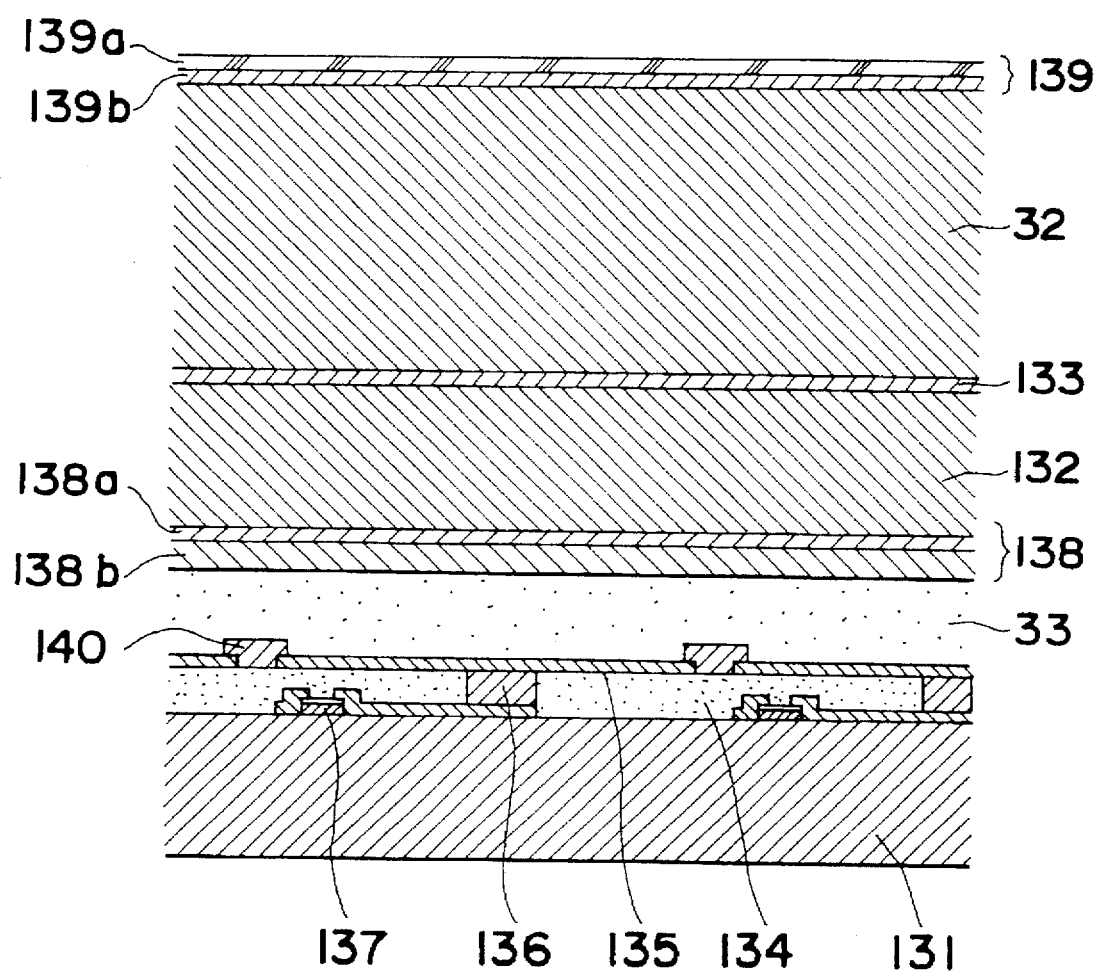
FIG. 10 is a schematic partial sectional view of a light valve apparatus.

FIG. 10 shows a section of a reflection type light valve apparatus schematically wherein parts unnecessary for the explanation have been omitted. Thin film transistors 137, signal lines and the like are formed on an array substrate 131, and an insulating film 134 is formed on the thin film transistors 137 and the array substrate 131. Further, reflection electrodes 135 made of aluminum are formed on the insulating film 134. They are located above the thin film transistors 137 and the signal lines (not shown) in order to prevent the effect of the electric field on the alignment of the liquid crystal layer 33. The thin film transistors 137 are connected, through connection lines 136 formed in contacts, to the reflection electrodes 135 for controlling the liquid crystal layer 33 according to the signals applied to the thin film transistors 137. The insulating film 134 is made of an organic material such as polyamide or an inorganic material such as $SiO_2$ or $SiN_x$. The surfaces of the reflection electrodes 135 are polished after the patterning in order to improve the specular property. The aperture ratio of a pixel or a reflection electrode 135 can be increased to a value as large as 70% or more.

On the other hand, a counterelectrode substrate 132 is made of glass, and a two-layer anti-reflection counterelectrode 138 which prevents reflection is formed on the counterelectrode substrate 132. The structure of the anti-reflection counterelectrode 138 will be explained later. The distance between the anti-reflection counterelectrode 138 and the reflection electrodes 135 is kept at a predetermined length by using beads or the like (not shown), and a liquid crystal layer 33 for optical modulation is interposed between the two substrates 131 and 132. Further, a transparent plate 32 is adhered to the counterelectrode substrate 132 with an optical coupling layer 133 therebetween. An anti-reflection film 139 is also applied to the transparent plate 32 at the interface with air. Two kinds of anti-reflection films 138 and 139 are provided and a reflectance of 0.3% or less can be realized. Thus, an image of high contrast can be displayed. Especially, for a projection display system, the bandwidth is narrow and the effect for preventing reflection is very good.

Figure 11:
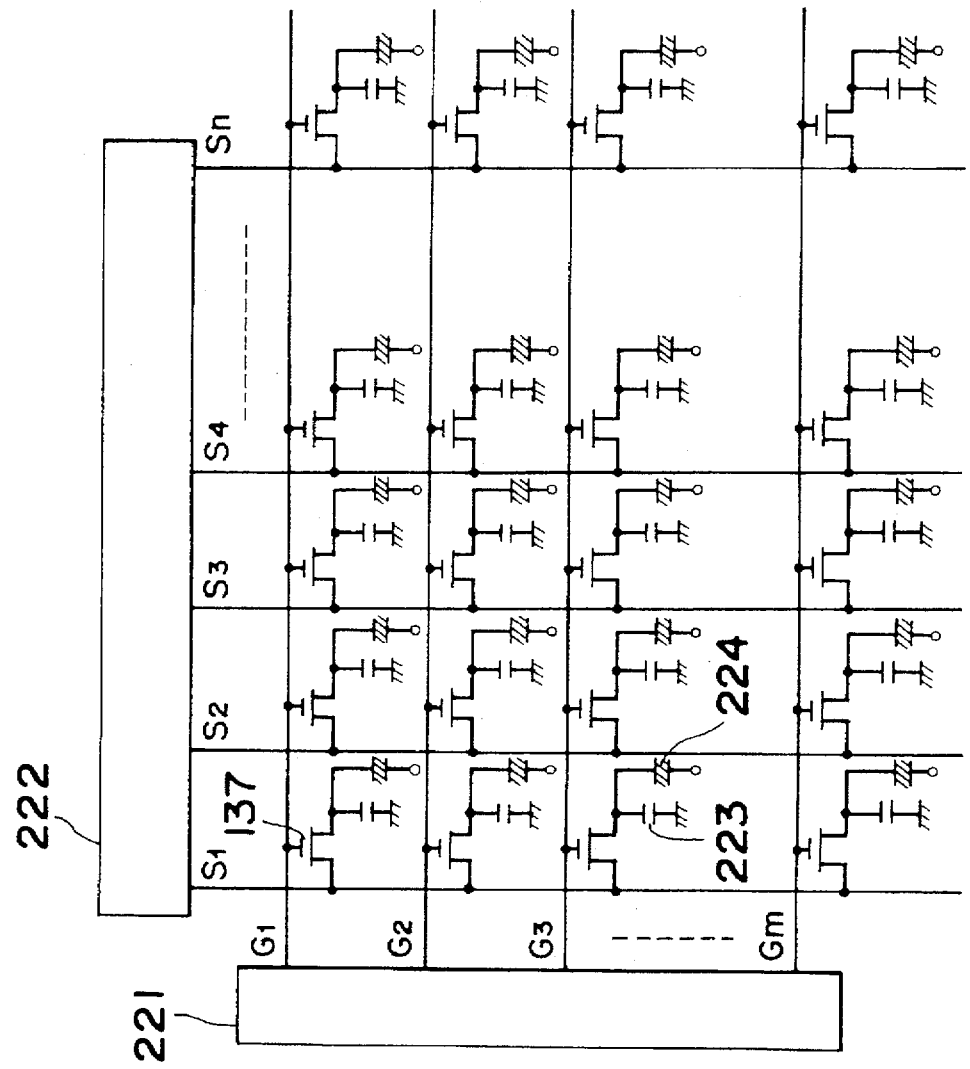
FIG. 11 is an equivalent diagram of a light valve apparatus.

The connection lines 136 of the reflection electrodes 135 have recesses of 0.5–1 μm in depth. However, the alignment processing is not needed for a liquid crystal/resin composite and no problem on the alignment arises due to the recesses in contrast to a twisted nematic liquid crystal. The aperture ratio is 80% or more for a pixel of 100 μm square and 70% or more even for a pixel of 50 μm square. However, the reflectance of the reflection electrodes 138 decreases more or less above the thin film transistors 137 because the patterns of thin film transistors 137 are transferred. In order to eliminate the unevenness of the surfaces of the reflection electrodes 135, the surfaces may be polished to smooth the reflection electrodes 135 or to attain the reflectance of 90% or more. FIG. 11 shows an equivalent circuit of a liquid crystal panel. A thin film transistor 137 arranged in a matrix is driven by two drivers 221 and 222 in the x and y directions.

Preferably, films 140 of a dielectric constant lower than that of the optical modulation layer 33 are formed between the reflection electrodes 135. The films 140 can reduce the effect of the electric field of the signal lines on the liquid crystal layer 33 because of the voltage drop in the films 140. The films 140 may be made of an inorganic material such as $SiO_2$ or an organic material such as polyamide. If the dielectric constant thereof is 5 or less, it is sufficiently lower than the 15–30 constant of the liquid crystal component in the liquid crystal layer 33.

The counterelectrode substrate 132 has a thickness of 1 mm and a refractive index of 1.52. The total thickness of the transparent plate 32 and the counterelectrode substrate 132 is selected to satisfy Eq. (16) with respect to the maximum size "d" of the effective display area of the liquid crystal layer 33.

Further, a black paint 71 (not shown) is applied to the sides of the transparent plate 32 as shown in FIG. 7. Preferably, the black paint 71 is also applied to the sides of the counter substrate 132 and the optical coupling layer 133.

In the preparation of the liquid crystal/resin composite, independent particle-like droplets of liquid crystal are formed in a resin layer when the amount of the liquid crystal component is smaller than that of the resin component. On the other hand, when the amount of liquid crystal component is larger than that of the resin component, a resin matrix or network is formed in the liquid crystal material as a continuous layer. Although a liquid crystal panel using the polymer dispersed liquid crystal is used as an example in the following embodiments for simplicity of the explanation, liquid crystal panels using a polymer dispersed liquid crystal or a polymer network liquid crystal can be used in the present invention to display an image by controlling the scattering and transmission of light.

Preferably, the liquid crystal component for the liquid crystal layer 33 is a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals are preferable because they have a large difference between the ordinary refractive index $n_o$ and the extraordinary one $n_e$. A nematic liquid crystal of fluoride of good resistance to light and heat is preferable.

Preferably, the resin material is a transparent resin, and any of thermoplastic resin, thermosetting resin, and photosetting resin may be used. An ultraviolet ray setting resin such as an ultraviolet ray setting acrylic resin is preferable because it can be used easily in the production of a liquid crystal panel and well separated from the liquid crystal phase. Particularly, a resin is preferable which contains acrylic monomers or acrylic oligomers which can be polymerized and set by ultraviolet ray irradiation.

A monomer for the polymer phase (resin) may be 2-ethylhexyl acrylate, 2-hydroxyethyl acrylate, neopentyl glycol diacrylate, hexanediol diacrylate, diethylene glycol diacrylate, tripropylene glycol diacrylate, polyethylene glycol diacrylate, trimethylol propane triacrylate, pentaerythritol acrylate or the like. An oligomer or prepolymer for the polymer phase may be polyester acrylate, epoxy acrylate, polyurethane acrylate or the like. An oligomer or prepolymer may be polyester acrylate, epoxy acrylate, polyurethane or the like.

In order to enhance the polymerization rate, a polymerization initiator may be used such as a 2-hydroxy-2-methyl-1-phenylpropane-1-on ("DAROCURE 1173" available from Merck & Corp. Inc.), 1-(4-isopropylphenyl)-2-hydroxy-2-methylpropane-1-on ("DAROCURE 1116" available from Merck & Corp. Inc.), 1-hydroxy cyclohexyl phenylketone ("Irgacure 651" available from Ciba-Geigy AG) or the like. Furthermore, a chain transfer agent, a photosensitizer, a dye agent, a crosslinking agent or the like may be appropriately incorporated as an additional ingredient.

The mixture is injected between the two substrates 131 and 132, and next it is irradiated with ultraviolet rays. Thus, only the resin material is isolated to form a liquid crystal/resin composite.

The refractive index of the liquid crystal component oriented in the direction is selected to coincide with that of the resin component after polymerization. Thus, when an electric field is applied to the liquid crystal layer 33, the liquid crystal molecules are aligned and the light transmits the liquid crystal layer 33.

The ratio of the liquid crystal component to the resin component in the liquid crystal/resin composite is generally 20 to 90 wt %, preferably 50–80 wt %. If the ratio is less than 20 wt %, the amount of liquid crystal droplets is small so that the effect of a change of the refractive index is small. On the other hand, if the ratio is more than 90 wt %, there is a tendency that the resin component and the liquid crystal component are separated from each other into top and bottom layers, so that the ratio of the interface decreases to lower the scattering property of the liquid crystal layer.

The thickness of the liquid crystal layer 33 is selected to be between 5 to 25 μm, preferably between 8 to 15 μm. If the thickness is smaller, the scattering characteristic and the contrast become worse, while if the thickness is larger, the applied voltage of the liquid crystal layer has to be increased and this makes it difficult to design a drive circuit. An appropriate liquid crystal/resin composite is used according to the wavelength of light to be scattered wherein a polymer dispersion liquid crystal has droplets of an average size between 0.5 and 3 μm or a polymer network liquid crystal has pores of an average pore size between 0.5 and 3 μm. The average sizes can be controlled by adjusting the conditions of ultra-rays irradiation.

The anti-reflection counterelectrode 138 is made of an indium tin oxide film 138b as a counterelectrode and a dielectric film 138a which has a refractive index higher than that of the counterelectrode substrate 132 and lower than that of the indium tin oxide film 138b. Further, the refractive index of the dielectric film 138a is higher than that of the liquid crystal layer 33 under no electric field.

A black matrix is not formed on the anti-reflection counterelectrode 138. If a black matrix is formed, a mixture solution of liquid crystal and resin injected between the array substrate 131 and the counterelectrode substrate 132 is not polymerized below the black matrix when ultra-violet rays are illuminated to separate the liquid crystal and the resin. This makes the optical modulation layer 33 unstable to deteriorate the performance of the display. Further, a black matrix lowers the aperture ratio. Still further, in a display panel of reflection type, the incident light is reflected by the black matrix, and this results in a display of the pattern of the black matrix on a screen in a projection display system.

An anti-reflection layer 139 of a two-layer structure is applied to the transparent plate 32 at an interface with air in order to prevent reflection at the interface. The anti-reflection layer 139 is a V-coat type which is preferable for preventing the reflection over a narrow wavelength range. The V-coat type is better for a projection color display system because each of the three light valves for red, green and blue deals with a narrow wavelength. If a light valve is used to modulate white light, a multi-coat type anti-reflection film is adopted for an anti-reflection film 142 shown in FIG. 12.

Figure 13:
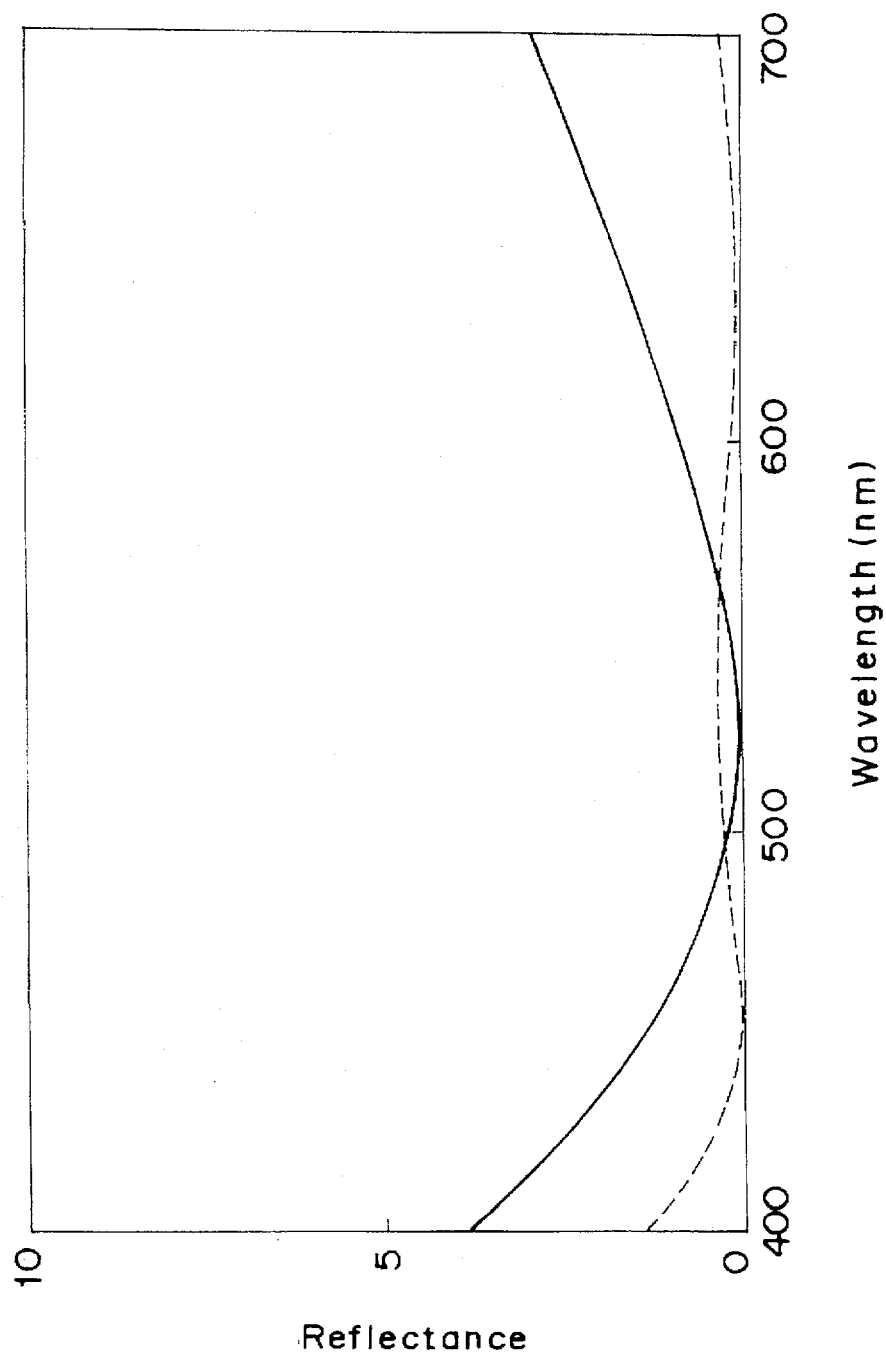
FIG. 13 is a graph of the reflection characteristic of a light valve apparatus.

The anti-reflection layer 139 consists of two layers: a $Y_2O_3$ layer 139a of optical thickness of about $\lambda/4$ and a $MgF_2$ layer 139b of optical thickness of about $\lambda/4$. SiO may be used instead of $Y_2O_3$, but it is preferable to use the latter because the former has an absorption band of blue. A solid line shown in FIG. 25 denotes the spectral reflectance of the anti-reflection layer 139 of V-coat type. On the other hand, the anti-reflection layer 142 of the multi-coat type consists of three layers: a $Al_2O_3$ layer 142a of optical thickness of about $\lambda/4$, a $ZrO_2$ layer 142b of optical thickness of about $\lambda/2$ and a $MgF_2$ layer 142c of optical thickness of about $\lambda/4$. A dashed line shown in FIG. 13 denotes the spectral reflectance of the anti-reflection layer 142 of multi-coat type.

The multi-layer structures of the anti-reflection counterelectrode 138 and the anti-reflection film 139 will be explained below.

First, the reflection at an interface between two materials is explained. The reflectance R (%) at the interface of two materials of refractive indices of $n_A$ and $n_B$ is expressed as follows:

$$R = \left( \frac{n_A - n_B}{n_A + n_B} \right)^2 \times 100 \tag{18}$$

If the transparent plate 32 is made of a glass, the refractive index is usually 1.52 and that of air is 1.0, and the reflectance R at an interface between air and the material becomes about 4%.

Further, if a film of thickness "d" and of refractive index of $n_C$ is formed between two materials of refractive indices of $n_A$ and $n_B$, the reflectance R (%) at wavelength $\lambda$ is expressed as follows:

$$B(\theta_2) = \frac{r_1^2 + r_2^2 + 2r_1r_2\cos\epsilon}{1 + r_1^2 r_2^2 + 2r_1r_2\cos\epsilon} \times 100 \tag{19}$$

wherein $$r_1 = \frac{n_C - n_A}{n_C + n_A},$$

$$r_2 = \frac{n_B - n_C}{n_B + n_C},$$

and $$\epsilon = \frac{4\pi n_C d}{\lambda}.$$

Figure 14:
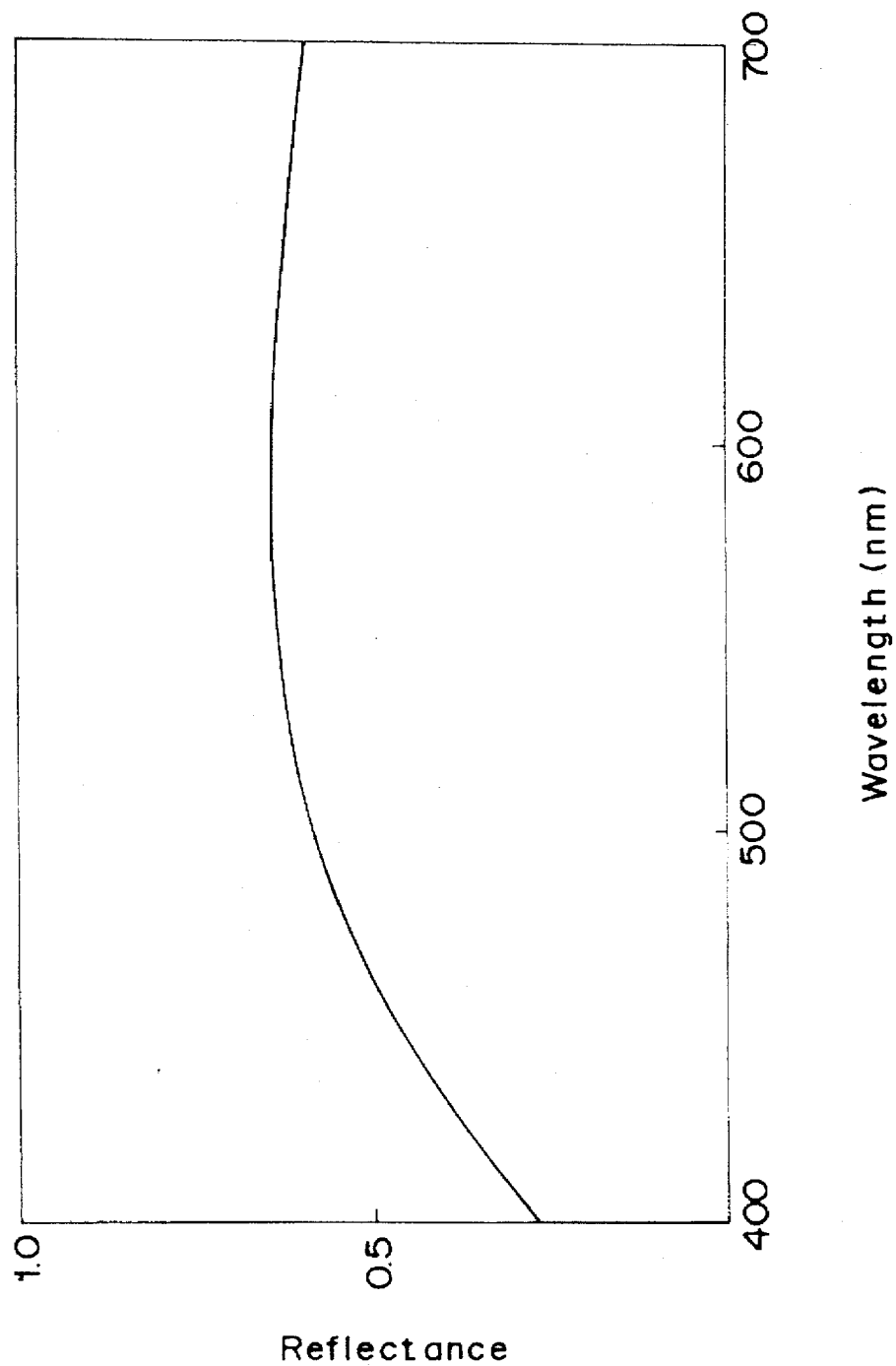
FIG. 14 is a graph of the reflection characteristic of a light valve apparatus.

The refractive index of a counterelectrode is 2.0 if an indium tin oxide thin film is used as the counterelectrode, that of glass substrate is 1.52 and that of a liquid crystal layer is assumed to be 1.6. Then, the reflectance R (%) becomes about 6% at most at a specified wavelength though it depends on the film thickness. Therefore, if a reflection type display is used, light of at most about 10% is reflected without entering the liquid crystal layer and this deteriorates the contrast. FIG. 14 shows the spectral reflectance if an indium tin oxide film of d=75 nm is used. The reflected light of about 10% greatly deteriorates the display contrast.

Figure 12:
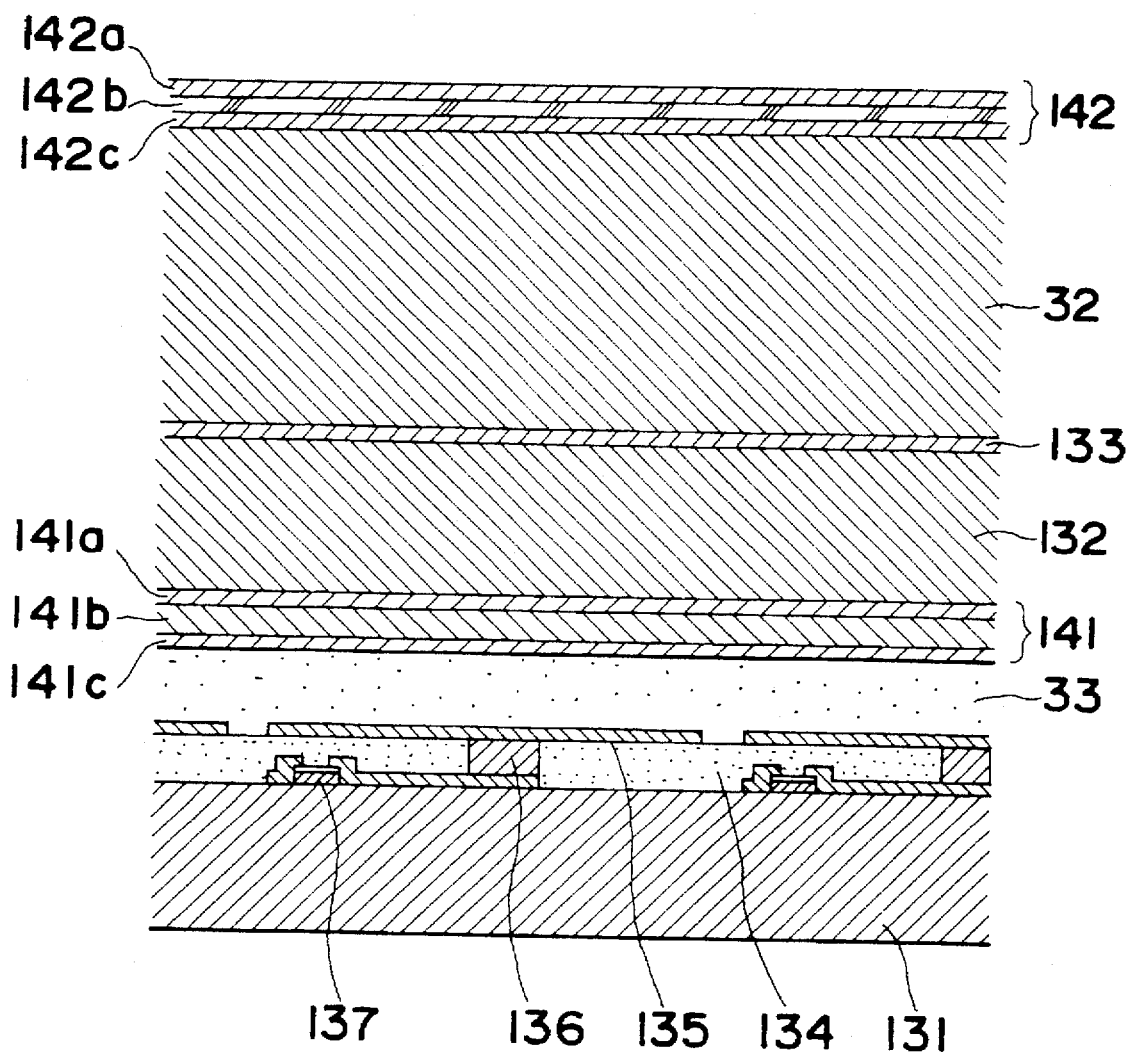
FIG. 12 is a schematic partial sectional view of a light valve apparatus.

In order to prevent the reflection effectively, the counterelectrode 138 has a two-layer structure and an anti-reflection counterelectrode 141 shown in FIG. 12 has a three-layer structure. In this case, the optical thickness of one or two dielectric thin films formed on one or two surfaces of a counterelectrode or indium tin oxide film becomes important. In a prior art twisted-nematic liquid crystal, an alignment film is needed, but the alignment film cannot be formed with a precision of about 1 nm. Then, an alignment film reduces or eliminates the anti-reflection at the interface. On the contrary, a liquid crystal/resin composite needs no alignment film. Therefore, a good anti-reflection film can be prepared as a multi-layer film.

In order to decrease the reflection at the two interfaces of a counterelectrode, a multi-layer film made of at least two layers is formed which satisfies specified conditions explained below. In a two-layer film 138 as shown in FIG. 10, the conditions for the smallest reflectance are as follows:

$$n_1{}^2 = n_G n_{LC}, \quad (20)$$

and $$n_1 d_1 = n_2 d_2 / 2 = \lambda/4, \quad (21)$$

or $$(n_2/n_1)^2 = n_{LC}/n_G, \quad (22)$$

and $$n_1 d_1 = n_2 d_2 = \lambda/4, \quad (23)$$

where $n_G$ denotes the refractive index of the glass substrate 132, $n_{LC}$ denotes that of the liquid crystal layer 33, $n_1$ denotes that of a dielectric film 138a formed between the glass substrate 138 and the indium tin oxide film 138b, $n_2$ denotes that of the indium tin oxide film 138b, $d_1$ denotes a thickness of the dielectric film 138a, $d_2$ denotes that of the indium tin oxide film 138, and $\lambda$ denotes the wavelength of light transmitting the liquid crystal layer 33. It is to be noted that thicknesses $d_1$ and $d_2$ represent physical thicknesses while $n_1 d_1$ and $n_2 d_2$ represent optical thicknesses.

The above-mentioned conditions are applied to light of a wavelength of $\lambda$. If the reflection is intended to be decreased in a wide wavelength range, Eqs. (20) and (21) are more appropriate than Eqs. (22) and (23). Further, the indium tin oxide film 138b preferably has a physical thickness of 100 nm or more in order to decrease the resistance sufficiently. This also makes Eqs. (20) and (21) preferable. If materials which satisfy Eqs. (20) and (21) or the like completely are not available, materials which can satisfy the condition most appropriately are selected.

The anti-reflection film 138 shown in FIG. 10 is a two-layer film consisting of a counterelectrode 138b made of indium tin oxide of optical thickness of $\lambda/2$ and a dielectric thin film 138a of optical thickness of $\lambda/4$ and having a refractive index smaller than that of the counterelectrode 138b. Further, the refractive index of the dielectric film 138a is larger than that of the liquid crystal layer 33 under no electric field. That is, the refractive index $n_1$ of the dielectric film 138a and that $n_2$ of the indium tin oxide (ITO) film 138b satisfy a relationship $n_2 > n_1 > n_x$ wherein $n_x$ denotes the refractive index of the liquid crystal layer 33 when an electric field is not applied.

It is to be noted that the anti-reflection film 138 comprises an indium tin oxide film as a counterelectrode. Therefore, the indium tin oxide film 138b is formed so that an electric voltage can be applied. The indium tin oxide film may be replaced with a film of indium oxide, tin oxide or the like. In such a case, the conditions for decreasing the reflectance due to optical interference have to be satisfied.

Figure 15:
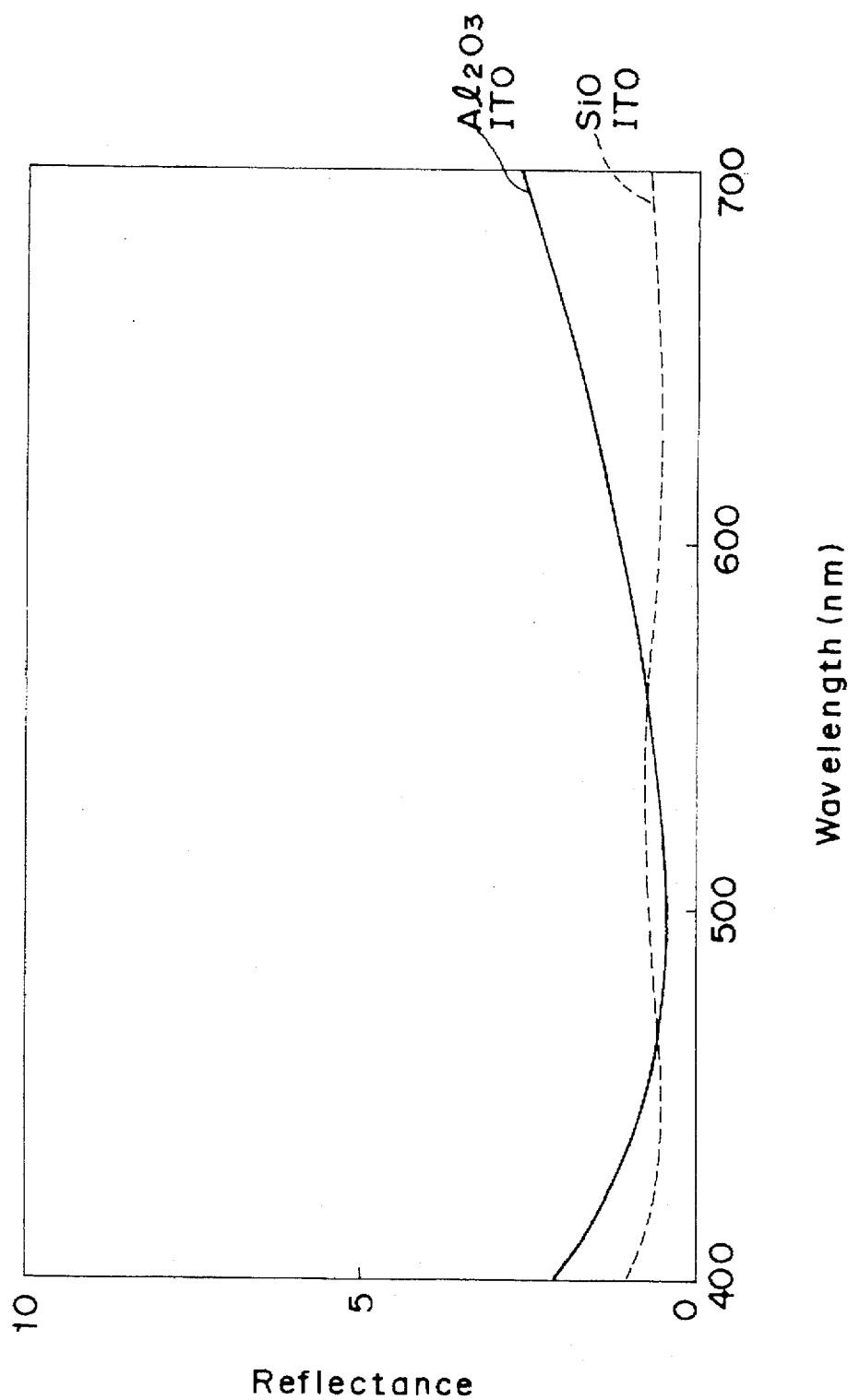
FIG. 15 is a graph of the reflection characteristic of a light valve apparatus.

Table 1 shows an example of the construction of the multi-layer film, and FIG. 15 shows the spectral reflectance of the film as a solid line for a main wavelength or central wavelength of 520 nm. It is clear that the reflectance of 0.3% or less is realized over a wavelength band of 100 nm or more, and this greatly reduces the reflected light.

TABLE 1

| | Anti-reflection structure | | |
|---|---|---|---|
| Material | Refractive index | Optical thickness of thin film (nm) | Physical thickness of thin film (nm) |
| Glass substrate | 1.52 | — | — |
| Al$_2$O$_3$ | 1.62 | 130.0 | 80.2 |
| ITO | 2.00 | 260.0 | 130.0 |
| Liquid crystal | 1.60 | — | — |

NB: main wavelength $\lambda$ = 520 nm.

The refractive index $n_x$ of the liquid crystal/resin composite layer 33 is expressed theoretically as follows when an electric field is not applied:

$$n_x = (n_e + 2 \times n_o)/3, \quad (24)$$

wherein $n_o$ denotes the ordinary refractive index of liquid crystal and $n_e$ denotes the extraordinary refractive index thereof. In case of a cyanobiphenyl liquid crystal, $n_o$ is about 1.50 and $n_e$ is about 1.75. The scattering characteristic is improved more with increase in the difference $\Delta n$ of the refractive indices. In case of a fluoride liquid crystal, both $n_e$ and $\Delta n$ are relatively small, and the scattering characteristic is not very good. However, it has a good heat resistance and light resistance, and the dielectric constant thereof is relatively small. Therefore, a higher electric voltage can be applied to a fluoride liquid crystal than to a cyanobiphenyl liquid crystal. Therefore, though the scattering characteristic is low per film thickness, good scattering characteristics can be obtained by increasing the thickness.

If $n_o$ and $n_e$ of the cyanobiphenyl liquid crystal are substituted in Eq. (24), $n_x$ becomes about 1.6. The optical modulation layer 33 consists of liquid crystal and polymer (resin), and the refractive index $n_p$ of the polymer is usually selected to agree roughly with $n_o$. Therefore, the refractive index $n_x$ of the liquid crystal/resin composite layer under no electric field becomes less than 1.6.

The refractive index of liquid crystal is taken as 1.6 in the embodiments explained in this specification, but it is the highest to be realized actually, and it may be smaller in actual cases. The spectral reflectance becomes the smallest if the refractive index of the glass substrate 132 agrees with that of the liquid crystal layer 33. The refractive index of a liquid crystal layer 33 will not be much larger than 1.6 and smaller than 1.6 actually, and it agrees roughly with that of the glass substrate 132.

It is desirable that the refractive index of the dielectric thin film 138 is between 1.5 and 1.7, more preferably between 1.6 and 1.7. In the example shown in Table 1, $Al_2O_3$ is used, but the thin film 25b may also be made of $CeF_3$, SiO, $WO_3$, $LaF_3$ or $NdF_3$.

TABLE 2

Anti-reflection structure

| Material | Refractive index | Optical thickness of thin film (nm) | Physical thickness of thin film (nm) |
| --- | --- | --- | --- |
| Glass substrate | 1.52 | — | — |
| SiO | 1.70 | 130.0 | 76.5 |
| ITO | 2.00 | 260.0 | 130.0 |
| Liquid crystal | 1.60 | — | — |

NB: main wavelength $\lambda$ = 520 nm.

Table 2 shows an example wherein SiO is used instead of $Al_2O_3$. Further, FIG. 15 shows the spectral reflectance of this case as a dashed line.

By using SiO, it is found that the reflectance of 1% or less can be realized over a wavelength band between 400 and 700 nm. A projection display system which will be explained later uses three display panels for modulating red, green and blue as light valves. In the spectral reflectance shown as a solid line ($Al_2O_3$) in FIG. 16, the reflectance for green is very small while those for blue and for red are large. Then, anti-reflection electrode 138a has to be provided for each of red, green and blue. On the contrary, the spectral reflectance shown as a dashed line is 1% or less for red, green and blue, so that one kind of liquid crystal panel may be used for the three light valves.

Figure 16:
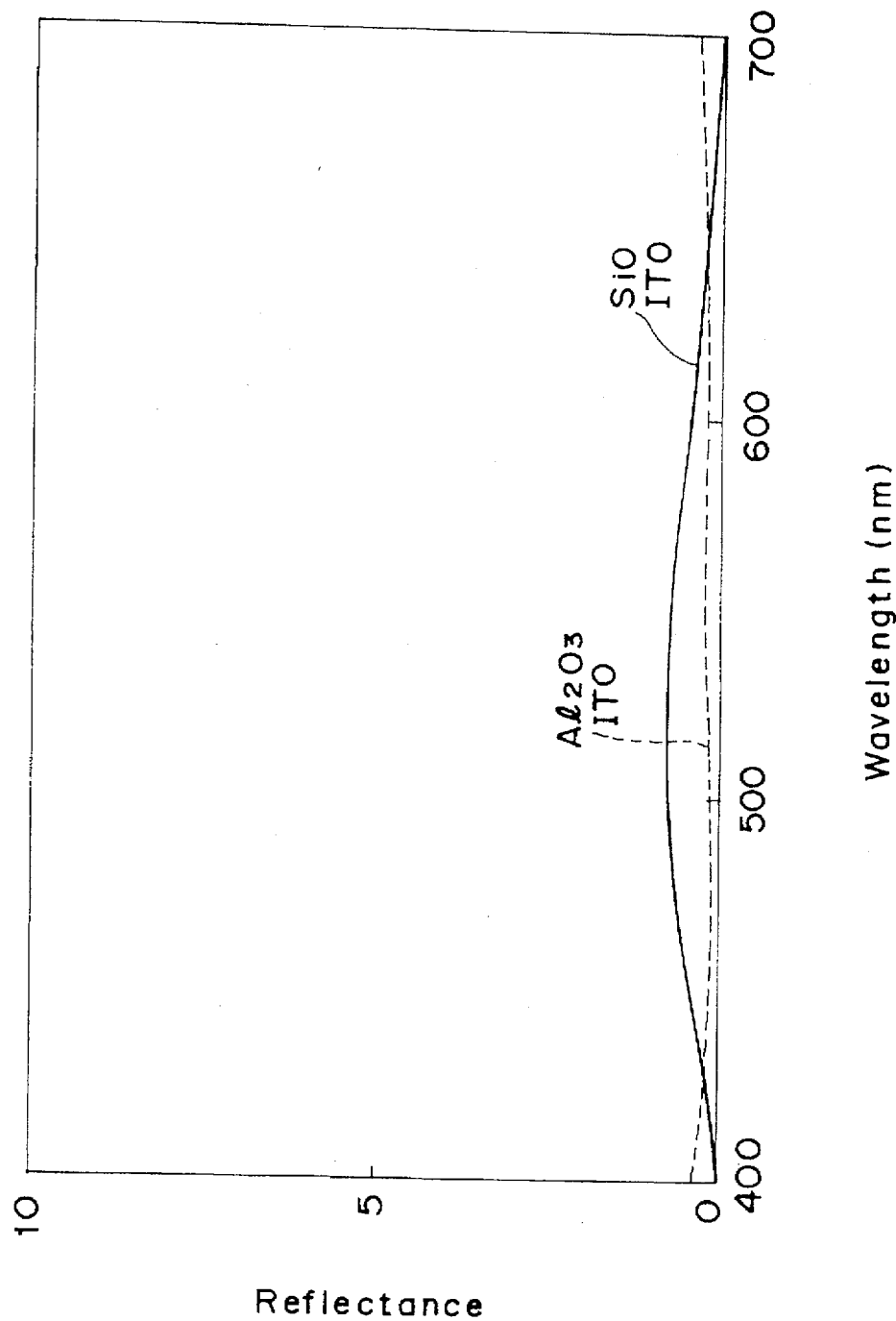
FIG. 16 is a graph of the reflection characteristic of a light valve apparatus.

The reflectance decreases with decreasing the refractive index of the indium tin oxide 138b. Table 3 shows a case of an indium tin oxide 138b of refractive index of 1.8, and FIG. 16 shows the spectral reflectance of the example wherein a solid line and a dashed line respectively mean that SiO and $Al_2O_3$ are used as the dielectric film 138a. A reflectance of 0.5% or less is realized over the whole visible light range. As shown in FIG. 16, it is better that the refractive index of the indium tin oxide is smaller. The indium tin oxide of refractive index between 1.8–2.0 can be prepared by controlling the deposition conditions.

TABLE 3

Anti-reflection structure

| Material | Refractive index | Optical thickness of thin film (nm) | Physical thickness of thin film (nm) |
| --- | --- | --- | --- |
| Glass substrate | 1.52 | — | — |
| $Al_2O_3$ | 1.62 | 130.0 | 80.2 |
| ITO | 1.80 | 260.0 | 144.4 |
| Liquid crystal | 1.60 | — | — |

NB: main wavelength $\lambda$ = 520 nm.

Figure 17:
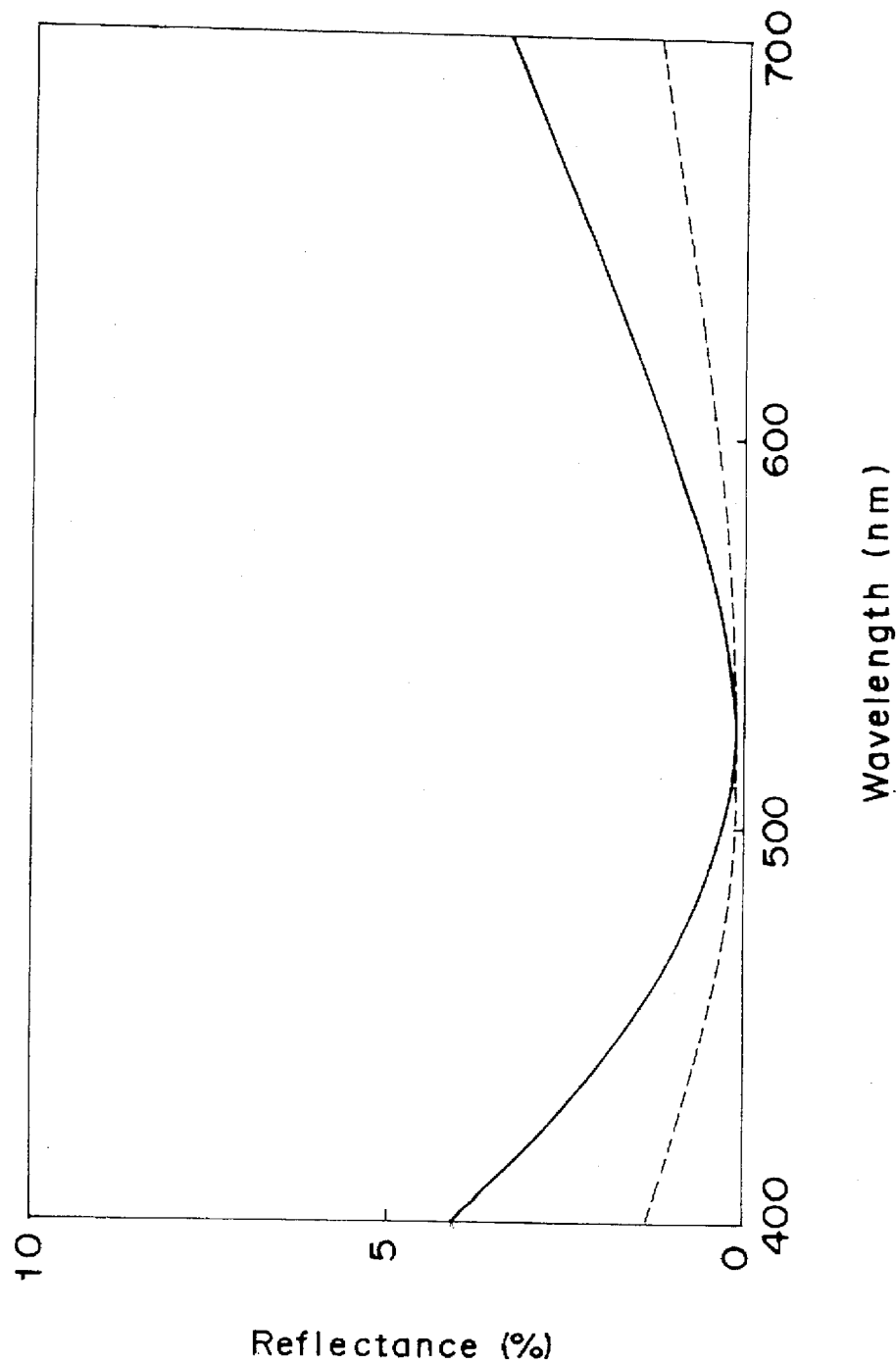
FIG. 17 is a graph of the reflection characteristic of a light valve apparatus.

In the structure shown in FIG. 10, the reflectance is 0.2% or less in a wavelength range of around 100 μm with the peak wavelength at the center. However, the dielectric film 138a may be omitted if the reflectance of a somewhat larger value is allowed. That is, the counterelectrode 138 consists only of the indium tin oxide film 138b, but its optical thickness is $\lambda/2$. Tables 4 and 5 show examples of one-layer structures, and FIG. 17 shows the spectral reflectance of the examples wherein a solid line and a dashed line correspond with refractive indices of 2.0 and of 1.8, respectively.

TABLE 4

Anti-reflection structure

| Material | Refractive index | Optical thickness of thin film (nm) | Physical thickness of thin film (nm) |
| --- | --- | --- | --- |
| Glass substrate | 1.52 | — | — |
| ITO | 2.00 | 260.0 | 130.0 |
| Liquid crystal | 1.60 | — | — |

NB: main wavelength $\lambda$ = 520 nm.

TABLE 5

Anti-reflection structure

| Material | Refractive index | Optical thickness of thin film (nm) | Physical thickness of thin film (nm) |
| --- | --- | --- | --- |
| Glass substrate | 1.52 | — | — |
| ITO | 1.80 | 260.0 | 144.4 |
| Liquid crystal | 1.60 | — | — |

NB: main wavelength $\lambda$ = 520 nm.

It is found that the reflectance is very low around 520 μm of main wavelength. Therefore, the examples can be adopted practically if the optical bandwidth of modulated light is narrow as in a projection television set. It is also found that the reflectance of 1% or less can be realized in the visible light range if the refractive index of the indium tin oxide film 138b is 1.8. As explained above, the reflectance can be 1% or less around the main wavelength in a one-layer counter-electrode.

As shown in FIG. 12, if a three-layer film 141 of an indium tin oxide layer 141b as a counterelectrode and two dielectric layers 141a and 141c at the two sides is adopted, the reflectance can be decreased further than the two-layer film 138 as shown in FIG. 10. In this case, the conditions on the refractive indices and thicknesses are as follows:

$$(n_3/n_1)^2 = n_{LC}/n_G, \tag{25}$$

and $$n_1 d_1 = n_2 d_2/2 = n_3 d_3 = \lambda/4, \tag{26}$$

or $$(n_1 d_3)^2 = n_2 n_G n_{LC}, \tag{27}$$

and $$n_1 d_1 = n_2 d_2 = n_3 d_3 = \lambda/4, \tag{28}$$

where $n_G$ denotes the refractive index of the glass substrate 132, $n_{LC}$ denotes that of the liquid crystal layer 33, $n_1$ denotes that of a dielectric film 141a formed between the glass substrate 132 and the indium tin oxide film 141b, $n_2$ denotes that of the indium tin oxide film 141b, $n_3$ denotes that of the dielectric thin film 141c between the indium tin oxide 141b and the liquid crystal layer 33, $d_1$ denotes a thickness of the dielectric thin film 141a, $d_2$ denotes that of the indium tin oxide film 141b, $d_3$ denotes that of the dielectric thin film 141c, and λ denotes the wavelength of light transmitting the liquid crystal layer 33. It is to be noted that thicknesses $d_1$, $d_2$ and $d_3$ represent physical thicknesses while $n_1d_1$, $n_2d_2$ and $d_3n_3$ represent optical thicknesses.

The above-mentioned anti-reflection conditions are applied to light of wavelength λ. If the reflection is intended to be decreased in a wide wavelength range, Eqs. (25) and (26) are more appropriate than Eqs. (27) and (28). Further, the indium tin oxide film 141b preferably has a physical thickness of 100 nm or more in order to decrease the resistance sufficiently. This also makes Eqs. (25) and (26) better.

The anti-reflection film 141 shown in FIG. 12 is constructed according to the above-mentioned conditions and consists of a counterelectrode 141b made of indium tin oxide of optical thickness λ/2 and two dielectric thin film 141a and 141c of optical thickness λ/4 and having a refractive index smaller than that of the counterelectrode 141b. Further, the refractive index of the dielectric film 141a is larger than that of the liquid crystal layer 33 under no electric field. That is, the refractive index $n_1$ of the dielectric films 141a, 141c and that $n_2$ of the indium tin oxide (ITO) film 141b satisfy a relationship $n_2>n_1>n_x$ wherein $n_x$ denotes the refractive index of the liquid crystal layer 33 when an electric field is not applied. In the light valve apparatus shown in FIG. 12, components other than anti-reflection films 141 and 142 are the same as those shown in FIG. 10.

Figure 18:
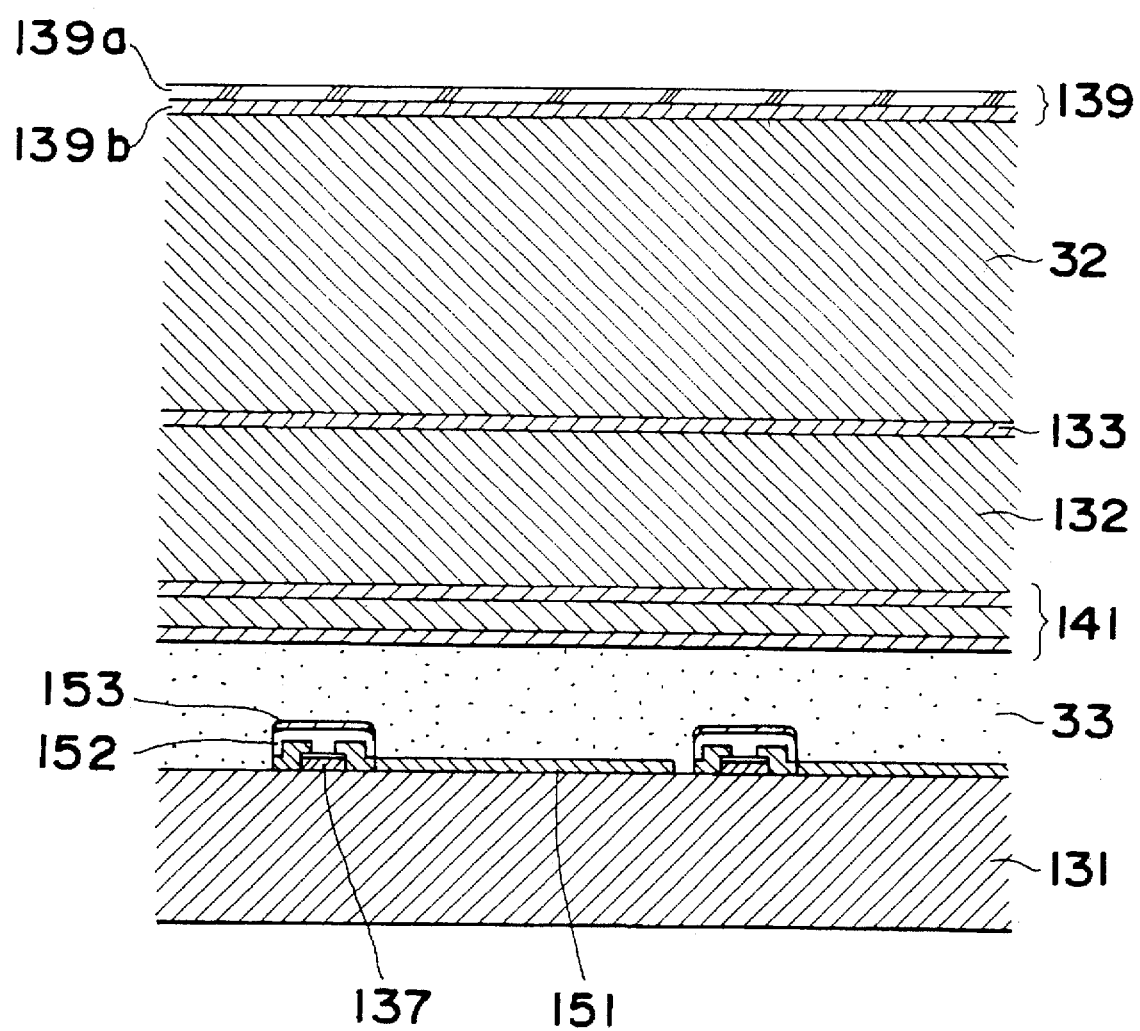
FIG. 18 is a schematic partial sectional view of a light valve apparatus.

FIG. 18 shows a modified example of a light valve using a three-layer counterelectrode 141. This light valve is similar to a prior art light valve apparatus of the transmission type, but reflection electrodes 151 are made from metal such as aluminum or chromium, instead of pixel electrodes made of indium tin oxide. Shading films 153 are formed on insulating layers 152 above thin film transistors 137. The shading films 153 shade the light from entering the thin film transistors 137 in order to prevent the photoconductor phenomenon.

Figure 19:
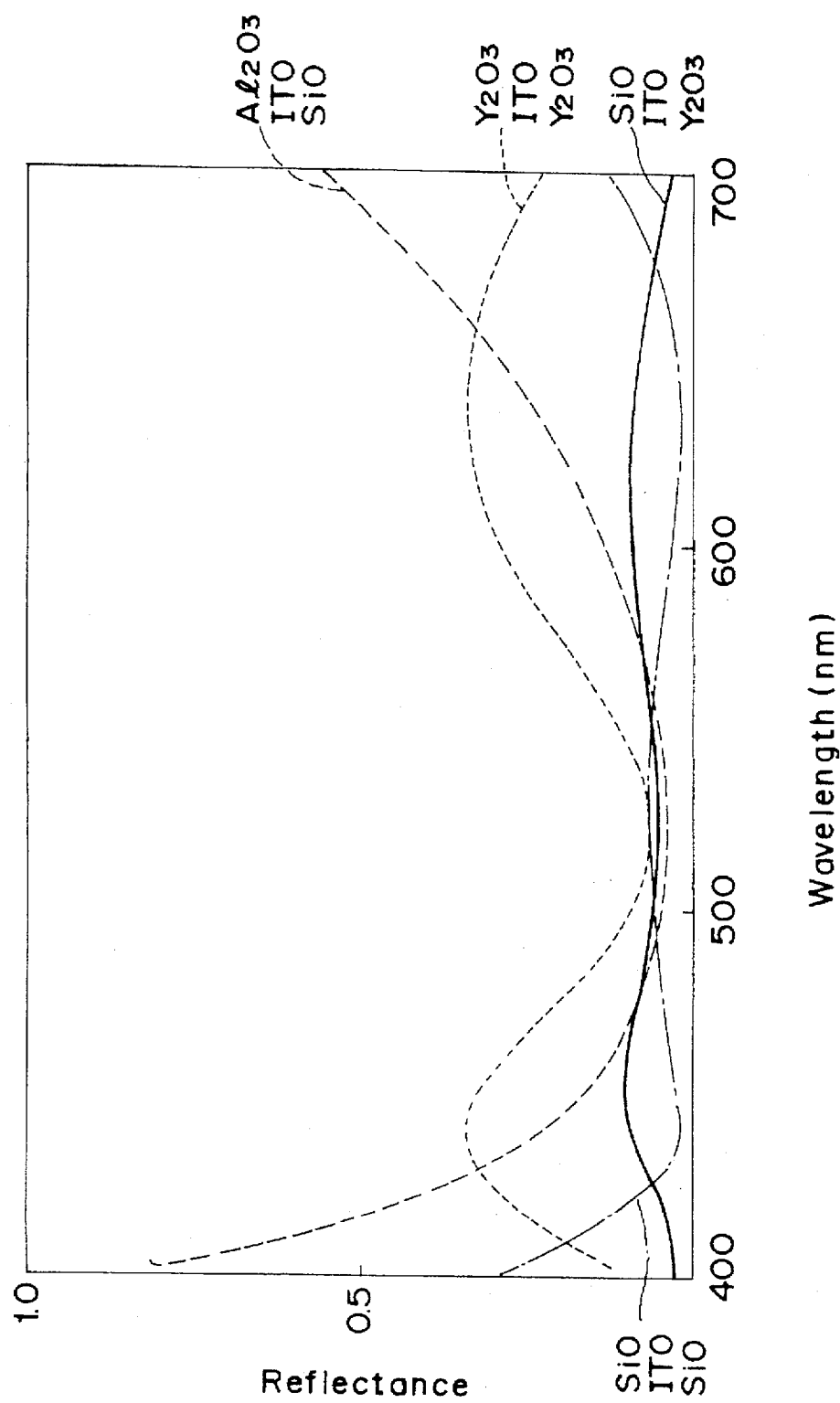
FIG. 19 is a graph of the reflection characteristic of a light valve apparatus.

Table 6 shows an example wherein SiO is used for the dielectric thin films 141a and 141c, and FIG. 19 shows the spectral reflectance of this case as a dash and dot line. In FIG. 19, the top, middle and bottom names of materials denote the materials for layers 141a, 141b and 141c successively. It is found that the reflectance of 0.1% or less can be realized over a wavelength band of 200 nm or the reflection can be prevented very well.

TABLE 6

Anti-reflection structure

| Material | Refractive index | Optical thickness of thin film (nm) | Physical thickness of thin film (nm) |
|---|---|---|---|
| Glass substrate | 1.52 | — | — |
| SiO | 1.70 | 130.0 | 76.5 |
| ITO | 2.00 | 260.0 | 130.0 |
| SiO | 1.70 | 130.0 | 76.5 |
| Liquid crystal | 1.60 | — | — |

NB: main wavelength λ = 520 nm.

It is desirable that the refractive index of the thin films 141a and 141c is between 1.60 and 1.80. In the example shown in Table 6, SiO is used, at least one of the dielectric thin films 141a and 141c may also be made of $Al_2O_3$, $Y_2O_3$, MgO, $CeF_3$, $WO_3$ or $PbF_2$.

Table 7 shows an example wherein $Y_2O_3$ is used for the dielectric films 141a and 141c. Further, FIG. 19 shows the spectral reflectance of this case. As to $Y_2O_3$, the refractive index of 1.78 to 1.88 can be prepared according to deposition conditions.

TABLE 7

Anti-reflection structure

| Material | Refractive index | Optical thickness of thin film (nm) | Physical thickness of thin film (nm) |
|---|---|---|---|
| Glass substrate | 1.52 | — | — |
| $Y_2O_3$ | 1.78 | 130.0 | 73.0 |
| ITO | 2.00 | 260.0 | 130.0 |
| $Y_2O_3$ | 1.78 | 130.0 | 73.0 |
| Liquid crystal | 1.60 | — | — |

NB: main wavelength λ = 520 nm.

The reflectance of this case is a little higher for blue and red as compared with the case when $Al_2O_3$ is used for the dielectric thin films 141a and 141c.

Similarly, Table 8 shows an example wherein SiO is used for the dielectric film 141a and $Y_2O_3$ is used for the other dielectric film 141c. Further, FIG. 19 shows the spectral reflectance of this case. It is found that the reflectance is 0.1% or less over a wavelength range of visible light or a very good anti-reflection can be realized.

TABLE 8

Anti-reflection structure

| Material | Refractive index | Optical thickness of thin film (nm) | Physical thickness of thin film (nm) |
|---|---|---|---|
| Glass substrate | 1.52 | — | — |
| SiO | 1.70 | 130.0 | 76.5 |
| ITO | 2.00 | 260.0 | 130.0 |
| $Y_2O_3$ | 1.78 | 130.0 | 73.0 |
| Liquid crystal | 1.60 | — | — |

NB: main wavelength λ = 520 nm.

Further, Table 9 shows an example wherein $Al_2O_3$ is used for the dielectric film 141a and SiO is used for the other film 141c, and FIG. 19 shows the spectral reflectance of this case as a dashed line. It is found that the reflectance is 0.5% or more over a wavelength range of blue and red or the multi-layer film is not good for anti-reflection.

TABLE 9

Anti-reflection structure

| Material | Refractive index | Optical thickness of thin film (nm) | Physical thickness of thin film (nm) |
|---|---|---|---|
| Glass substrate | 1.52 | — | — |
| $Al_2O_3$ | 1.62 | 130.0 | 80.3 |
| ITO | 2.00 | 260.0 | 130.0 |
| SiO | 1.70 | 130.0 | 76.5 |
| Liquid crystal | 1.60 | — | — |

NB: main wavelength λ = 520 nm.

As explained above, a three-layer film 141 can prevent reflection. In general, a three-layer structure 141 as shown in FIG. 12 can prevent reflection better over visible light range than a two-layer structure 139 as shown in FIG. 10.

If an indium tin oxide film makes contact directly with the liquid crystal layer 33, the latter is liable to be deteriorated, and this is ascribed to impurities in the indium tin oxide film which is dissolved into the liquid crystal/resin composite layer 33. If an indium tin oxide film is isolated from the liquid crystal/resin composite layer 33 via a dielectric film as in the three-layer structure 141, the liquid crystal/resin composite is prevented from being deteriorated. This effect is observed well if the dielectric film 141c is made of $Al_2O_3$ or $Y_2O_3$.

If the dielectric film 141c is made of SiO, there is a tendency for the refractive index to decrease. This is ascribable to a very small amount of oxygen included in $H_2O$ or $O_2$ combining with SiO to form $SiO_2$. In this sense, the structures shown in Tables 6 and 9 are not good. However, SiO does not change to $SiO_2$ in a short time and SiO can be used practically in many cases.

Figure 20:
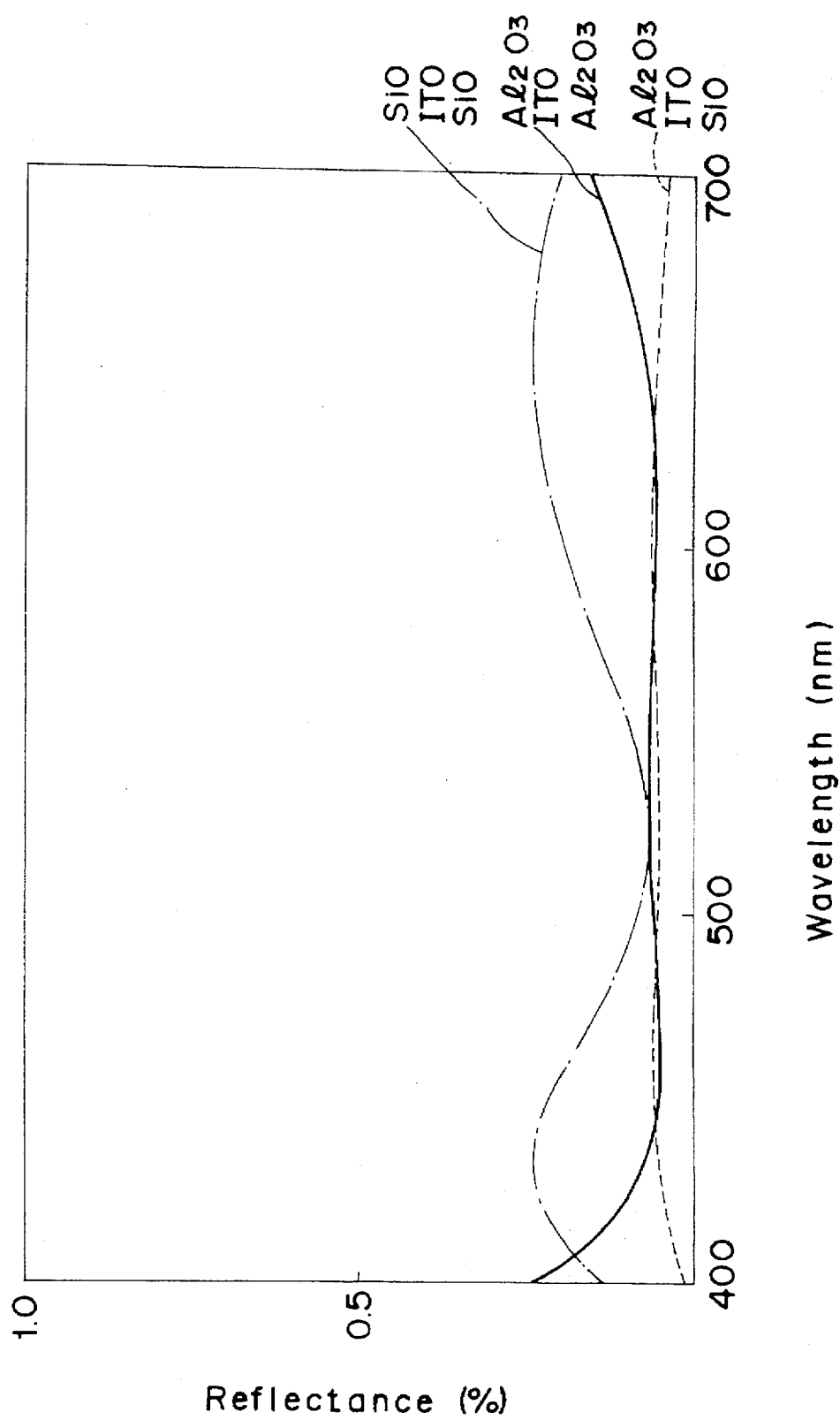
FIG. 20 is a graph of the reflection characteristic of a light valve apparatus.

The effect of a three-layer structure can be increased by decreasing the refractive index of indium tin oxide. Table 10 shows an example wherein an indium tin oxide layer 141b has a refractive index of 1.80 while the dielectric layers 141a and 141c are made of $Al_2O_3$, and FIG. 20 shows the spectral reflectance of this example.

TABLE 10

Anti-reflection structure

| Material | Refractive index | Optical thickness of thin film (nm) | Physical thickness of thin film (nm) |
|---|---|---|---|
| Glass substrate | 1.52 | — | — |
| $Al_2O_3$ | 1.62 | 130.0 | 80.3 |
| ITO | 1.80 | 260.0 | 144.4 |
| $Al_2O_3$ | 1.62 | 130.0 | 80.2 |
| Liquid crystal | 1.60 | — | — |

NB: main wavelength $\lambda$ = 520 nm.

Table 11 shows another example wherein an indium tin oxide layer 141b has a refractive index of 1.80. The dielectric layers 141a and 141c are made of $Al_2O_3$ and SiO, respectively, and FIG. 20 shows the spectral reflectance of this example. As shown in FIG. 20, a reflectance of 0.1% or less can be realized in the visible light range.

TABLE 11

Anti-reflection structure

| Material | Refractive index | Optical thickness of thin film (nm) | Physical thickness of thin film (nm) |
|---|---|---|---|
| Glass substrate | 1.52 | — | — |
| $Al_2O_3$ | 1.62 | 130.0 | 80.3 |
| ITO | 1.80 | 260.0 | 144.4 |
| SiO | 1.70 | 130.0 | 76.5 |
| Liquid crystal | 1.60 | — | — |

NB: main wavelength $\lambda$ = 520 nm.

If either or both of a dielectric layer formed between the counterelectrode substrate 132 and the indium tin oxide layer and a dielectric layer formed between the indium tin oxide layer and the liquid crystal layer is selected, a multi-layer structure can be made from an alternating arrangement of low refractive index layers and high refractive index layers wherein the high and low refractive indices are set around the refractive index required by Eq. (20) or (25). If the film thicknesses of the multi-layers are optimized, a film of desired refractive index can be selected and a desired anti-reflection characteristic can be realized. This method enlarges the range of the selection of materials for the films and it is also advantageous with regard to the stability of materials, the life, the homogeneity and the ease of fabrication. In the equivalent film, the optical thickness of the indium tin oxide layer is $\lambda/2$ according to Eq. (21) or (26). This type of multi-layer is called an equivalent film.

Figure 21:
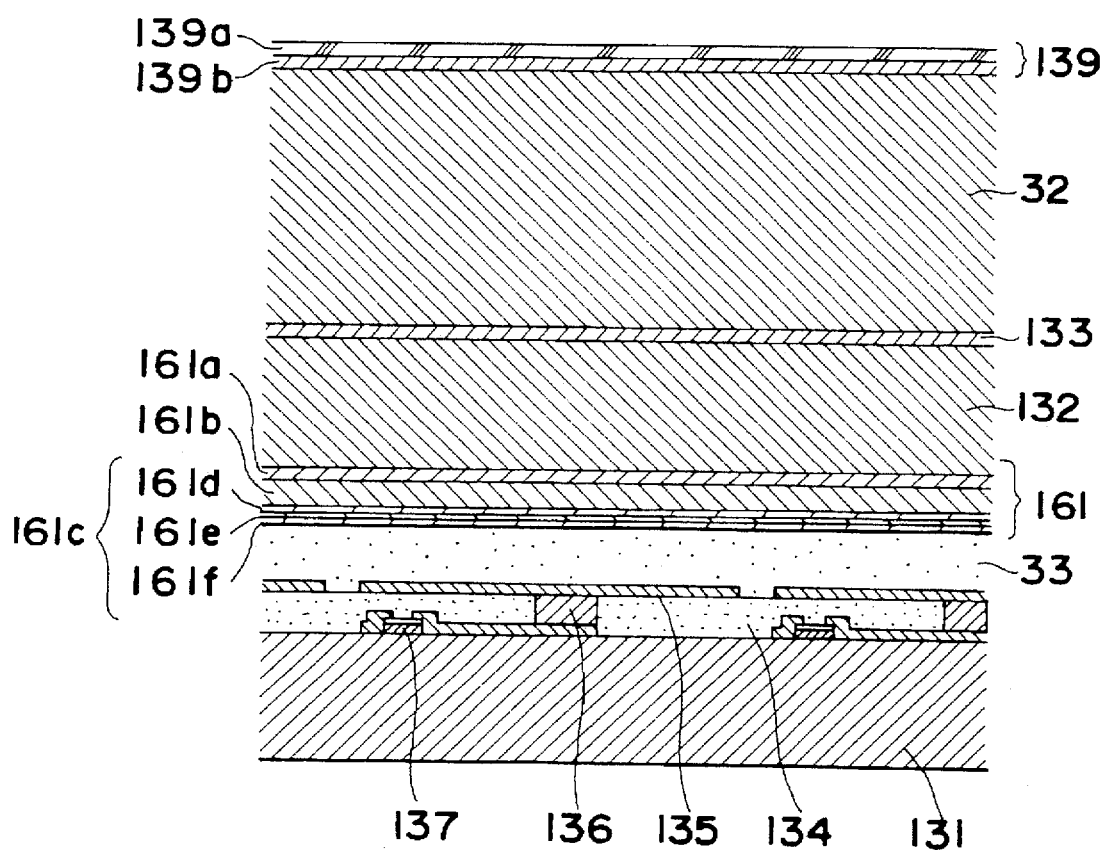
FIG. 21 is a schematic partial sectional view of a light valve apparatus.
Figure 22:
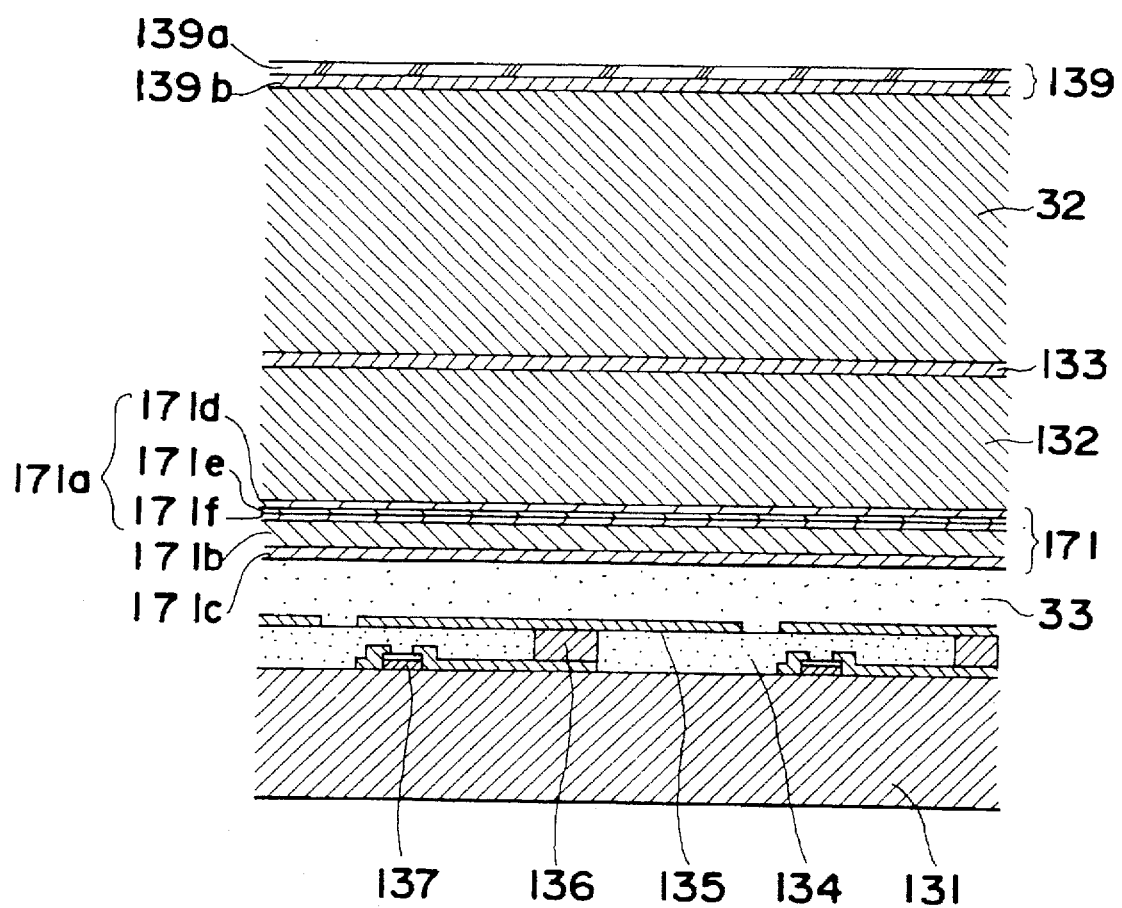
FIG. 22 is a schematic partial sectional view of a light valve apparatus.
Figure 23:
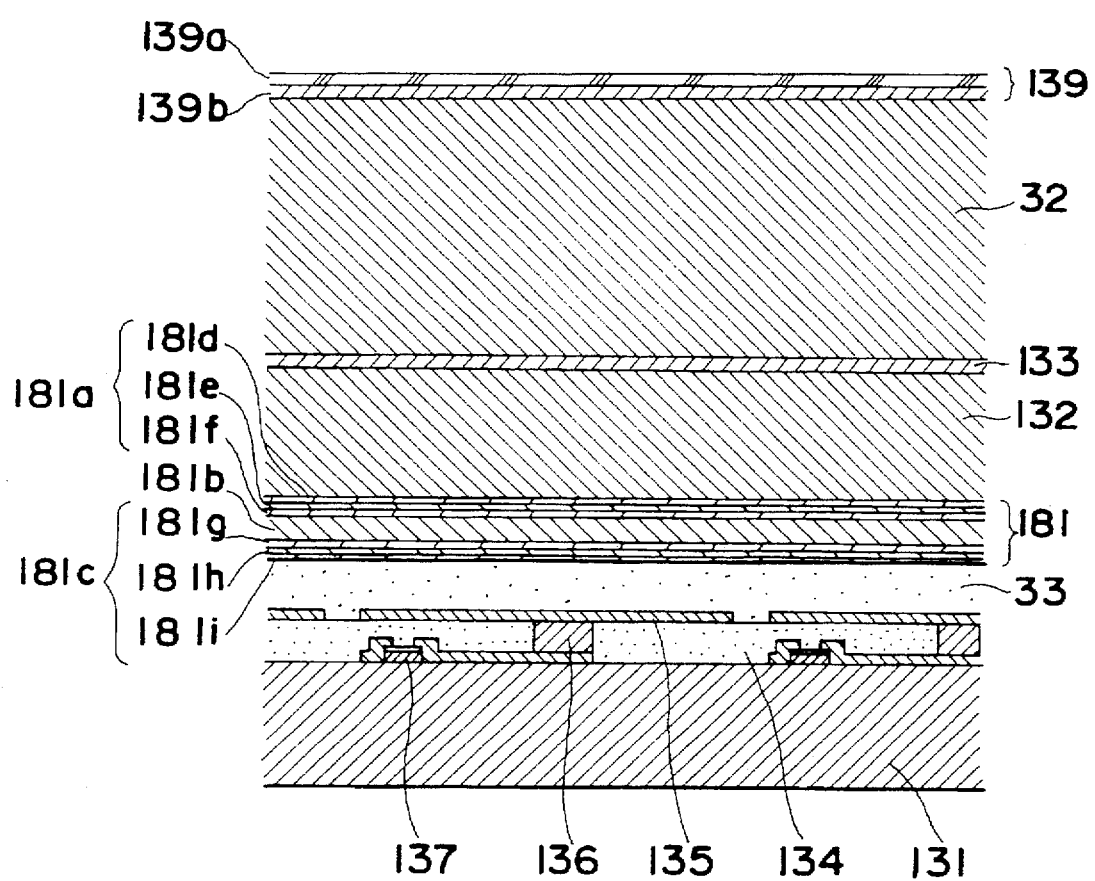
FIG. 23 is a schematic partial sectional view of a light valve apparatus.

FIGS. 21, 22 and 23 show light valve apparatuses using equivalent films. The structures of the light valves are the same as those shown in FIGS. 10 and 12 except for the anti-reflection counterelectrodes 161, 171 and 181.

Figure 24:
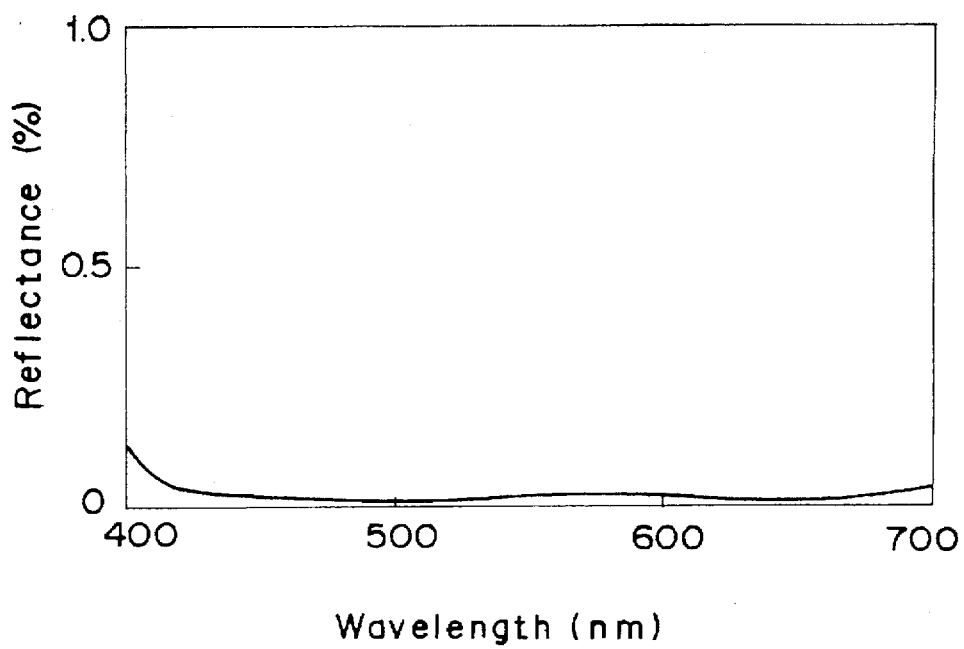
FIG. 24 is a graph of the reflection characteristic of a light valve apparatus.
Figure 25:
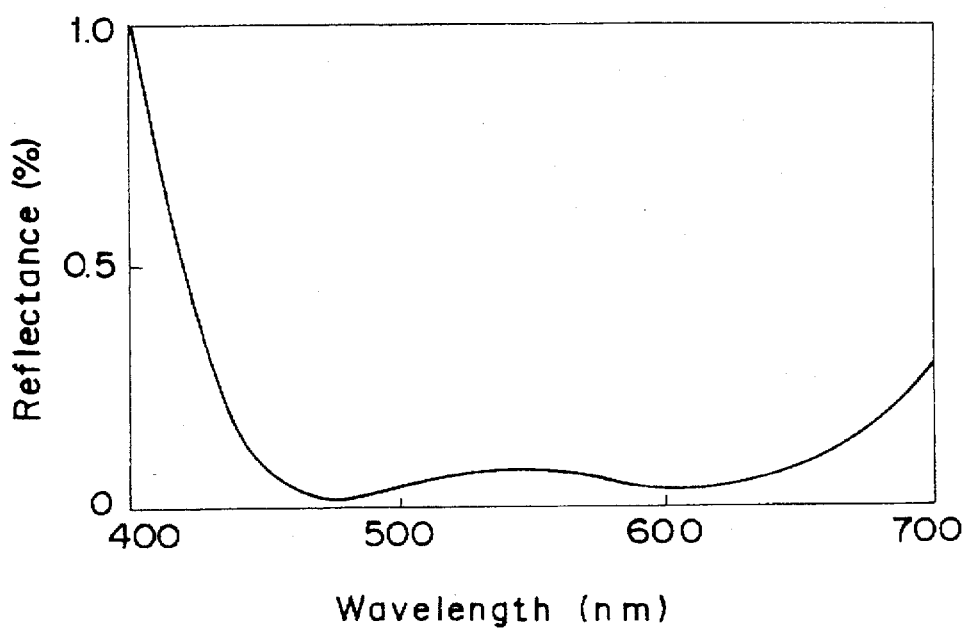
FIG. 25 is a graph of the reflection characteristic of a light valve apparatus.

The anti-reflection counterelectrode 161 shown in FIG. 21 comprises a first dielectric thin film 161a, an indium tin oxide film used as a counterelectrode 161b and a second dielectric thin film 161c, and the second dielectric thin film 161c further comprises three layers consisting of a low refractive index layer 161d, a high refractive index layer 161e and another low refractive index layer 161f. The optical thickness of the indium tin oxide thin film is $\lambda/2$, and that of the first thin film 161a is $\lambda/4$. Examples of the structures of anti-reflection counterelectrode 161 are shown in Tables 12 and 13, while FIGS. 24 and 25 show optical reflectances of these examples. It is found that a reflectance of 0.1% or less can be realized over a wavelength range of 200 nm or more, and very good anti-reflection effects can be obtained.

In the structure shown in FIG. 21, the second film 161c comprises three layers consisting of a low refractive index layer 161d, a high refractive index layer 161e and another low refractive index layer 161f, and the thicknesses of the dielectric thin films are optimized. Thus, the refractive indices of the low refractive index layers 161d and 161f, the high refractive index layer 161e and the first dielectric thin film 161a are selected from materials having any refractive index and the desired anti-reflection effect can also be realized easily.

TABLE 12

Anti-reflection structure

| Material | Refractive index | Optical thickness of thin film (nm) | Physical thickness of thin film (nm) |
|---|---|---|---|
| Glass substrate | 1.52 | — | — |
| SiO | 1.70 | 135.0 | 79.4 |
| ITO | 2.00 | 270.0 | 135.0 |
| $Al_2O_3$ | 1.62 | 55.4 | 34.2 |
| $ZrO_2$ | 2.05 | 23.0 | 11.2 |
| $Al_2O_3$ | 1.62 | 55.4 | 34.2 |
| Liquid crystal | 1.60 | — | — |

NB: main wavelength $\lambda$ = 540 nm.

TABLE 13

Anti-reflection structure

| Material | Refractive index | Optical thickness of thin film (nm) | Physical thickness of thin film (nm) |
|---|---|---|---|
| Glass substrate | 1.52 | — | — |
| $Y_2O_3$ | 1.78 | 110.0 | 61.8 |
| ITO | 2.00 | 220.0 | 110.0 |

TABLE 13-continued

Anti-reflection structure

| Material | Refractive index | Optical thickness of thin film (nm) | Physical thickness of thin film (nm) |
|---|---|---|---|
| SiO$_2$ | 1.46 | 44.0 | 30.1 |
| TiO$_2$ | 2.30 | 33.0 | 14.4 |
| SiO$_2$ | 1.46 | 33.4 | 22.6 |
| Liquid crystal | 1.60 | — | — |

NB: main wavelength λ = 520 nm.

The anti-reflection counterelectrode 171 shown in FIG. 22 comprises a first dielectric thin film 171a, an indium tin oxide film used as a counterelectrode 171b and a second dielectric thin film 171c, and the first film 171a comprises three layers consisting of a low refractive index layer 171d, a high refractive index layer 171e and another low refractive index layer 171f, and the thicknesses of the dielectric thin films are optimized. The optical thickness of the indium tin oxide film 171b is λ/2 and that of the second dielectric thin film 171c is λ/4.

Figure 26:
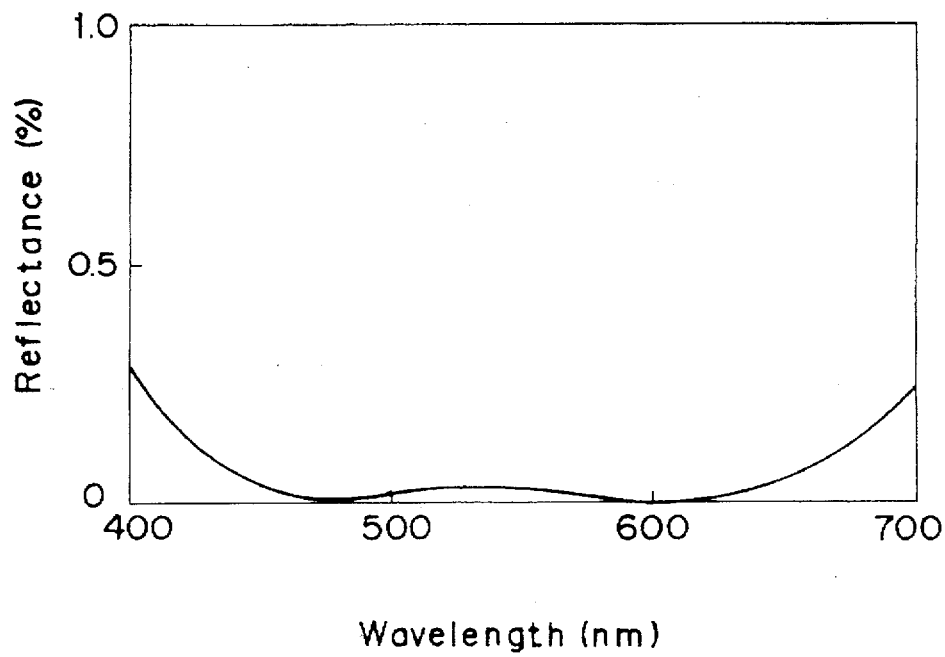
FIG. 26 is a graph of the reflection characteristic of a light valve apparatus.
Figure 27:
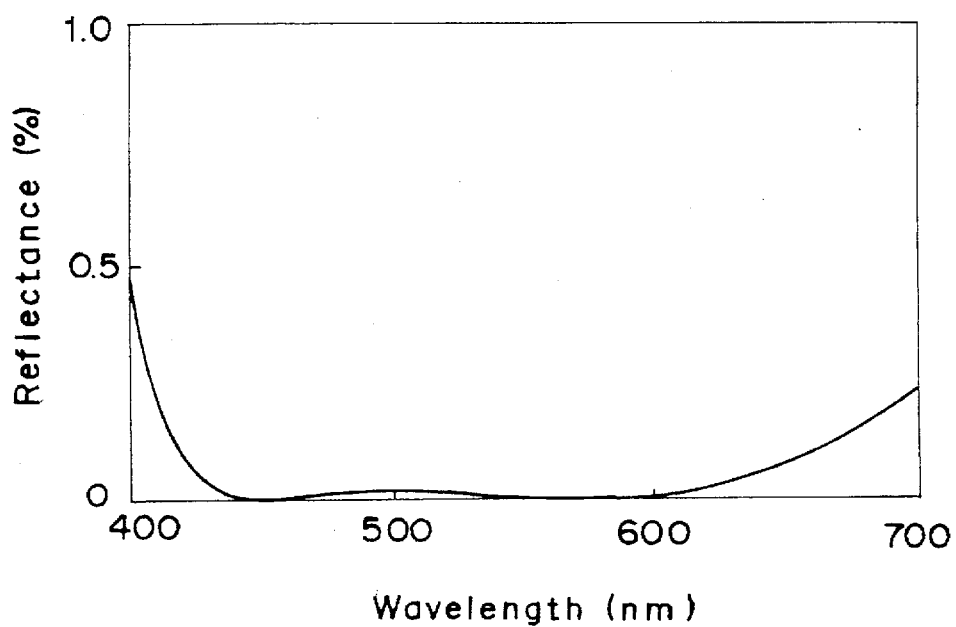
FIG. 27 is a graph of the reflection characteristic of a light valve apparatus.

Examples of the structures of anti-reflection counterelectrode 171 are shown in Tables 14 and 15, while FIGS. 26 and 27 show the optical reflectances of these examples. It is found that a reflectance of 0.1% or less can be realized over a wavelength range of 200 nm or more, and very good anti-reflection effects can be obtained.

In the structure shown in FIG. 22, the first dielectric thin film 171a comprises three layers consisting of a low refractive index layer 171d and a high refractive index layer 171e and another low refractive index layer 171f, and the thicknesses of the dielectric thin films are optimized. Thus, the refractive indices of the low refractive index layers 171d, 171f, the high refractive index layer 171e and the first dielectric thin film 171a are selected from materials having any refractive index and the desired anti-reflection effect can also be realized easily.

TABLE 14

Anti-reflection structure

| Material | Refractive index | Optical thickness of thin film (nm) | Physical thickness of thin film (nm) |
|---|---|---|---|
| Glass substrate | 1.52 | — | — |
| Al$_2$O$_3$ | 1.62 | 44.0 | 27.2 |
| ZrO$_2$ | 2.05 | 17.6 | 8.6 |
| Al$_2$O$_3$ | 1.62 | 55.0 | 34.0 |
| ITO | 2.00 | 220.0 | 110.0 |
| Y$_2$O$_3$ | 1.78 | 110.0 | 70.2 |
| Liquid crystal | 1.60 | — | — |

NB: main wavelength λ = 540 nm.

TABLE 15

Anti-reflection structure

| Material | Refractive index | Optical thickness of thin film (nm) | Physical thickness of thin film (nm) |
|---|---|---|---|
| Glass substrate | 1.52 | — | — |
| SiO$_2$ | 1.46 | 57.4 | 39.3 |

TABLE 15-continued

Anti-reflection structure

| Material | Refractive index | Optical thickness of thin film (nm) | Physical thickness of thin film (nm) |
|---|---|---|---|
| TiO$_2$ | 2.30 | 25.2 | 11.0 |
| SiO$_2$ | 1.46 | 57.4 | 39.3 |
| ITO | 2.00 | 280.0 | 140.0 |
| SiO | 1.70 | 140.0 | 82.4 |
| Liquid crystal | 1.60 | — | — |

NB: main wavelength λ = 560 nm.

In the structures shown in FIGS. 21 and 22, it is desirable that the refractive index of the low refractive index layer be between 1.3 and 1.7 while that of the high refractive index layer be between 1.7 and 2.3. The materials for the low refractive index layers 161d, 161f, 171d, and 171f may be MgF$_2$, CeF$_2$, SiO or the like besides the above-mentioned Al$_2$O$_3$ and SiO$_2$. The material for the high refractive index layer 161e, 171e may be Y$_2$O$_3$, HfO$_2$, Ta$_2$O$_5$, CeO$_2$, ZnS or the like besides ZrO$_2$ and TiO$_2$ mentioned above. It is desirable that the refractive index of the dielectric thin films 161a and 171c be between 1.6 and 1.8, and it may be Al$_2$O$_3$, MgO, WO$_3$, CeF$_3$, PbF$_2$ or the like besides Y$_2$O$_3$ and SiO mentioned above.

The three-layer thin films 161c and 171a may also be constructed in the order of a first high refractive index layer, a low refractive index layer and a second high refractive index layer. Furthermore, the thin films 161c and 171a may be composed of two layers or four or more layers, besides the above-mentioned three-layer structure.

Figure 28:
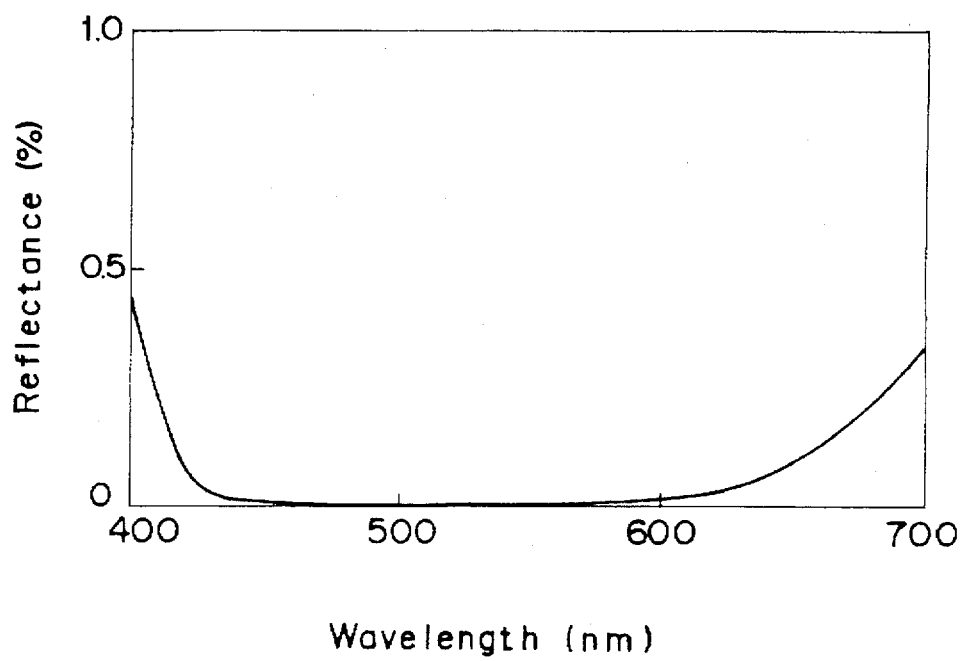
FIG. 28 is a graph of the reflection characteristic of a light valve apparatus.
Figure 29:
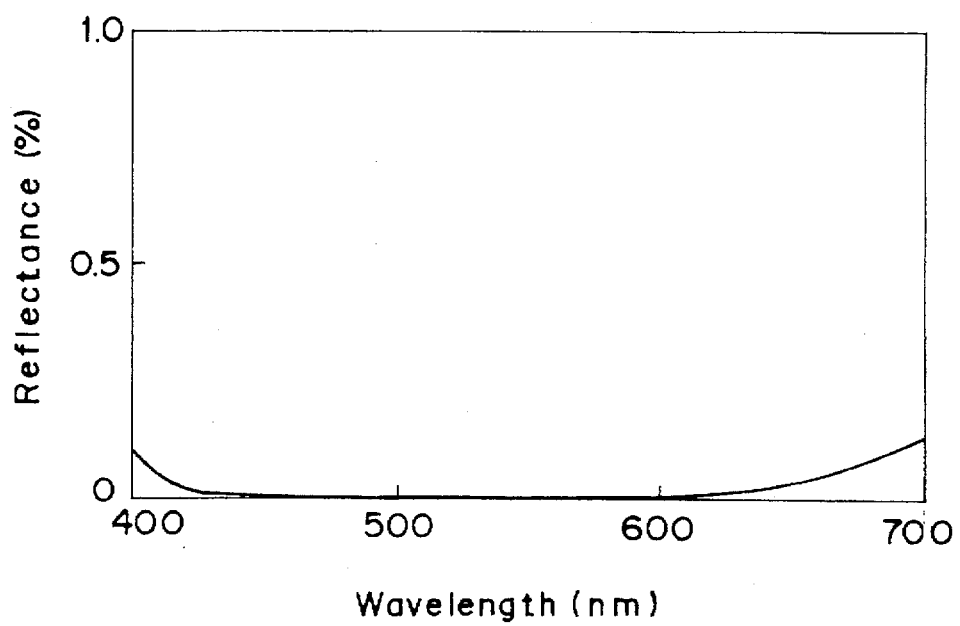
FIG. 29 is a graph of the reflection characteristic of a light valve apparatus.
Figure 30:
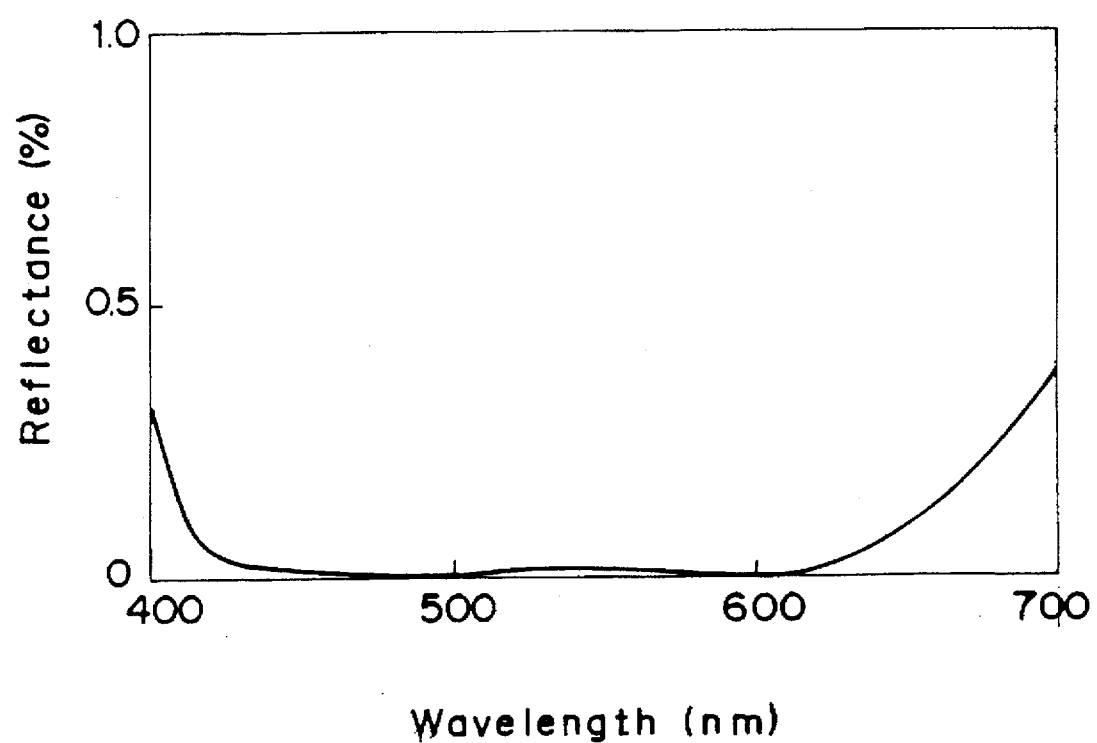
FIG. 30 is a graph of the reflection characteristic of a light valve apparatus.

FIG. 23 shows the anti-reflection counterelectrode 181 comprises a first dielectric thin film 181a, an indium tin oxide film as a counterelectrode 181b and a second dielectric thin film 181c. The first dielectric thin film 181a further comprises three layers consisting of a low refractive index layer 181d, a high refractive index layer 181e and another low refractive index layer 181f, while the second dielectric thin film 181c further comprises three layers consisting of a low refractive index layer 181g, a high refractive index layer 181h and another low refractive index layer 181i. The optical thickness of the indium tin oxide thin film is λ/2, and that of the first thin film 161a is λ/4. Examples of the structures of anti-reflection counterelectrode 181 are shown in Tables 16, 17 and 18, while FIGS. 28, 29 and 30 show optical reflectances of these examples. It is found that a reflectance of 0.1% or less can be realized over a wavelength range of 200 nm or more, and very good anti-reflection effects can be obtained.

TABLE 16

Anti-reflection structure

| Material | Refractive index | Optical thickness of thin film (nm) | Physical thickness of thin film (nm) |
|---|---|---|---|
| Glass substrate | 1.52 | — | — |
| SiO$_2$ | 1.46 | 63.0 | 43.2 |
| TiO$_2$ | 2.30 | 24.0 | 10.4 |
| SiO$_2$ | 1.46 | 63.0 | 43.2 |
| ITO | 2.00 | 300.0 | 150.0 |
| SiO$_2$ | 1.46 | 61.5 | 42.1 |
| TiO$_2$ | 2.30 | 27.0 | 11.7 |

TABLE 16-continued

Anti-reflection structure

| Material | Refractive index | Optical thickness of thin film (nm) | Physical thickness of thin film (nm) |
|---|---|---|---|
| SiO$_2$ | 1.46 | 61.5 | 42.1 |
| Liquid crystal | 1.60 | — | — |

NB: main wavelength λ = 600 nm.

TABLE 17

Anti-reflection structure

| Material | Refractive index | Optical thickness of thin film (nm) | Physical thickness of thin film (nm) |
|---|---|---|---|
| Glass substrate | 1.52 | — | — |
| Al$_2$O$_3$ | 1.46 | 60.8 | 37.5 |
| ZrO$_2$ | 2.05 | 13.5 | 8.6 |
| Al$_2$O$_3$ | 1.62 | 60.8 | 37.5 |
| ITO | 2.00 | 270.0 | 135.0 |
| Al$_2$O$_3$ | 1.62 | 56.7 | 35.0 |
| ZrO$_2$ | 2.05 | 21.6 | 10.5 |
| Al$_2$O$_3$ | 1.62 | 56.7 | 35.0 |
| Liquid crystal | 1.60 | — | — |

NB: main wavelength λ = 540 nm.

TABLE 18

Anti-reflection structure

| Material | Refractive index | Optical thickness of thin film (nm) | Physical thickness of thin film (nm) |
|---|---|---|---|
| Glass substrate | 1.52 | — | — |
| MgF$_2$ | 1.39 | 42.0 | 30.2 |
| Y$_2$O$_3$ | 1.78 | 66.0 | 37.1 |
| MgF$_2$ | 1.39 | 42.0 | 30.2 |
| ITO | 2.00 | 300.0 | 150.0 |
| MgF$_2$ | 1.39 | 36.0 | 25.9 |
| Y$_2$O$_3$ | 1.78 | 78.0 | 43.8 |
| MgF$_2$ | 1.39 | 36.0 | 25.9 |
| Liquid crystal | 1.60 | — | — |

NB: main wavelength λ = 600 nm.

In the structure shown in FIG. 23, the first dielectric film 181a and the second dielectric film 181c comprise three layers consisting of low refractive index layers and a high refractive index layer, and the thicknesses of the dielectric thin films are optimized. Thus, the refractive indices of the low refractive index layers 181d, 181f, 181g, and 181i and the high refractive index layers 181e and 181h are selected from materials having any refractive index and the desired anti-reflection effect can also be realized easily.

In the structures shown in FIG. 23, it is desirable that the refractive index of the low refractive index layers be between 1.3 and 1.7 while that of the high refractive index layers be between 1.7 and 2.3. The materials for the low refractive index layers 181d, 181f, 181g, and 181i may be CeF$_2$, SiO or the like besides the above-mentioned Al$_2$O$_3$, SiO$_2$ and MgF$_2$. The material for the high refractive index layers 181e and 181h may be HfO$_2$, Ta$_2$O$_5$, CeO$_2$, ZnS or the like besides ZrO$_2$, TiO$_2$ and Y$_2$O$_3$ mentioned above. The low and high refractive index materials used in the first dielectric film 181a may be different from those used in the second dielectric film 181c.

The three-layer thin film 181a and 181c may also be constructed in the order of a first high refractive index layer, a low refractive index layer and a second high refractive index layer. Further, the thin films 161c and 171a may be composed of two layers or four or more layers, besides the above-mentioned three-layer structure.

When each layer of a multi-layer anti-reflection film is prepared by deposition, the deposition can proceed by monitoring the reflectance at a specified wavelength, and thus, the thickness can be controlled easily. Therefore, a multi-layer film for preventing reflection at an interface can be produced easily.

Figure 31:
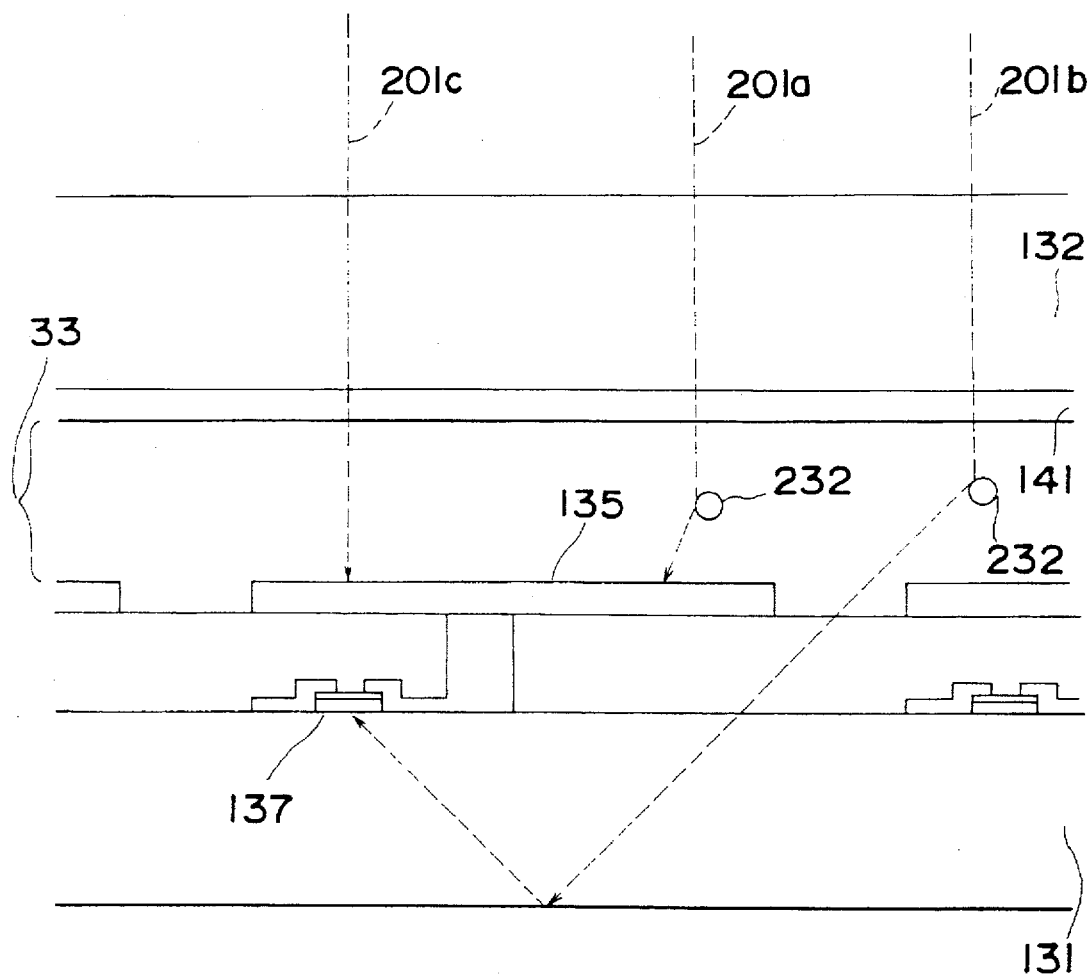
FIG. 31 is a schematic partial sectional view explanatory of a prior art light valve.

One of the problems is that the leakage of light to the thin film transistors causes the photoconductor phenomenon so as to decrease the display contrast. The photoconductor phenomenon is when the thin film transistors are turned on by the irradiation onto the semiconductor layer in the thin film transistors, and it is liable to happen especially if the semiconductor layer is made of amorphous silicon. In light valve apparatuses wherein the reflection electrodes 135 are formed, the incident light does not directly enter the thin film transistors, as light beams 201a and 201c shown in FIG. 31. However, the incident light beam 201b may enter into the array substrate 131 after the scattering at the liquid crystal layer 33 and may enter onto the thin film transistors 137 after being reflected at the interface between the array substrate 131 and air. The amount of leakage of light between the reflection electrodes is large, and the light modulation in the liquid crystal layer can be monitored from the rear side of the array substrate. The photoconductor phenomenon is not as great if the thin film transistors comprise a polysilicon layer. However, if the thin film transistors comprise an amorphous silicon layer, it is necessary to sufficiently prevent the photoconductor phenomenon.

Figure 32:
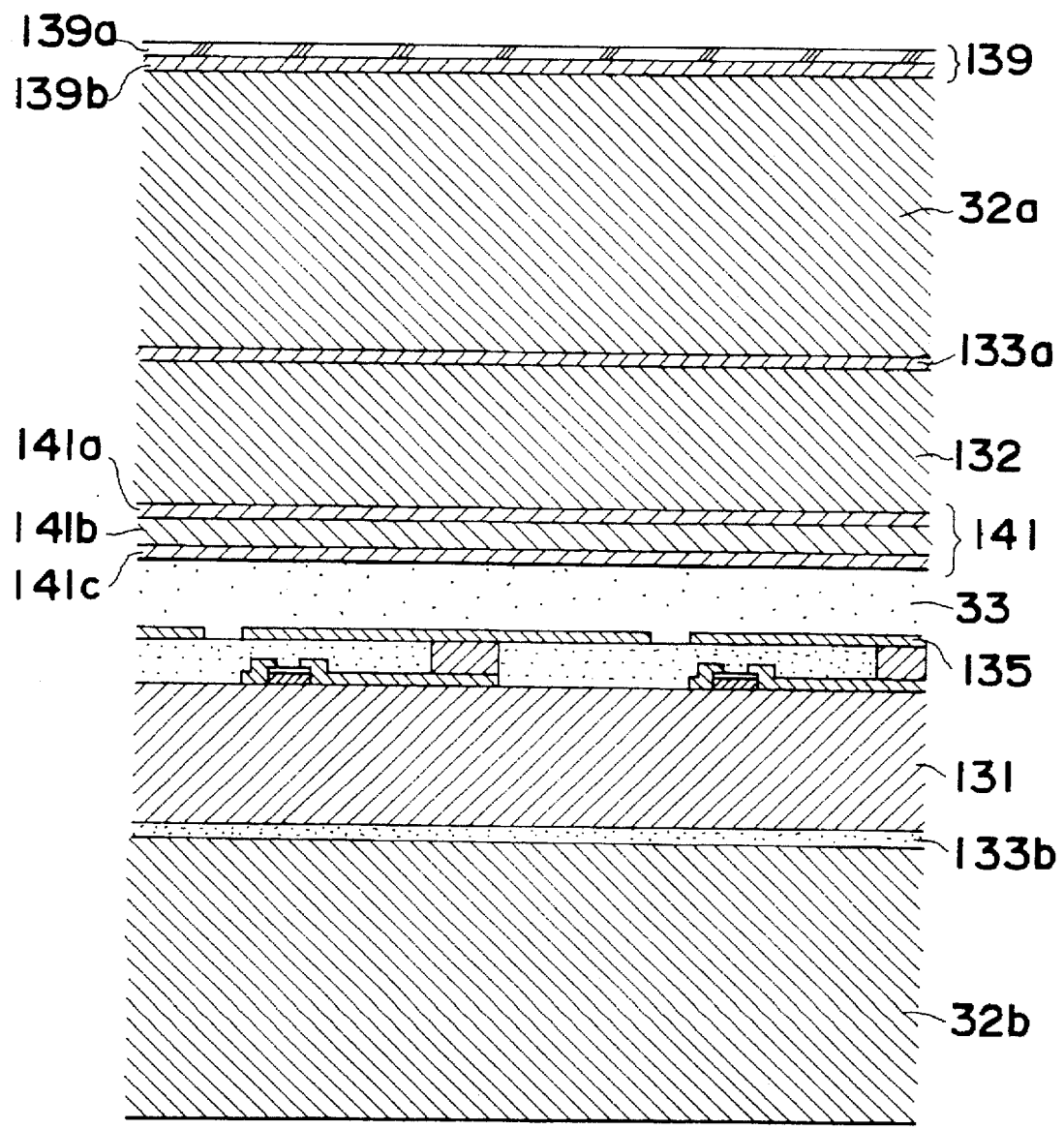
FIG. 32 is a schematic partial sectional view explanatory of a light valve apparatus.
Figure 33:
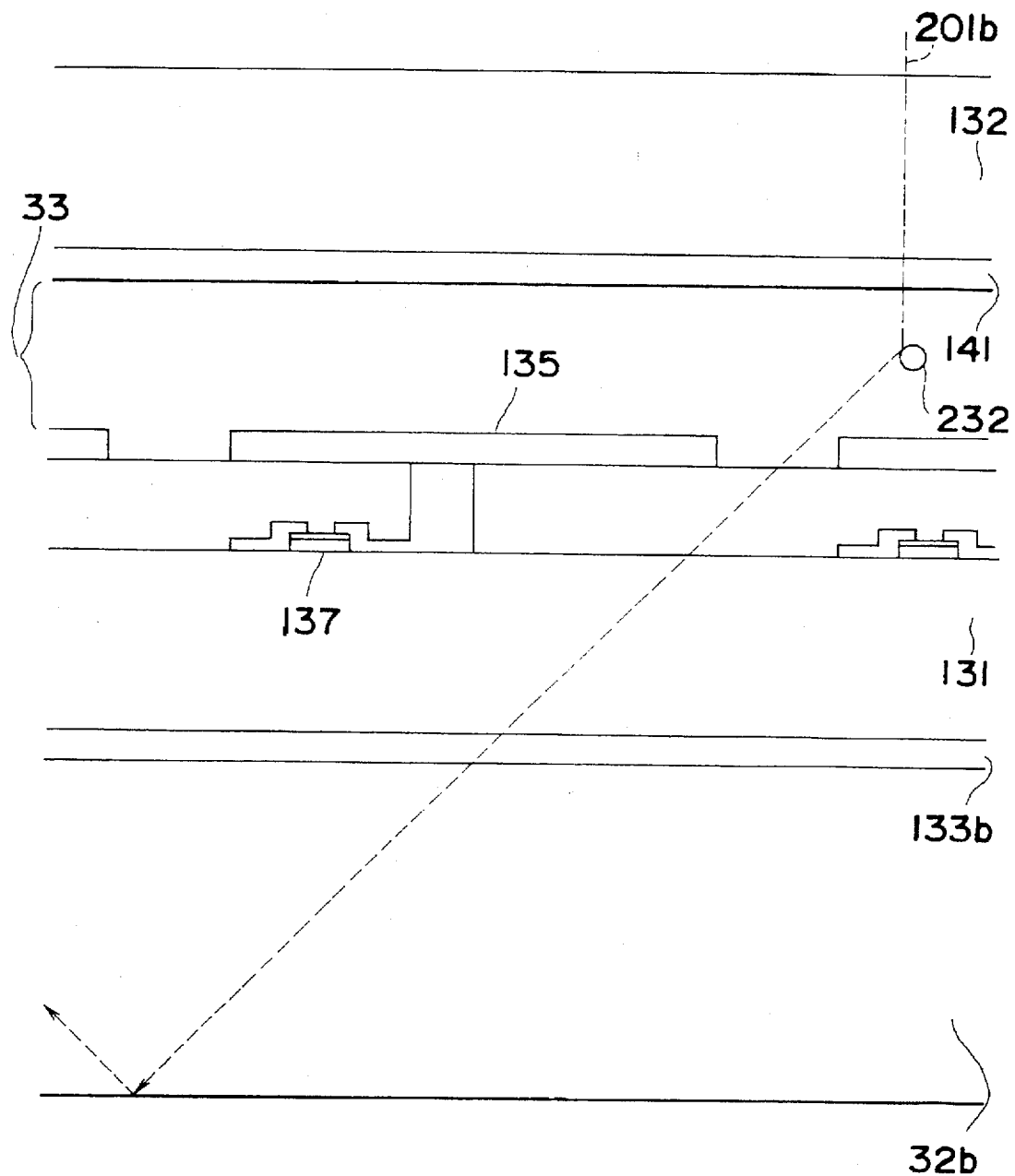
FIG. 33 is a schematic partial sectional view of a light valve.

In order to prevent the photoconductor phenomenon, a transparent plate 32b is provided at the rear side of the array substrate 131 in a light valve apparatus shown in FIG. 32. That is, this light valve apparatus is different from that shown in FIG. 12 with regard to the transparent plate 32b adhered via a optical-coupling layer 133b to the array substrate 131. Furthermore, a light-absorbing film (not shown) is formed on the ineffective area of the transparent plate 32b. The total thickness "d" between the surface in contact with air of the transparent substrate 32b and the plane of the array substrate 131 on which the thin film transistors are formed is selected to satisfy Eq. (17), almost all light entering into the array substrate 131 between the reflection electrodes 135 as shown in FIG. 33 is absorbed by the light-absorbing film even if the light is reflected by the interface of the transparent plate 32b with air. Thus, the photoconductor phenomenon can be prevented. It is understood that the transparent plate may be a concave lens as shown in FIG. 6.

Figure 34:
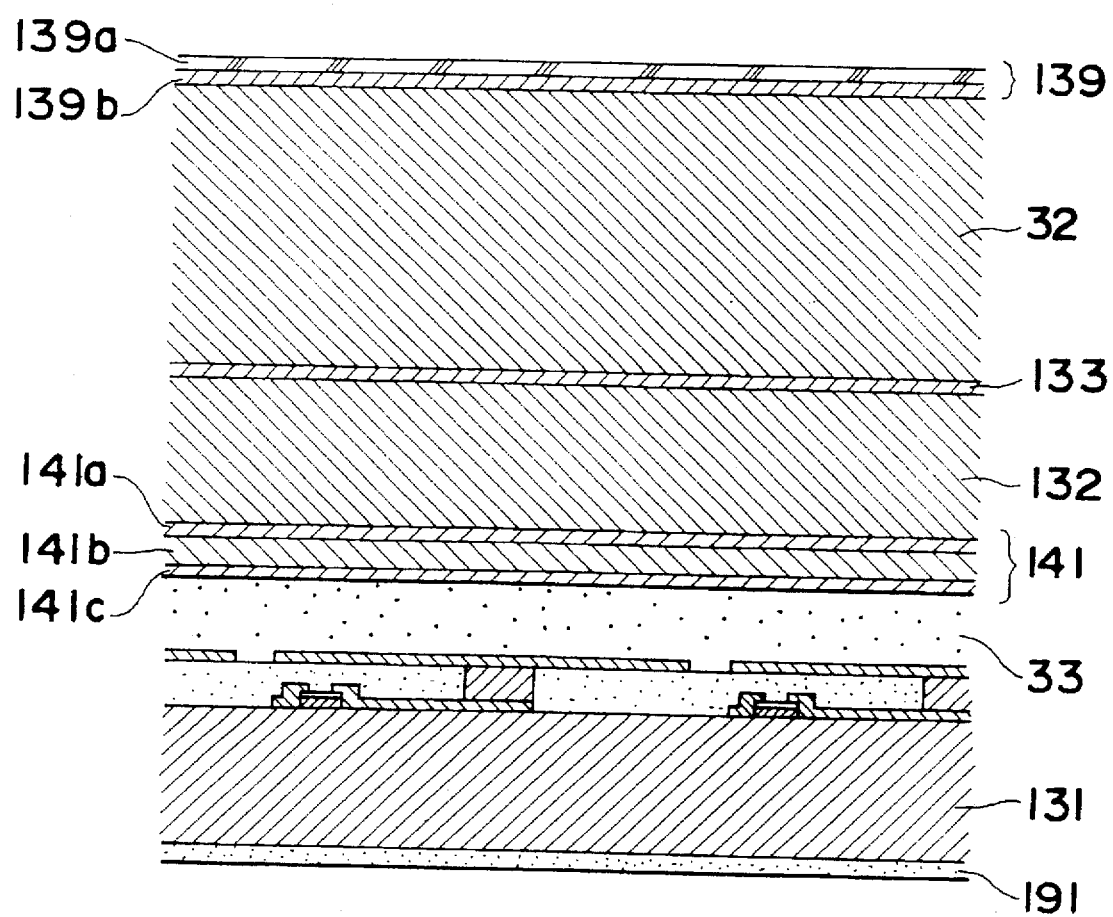
FIG. 34 is a schematic partial sectional view of a light valve apparatus.

In order to prevent the photoconductor phenomenon, a light valve apparatus shown in FIG. 34 provides a light-absorbing film 191 on the array substrate on the surface in contact with air. The light-absorbing film 191 is applied to the array substrate 131 after the surface of the array substrate 131 is made coarse with sand used to grind a lens. The light-absorbing film 191 may be a paint made of an acrylic resin with dispersed carbon. Because it is formed on the surface of the array substrate 131, almost any paint may be used. The color of the light-absorbing film 191 is not limited to black, and can have any color which can absorb the light modulated by the light valve. For example, pigments which have a color complement of the light modulated by a light valve apparatus may be impregnated. If blue is modulated, a yellow light-absorbing film 191 may be used.

Next, projection display systems according to the present invention are explained. Liquid crystal panels as explained above can be used as light valves for a projection display system.

Figure 35:
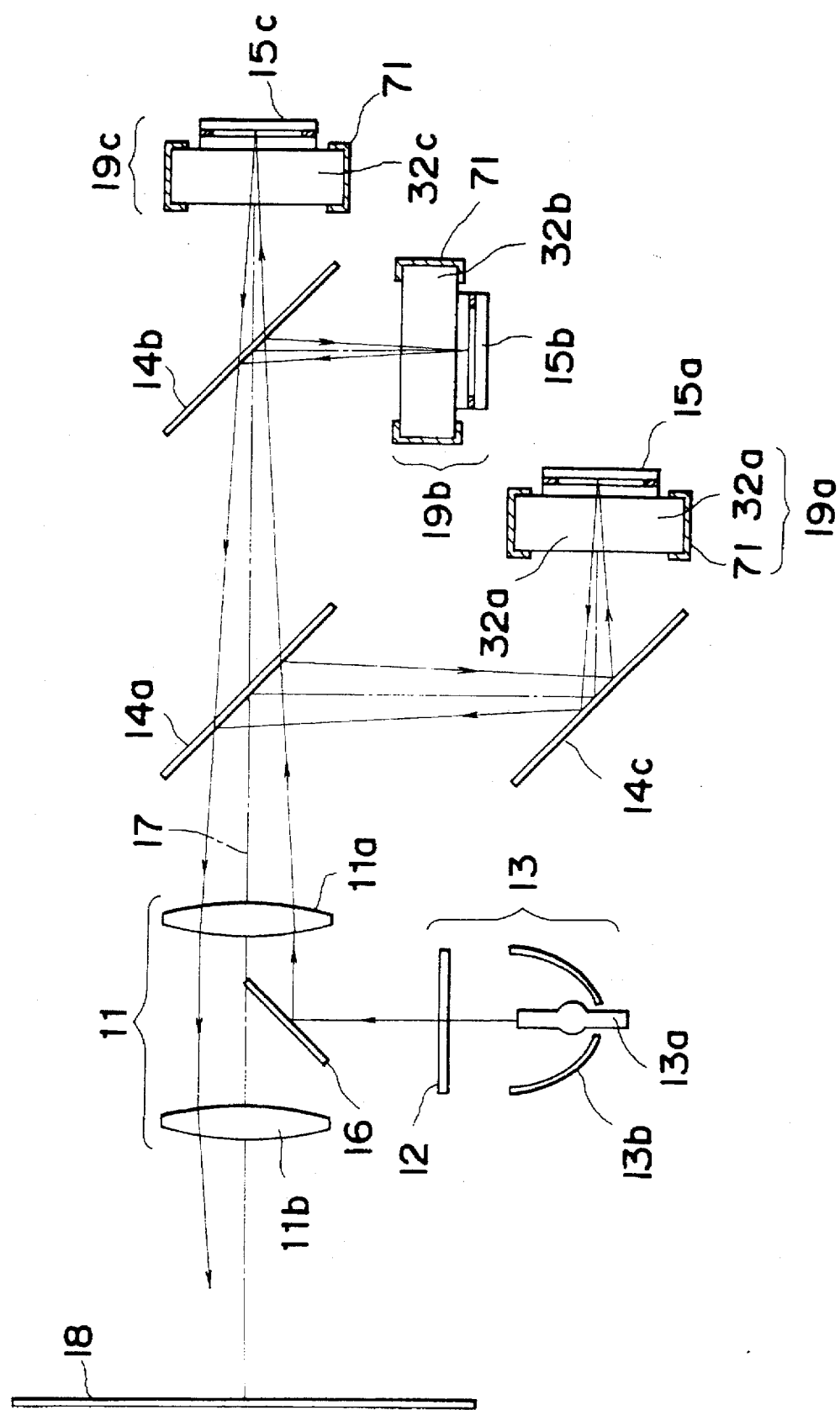
FIG. 35 is a schematic sectional view of a projection display system.

FIG. 35 shows a projection display system wherein reflection type light valve apparatuses 19a, 19b and 19c are employed for green, blue and red. The light valve apparatuses 19a, 19b and 19c consist of liquid crystal panels 15a, 15b and 15c with transparent plates 32a, 32b and 32c and light absorbing films 71 applied to the ineffective display area. Further, anti-reflection films of the V-coat type (not shown) are formed on the surface of the transparent plates 32a, 32b and 32c. A light source 13 comprises a metal halide lamp 13a, a concave mirror 13b and a filter 12. The metal halide lamp 13a generates light including red, green and blue components. The concave mirror 13b is made of glass, and a multi-layer film for reflecting visible light and transmitting infrared and ultraviolet rays are deposited on a reflection surface of the mirror. The visible components included in the light emitted from the lamp 13a are reflected on the reflection surface of the concave mirror 13b, and infrared and ultraviolet components are removed by the filter 12 from the light reflected on the concave mirror 13b.

The projection lens 11 is comprised of a first lens group 11a disposed on the side of the light valve apparatuses 19a, 19b and 19c and a second lens group 11b disposed on the side of a screen 18. Between the first and second lens groups 11a, 11b is provided a plane mirror 16. Scattered light emitted from a pixel located at the center of each liquid crystal panel 19a, 19b, 19c is transmitted through the first lens group 11a, where a lower half of the light with respect to the optical axis 17 in the drawing is incident on the plane mirror 16, and the remaining light is incident on the second lens group 11b instead of the plane mirror 16. The normal of the plane mirror 16 is inclined at an angle of 45° with respect to the optical axis 17 of the projection lens 11.

The light emitted from the light source 13 is reflected on the plane mirror 16 and transmitted through the first lens group 11a to be incident on the transparent plate 32a, 32b, 32c and to reach the liquid crystal panel 15a, 15b, 15c. Light reflected by the liquid crystal panel 15a, 15b, 15c is transmitted through the transparent plate 32a, 32b, 32c, the first lens group 11a and the second lens group 11b successively to reach the screen 18. The optical system is designed in such a manner that a light beam emitted from the center portion of the projection lens 11 and directed along the optical axis 17 enters the liquid crystal panel 15a, 15b, 15c approximately perpendicularly, i.e., in a telecentric manner.

The light valve apparatuses 19a, 19b and 19c of reflection type are used in the projection display system. In order to improve the display contrast, the scattering gain has to be decreased. The scattering gain can be decreased by thickening the liquid crystal layer. However, this increases the voltage needed to realize the transparent state or it is necessary to increase the output voltage of the drive circuit. This in turn makes it difficult to keep the temperature of the liquid crystal layer uniform due to the heat generated by the drive circuit and deteriorates the quality of the image. In case of a light valve of the reflection type, light passes through the liquid crystal layer twice, and the scattering characteristic can be improved as compared with a light valve of the transmission type having a liquid crystal layer of the same thickness. That is, a light valve of the reflection type is more suitable than a light valve of the transmission type.

The dichroic mirrors 14a, 14b and 14c concurrently serve both as a color synthesis system and as a color separation system. White light emitted from the light source 13 is reflected by the plane mirror 16 to be incident on the first group 11a of the projection lens 11. Unnecessary light components are cut off by the filter 12 having a half bandwidth of 430 nm to 690 nm. Hereinafter, each optical band is represented by its half bandwidth value. The dichroic mirror 14a reflects the green component and transmits the red and blue components. The green component is subjected to eliminate a band by the dichroic mirror 14c to be incident on the light valve apparatus 19a. The band of the green component is 510 to 570 nm. On the other hand, the dichroic mirror 14b reflects the blue component and transmits the red component. Similarly, the blue component is incident on the light valve apparatus 19b, while the red component is incident on the light valve apparatus 165a. The blue component has a band of 430 to 490 nm, while the red component has a band of 600 to 690 nm. Each light valve apparatus 19a, 19b and 19c forms an optical image by changing the scattering state of light according to video signals. Optical images formed by the light valve apparatuses 19a, 19b and 19c of the three colors are synthesized by the dichroic mirrors 14a and 14b, 14c and then enlarged and projected by the projection lens 11 on the screen 18.

The dichroic mirror 14a used in FIG. 35 is a bandpass filter. However, a bandpass filter is expensive and has poor characteristics. If the light valve apparatuses 19a, 19b and 19c are used to modulate red, green and blue, all dichroic mirrors 14a, 14b and 14c may be lowpass filters. In this example, the dichroic mirror 14a reflects red, and the reflected light is next reflected by the dichroic mirror 14c to restrict the bandwidth to enhance the pureness. The pureness of red greatly affects the image quality. The dichroic mirror 14b reflects green and transmits blue. Thus, the dichroic mirrors separate white light into three primary colors.

In a projection display system using prior art light valves, five or six dichroic mirrors are needed. Projection display systems of the present invention as shown in FIG. 35 use a color synthesis and separation system using three dichroic mirrors 14a, 14b and 14c. Therefore, the optical system can be constructed compactly and with a lower cost. The dichroic mirror may be a dichroic filter or a dichroic prism. The dichroic mirrors are arranged obliquely against the optical axis.

Furthermore, because reflection type light valves are used, the contrast is better as compared with transmission type light valves. Because a liquid crystal/resin composite is used, no polarization plates are needed and the aperture ratio is high. Therefore, an image of high contrast and high brightness can be displayed. Furthermore, since no obstacle exists behind the light valve, the light valve can be cooled easily. For instance, a forced air cooling from behind the light valve can be easily utilized, or a heat sink or the like can be easily attached to the rear surface of the light valve. Further, as shown in FIG. 34, the light-absorbing film 191 may be provided at the rear side.

Figure 36:
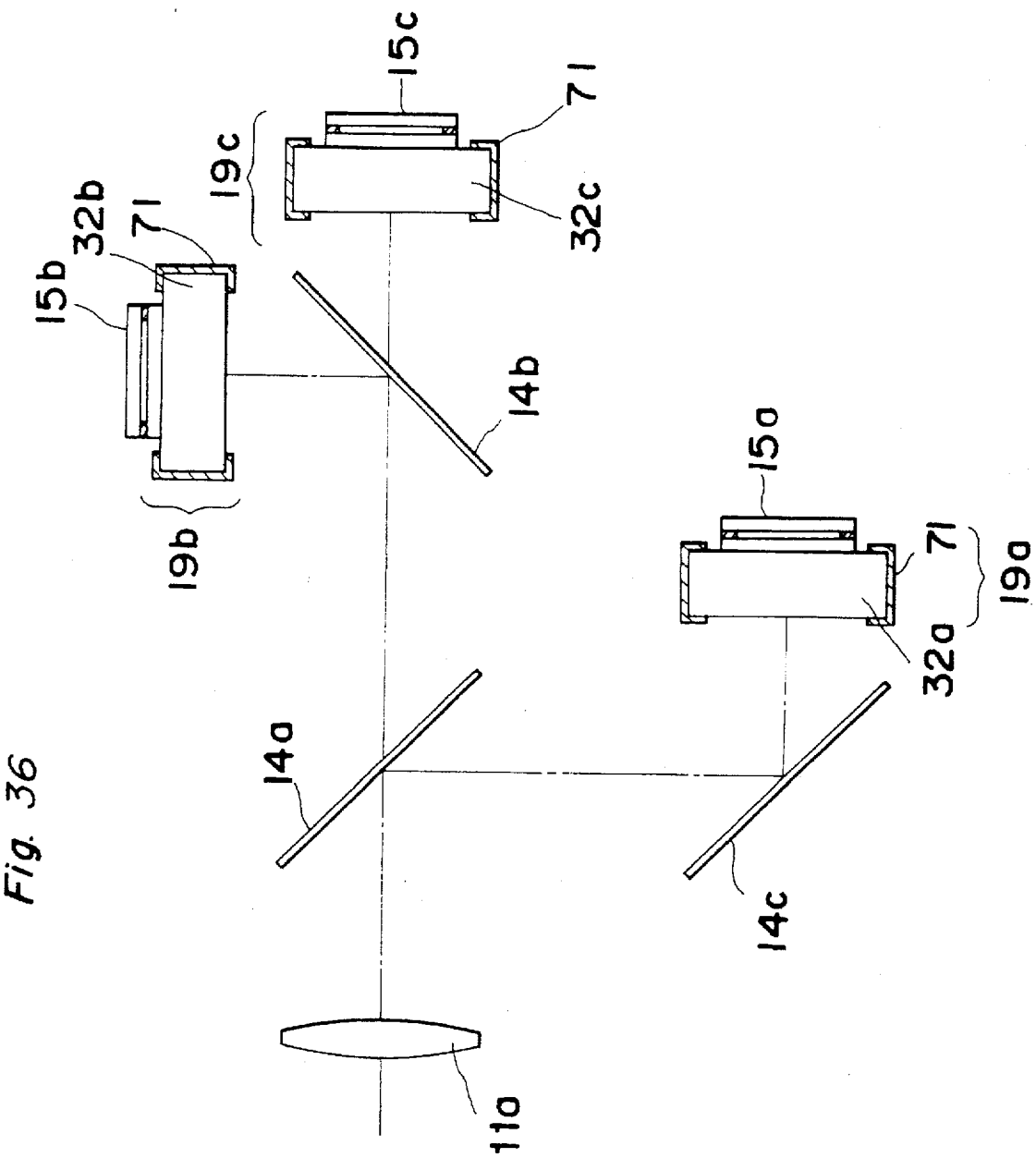
FIG. 36 is a schematic partial sectional view of a projection display system.
Figure 37:
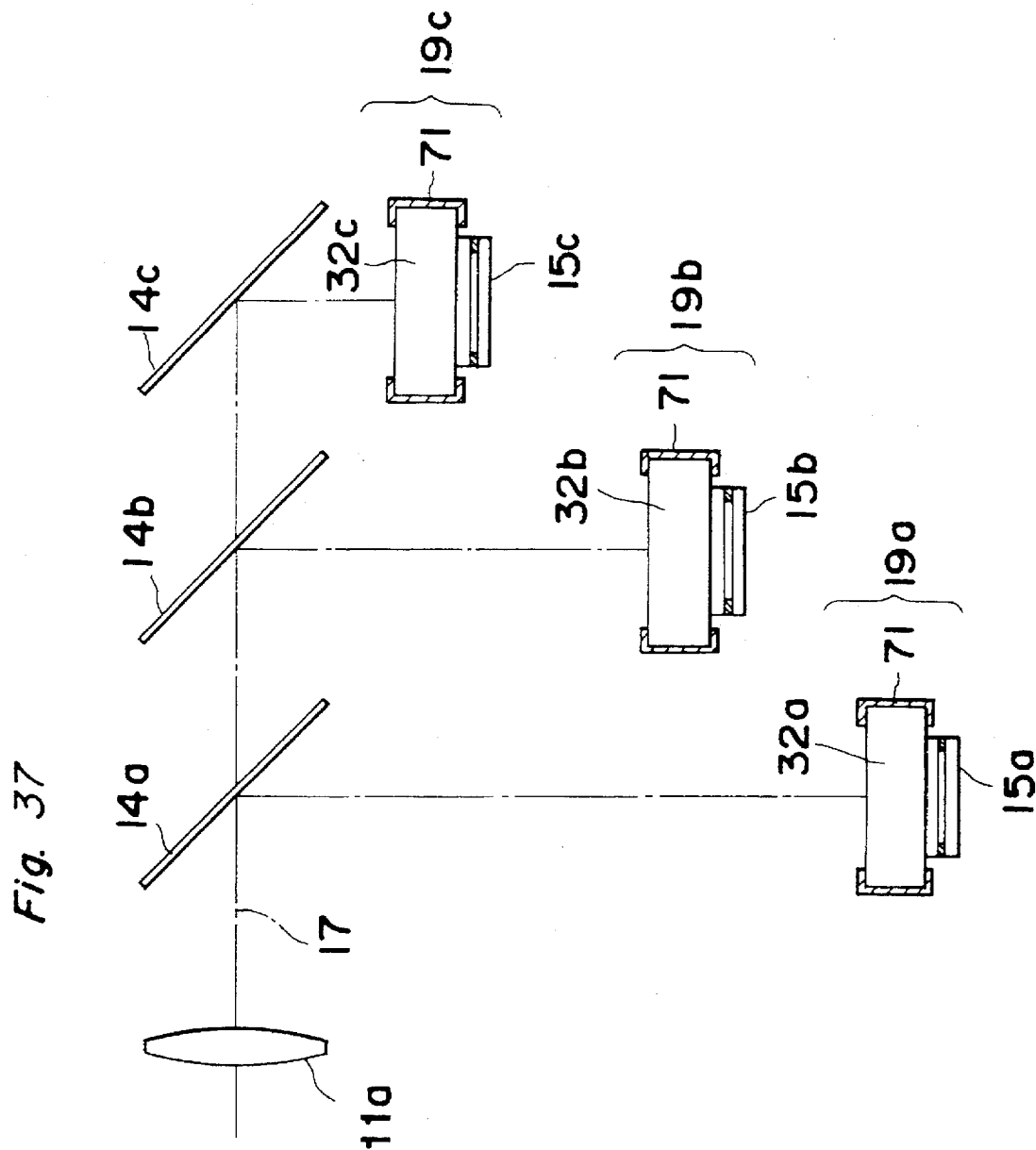
FIG. 37 is a schematic partial sectional view of a projection display system.

The arrangement of dichroic mirrors 14a, 14b and 14c can be modified in several ways, for example as shown in FIGS. 36 and 37. It is to be noted that FIGS. 36–39 describes the arrangement of dichroic mirrors, without taking into account the reflection of transmission bandwidth. FIG. 36 shows an arrangement wherein the positions of a dichroic mirror 14b and a light valve 19b are different from those shown in FIG. 35. FIG. 37 shows an arrangement wherein three colors are separated successively by three dichroic mirrors 14a, 14b and 14c.

Figure 38:
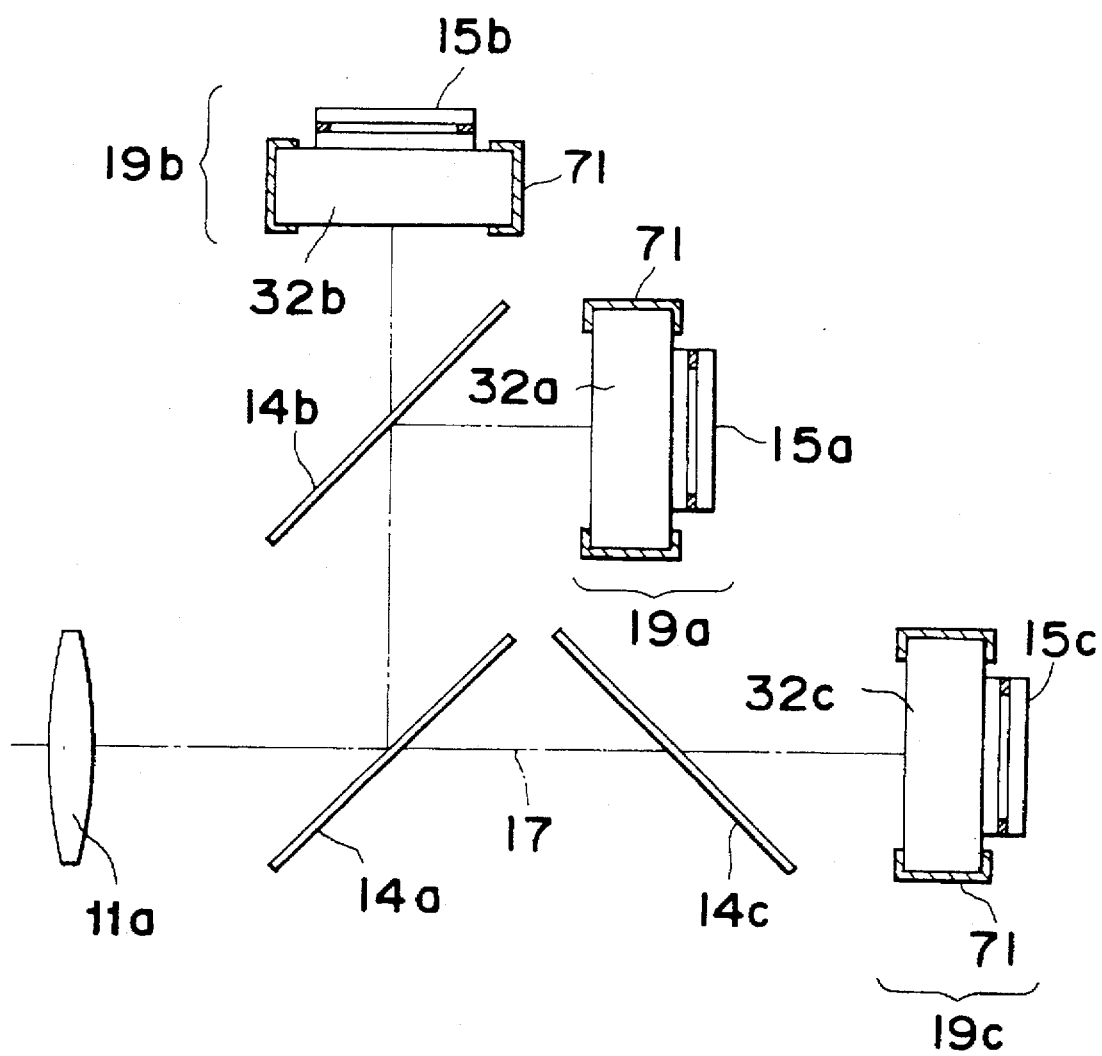
FIG. 38 is a schematic partial sectional view of a projection display system.

In FIG. 38, a dichroic mirror 14c is arranged at the incident plane of the light valve 19c in order to restrict the bandwidth of light. The dichroic mirror 14c may be a dichroic filter, but it has not be arranged perpendicular to the optical axis 17 because light reflected at the interface of the dichroic filter is projected onto the screen to deteriorate the image quality.

Figure 39:
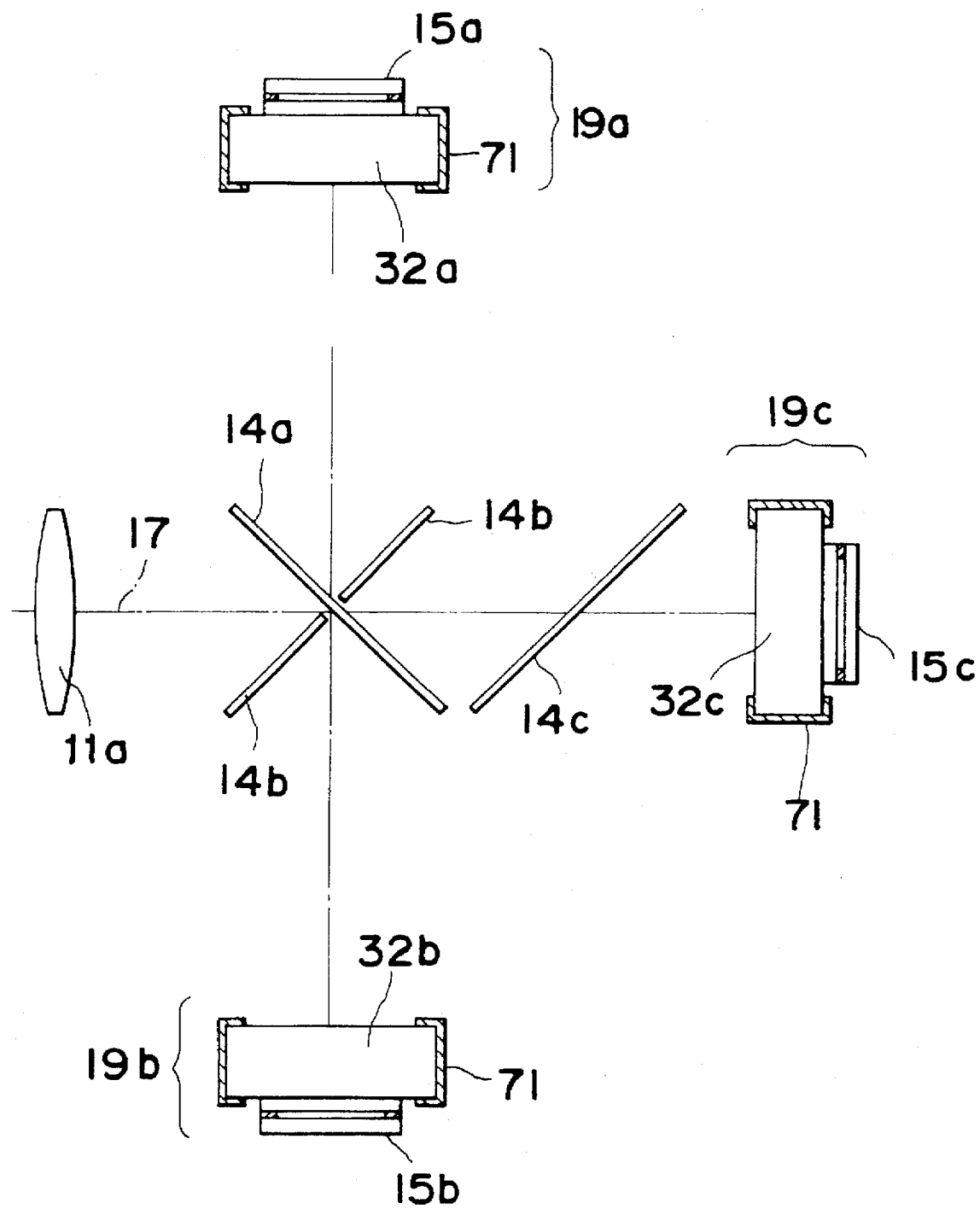
FIG. 39 is a schematic partial sectional view of a projection display system.

FIG. 39 illustrates an example wherein two dichroic mirrors 14a and 14b are arranged as a cross. For example, the dichroic mirror 14b reflects blue and the dichroic mirror 14a reflects red. The dichroic mirror 14c transmits green. This arrangement can make the optical system more compact as compared with that shown in FIG. 36.

Figure 40:
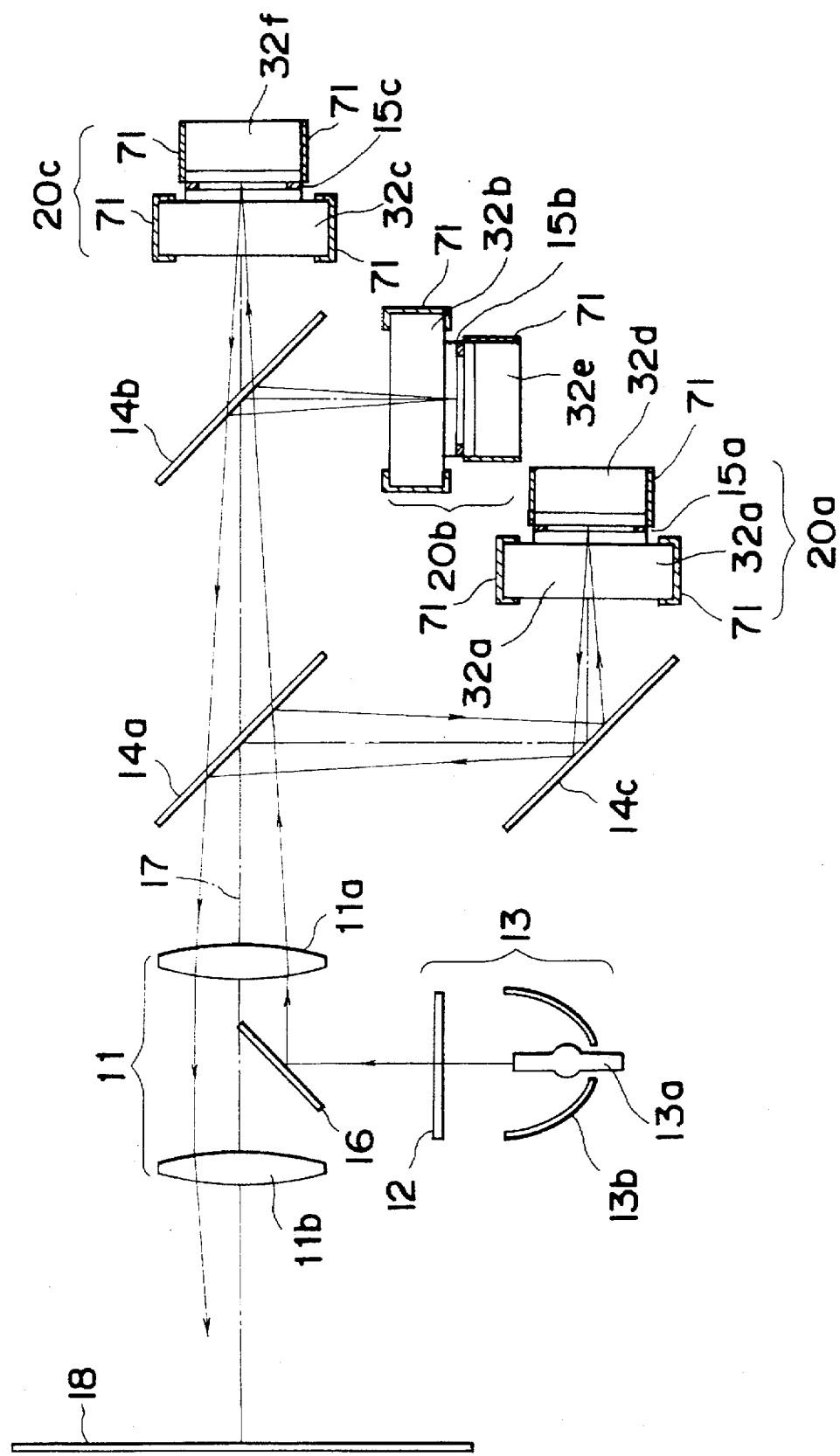
FIG. 40 is a schematic sectional view of another projection display system.

FIG. 40 shows a second example of a projection display system which is the same as shown in FIG. 35 except for the light valve apparatuses 20a, 20b and 20c. The light valve apparatuses 20a, 20b, 20c are the light valves as shown in FIG. 32 wherein a transparent plate 32b is coupled optically to the rear side of the array substrate 131. By using the light valve apparatuses 20a, 20b and 20c, the photoconductor phenomenon due to the light entering between the reflection electrodes can be decreased.

In order to prevent the reflection at the interface between the array substrate and air, light valve apparatuses shown in FIG. 34 may also be used in a projection display system.

A liquid crystal including dichroic or multi-chroic pigments or dye may be used in a light valve. When an electric field is applied to the liquid crystal layer to align liquid crystal molecules, the droplets 132 are not colored and the incident light is reflected by the reflection electrodes 135 and goes out without a color. If the liquid crystal layer 33 is in the scattering state, the droplets 132 are colored by the dye, and the incident light is scattered and is absorbed by the dye. Thus, the display contrast and the white balance are greatly improved.

If three light valve apparatus for three colors are used in a display system as shown in FIG. 35, it is preferable that especially the light valve apparatus for red has a size of the droplets and thickness of the liquid crystal/resin composite layer which are larger than those of the other light valve apparatus because the scattering characteristic decreases with increasing wavelength. For example, if the average size of the droplets in the light valve apparatus for green is 1.7 µm, that for red is controlled to be about 2.0 µm. The size can be controlled by the ultraviolet rays for polymerization or by the materials. In the polymer network liquid crystal, the average pore size of the polymer network is controlled.

In the above-mentioned embodiments, a liquid crystal/resin composite is used for the liquid crystal layer. Further, other liquid crystals which can form an optical image according to the change of scattering state can be used as a liquid crystal panel for a light valve. For example, a thermal write type liquid crystal panel using a phase change liquid crystal, a ferroelectric liquid crystal panel or a PLZT panel may be used.

Further, the present invention can also be applied to an optically addressed display panel wherein a liquid crystal/resin composite is interposed between a dielectric mirror and a counterelectrode. This display panel is a reflection type panel, and an electric field is applied between two electrodes to change the scattering state, like the above-mentioned light valves. An image of light source is displayed due to the change of scattering state. An alignment film is also not needed in contrast to a twisted nematic liquid crystal. In the optically addressed display, the electrode at the incident plane may have a multi-layer structure for anti-reflection so as to improve the display contrast. Further, a transparent plate can be connected optically with the substrate. The optically addressed display panel may also be used as a light valve apparatus in a projection display system.

Because a polymer liquid/resin composite is used, no polarization plates are needed in contrast to a twisted nematic liquid crystal panel, and thus, a display of high brightness can be realized. That is, the light can be exploited well. Therefore, the heating due to an incident light can be reduced and the deterioration of the light valve due to the heating can be prevented. This is especially advantageous when the intensity of light is as high as several tens of thousands of Lux as in a projection display system. Furthermore, because a thick counterelectrode substrate or a counterelectrode coupled with a transparent plate is used, the secondary scattering can be prevented and an image of high contrast can be projected on a screen of 200 inches or more.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A light valve apparatus comprising:
   a first transparent substrate on which a counter electrode is formed;
   a second substrate having electrodes formed on the surface of the second substrate;
   a third transparent substrate, wherein said first and third transparent substrates comprise a non-image forming portion that is adapted to be substantially free from light for forming an image being transmitted therethrough;
   a first optical-coupling layer coupling the first and third substrates optically;
   an optical modulation layer interposed between the first and second substrates, said optical modulation layer forming an image according to a change in optical scattering state;
   a first light-absorbing member formed on a side of at least one of the first and third substrates, wherein said first light-absorbing member is located at said non-image forming portion; and
   a first anti-reflection member formed on a surface of the first transparent substrate facing said optical modulation layer.

2. The light valve apparatus according to claim 1, wherein at least one of the refractive indices of said first and second substrates differs from that of the light modulation layer under no electric field within 0.15.

3. The light valve apparatus according to claim 1, wherein a following relationship holds:

$$t \geq \frac{d}{4} \sqrt{n^2 - 1}$$

where "t" denotes the total thickness of said first and third substrate between the optical modulation layer and air, "n" denotes the refractive index of said third substrate and "d" denotes a diagonal length of an image display area of said optical modulation layer to be modulated to display an image.

4. The light valve apparatus according to claim 1, further comprising:
   a fourth substrate;
   a second optical-coupling layer connecting said second and fourth substrates; and a second light-absorbing member formed on a side of one of said third and fourth substrates.

5. The light valve apparatus according to claim 1, further comprising a second light-absorbing member formed on a surface of said second substrate opposite to the surface on which the electrodes are formed.

6. The light valve apparatus according to claim 1, further comprising a second anti-reflection member formed on the surface of said first transparent electrode, and wherein said counter electrode is interposed between said first and second anti-reflection members.

7. The light valve apparatus according to claim 6, said anti-reflection film comprising: a first dielectric film of optical thickness of about $\lambda/4$, a transparent electrically conducting film of optical thickness of about $\lambda/2$ applied to the first dielectric film and a second dielectric film of optical thickness of about $\lambda/4$ applied to the transparent electrically conducting film; wherein $\lambda$ denotes wavelength of incident light, the refractive index $n_1$ of the two dielectric films is between 1.6 and 1.8.

8. The light valve apparatus according to claim 7, wherein said optical modulation layer comprises a liquid crystal/resin composite including a liquid crystal component and a resin component.

9. The light valve apparatus according to claim 8, wherein the thickness of the optical modulation layer is between 5 and 25 μm.

10. The light valve apparatus according to claim 8, wherein said liquid crystal/resin composite is a polymer dispersion liquid crystal with droplets of an average size between 0.5 and 3 μm or a polymer network liquid crystal with pores of an average pore size between 0.5 and 3 μm.

11. The light valve apparatus according to claim 7, wherein the first and second dielectric thin films are made of one of aluminum oxide ($Al_2O_3$), yttrium oxide ($Y_2O_3$), silicon oxide (SiO), tungsten oxide ($WO_3$), cerium fluoride ($CeF_3$), magnesium oxide (MgO), and lead fluoride ($PbF_2$).

12. The light valve apparatus according to claim 7 wherein the refractive indices $n_1$ of the dielectric films and $n_2$ of the electrically conducting film satisfies a relationship $n_2 > n_1 > n_3$ wherein $n_3$ denotes the refractive index of the optical modulation layer when an electric field is not applied.

13. The light valve apparatus according to claim 6, said anti-reflection film comprising: a dielectric film of optical thickness of about $\lambda/4$ and a transparent electrically conducting film of optical thickness of about $\lambda/2$ applied to the dielectric film; wherein $\lambda$ denotes wavelength of incident light, the refractive index $n_1$ of the dielectric film is between 1.5 and 1.7.

14. The light valve apparatus according to claim 13, wherein the dielectric thin film is made of one of aluminum oxide ($Al_2O_3$), silicon oxide (SiO), tungsten oxide ($WO_3$), cerium fluoride ($CeF_3$), lanthanum fluoride ($LaF_3$), and neodium fluoride ($NdF_3$).

15. The light valve apparatus according to claim 6, wherein said anti-reflection film comprises a transparent electrically conducting film of optical thickness of $\lambda/2$ wherein $\lambda$ denotes the wavelength of light.

16. The light valve apparatus according to claim 15, wherein the refractive index of said transparent electrically conducting material is 1.9 or less.

17. The light valve apparatus according to claim 6, said anti-reflection film comprising:

a first transparent dielectric film of optical thickness of about $\lambda/4$, a transparent electrically conducting film of optical thickness of about $\lambda/2$ applied to the first dielectric film and a second transparent dielectric film of optical thickness of about $\lambda/4$ applied to the transparent electrically conducting film, wherein $\lambda$ denotes wavelength of incident light;

one of said first and second transparent dielectric films comprising a multi-layer film, which multi-layer film comprising first films of low refractive index between 1.3 and 1.7 and second films of high refractive index between 1.7 and 2.3, the first films and the second films being layered alternately, the other of said first and second transparent dielectric films comprising a single layer of refractive index between 1.6 and 1.8;

said first films being made of one of magnesium fluoride ($MgF_2$), silicon oxide ($SiO_2$), aluminum oxide ($Al_2O_3$), cerium fluoride ($CeF_3$) and silicon oxide (SiO);

said second films being made of one of yttrium oxide ($Y_2O_3$), zirconium oxide ($ZrO_2$), hafnium oxide ($HfO_2$), tantalum oxide ($Ta_2O_5$), cerium oxide ($CeO_2$), titanium oxide ($TiO_2$) and zinc sulfide (ZnS);

said the other of said first and second transparent dielectric films being made of one of aluminum oxide ($Al_2O_3$), silicon oxide (SiO), yttrium oxide ($Y_2O_3$), magnesium oxide (MgO), lead fluoride ($PbF_2$) and tungsten oxide ($WO_3$).

18. The light valve apparatus according to claim 6, said anti-reflection film comprising:

a first transparent dielectric film of optical thickness of about $\lambda/4$, a transparent electrically conducting film of optical thickness of about $\lambda/2$ applied to the first dielectric film and a second transparent dielectric film of optical thickness of about $\lambda/4$ applied to the transparent electrically conducting film, wherein $\lambda$ denotes wavelength of incident light;

said first and second transparent dielectric films comprising a multi-layer film, which multi-layer film comprising first films of low refractive index between 1.3 and 1.7 and second films of high refractive index between 1.7 and 2.3, the first films and the second films being layered alternately, the other of said first and second transparent dielectric films comprising a single layer of refractive index between 1.6 and 1.8;

said first films being made of one of magnesium fluoride ($MgF_2$), silicon oxide ($SiO_2$), aluminum oxide ($Al_2O_3$), cerium fluoride ($CeF_3$) and silicon oxide (SiO);

said second films being made of one of yttrium oxide ($Y_2O_3$), zirconium oxide ($ZrO_2$), hafnium oxide ($HfO_2$), tantalum oxide ($Ta_2O_5$), cerium oxide ($CeO_2$), titanium oxide ($TiO_2$) and zinc sulfide (ZnS).

19. The light Valve apparatus according to claim 6, further comprising another anti-reflection film formed on said third substrate on a surface in contact with air, the another anti-reflection film comprising a multi-layer film made of transparent dielectric materials.

20. The light valve apparatus according to claim 1, wherein said electrodes comprise a plurality of reflection electrodes arranged as a matrix.

21. The light valve apparatus according to claim 1, wherein said third substrate has a curved plane at an interface with air.

22. The light valve apparatus according to claim 1, further comprising a film formed between two adjacent reflection electrodes of said reflection electrodes, the film being made of a material of a dielectric index smaller than that of said optical modulation layer.

23. A projection display system comprising:

a light valve, said light valve comprising: a first transparent substrate on which a counter electrode is formed; a second transparent substrate having electrodes formed on the surface of the second transparent substrate; a third transparent substrate, wherein said first and third transparent substrates comprise a non-image forming portion adapted to be substantially free from light for forming an image being transmitted therethrough; a first optical-coupling layer connecting the first and third substrates optically; an optical modulation layer interposed between the first and second substrates, said optical modulation layer forming an image according to an optical modulation layer forming an image according to a change in optical scattering state; and a first light-absorbing member formed on a side of at least one of the first and third substrates, wherein said first light-absorbing member is located at said non-image forming portion; and an anti-reflection member formed on a surface of the first transparent substrate at a side opposing said optical modulation layer;

a light source for generating a light beam;

an optical system for guiding the light beam generated by the light source to the light valve;

a projection device for projecting the light modulated by the display panel.

24. The projection display system according to claim 23, wherein a following relationship holds:

$$t \geq \frac{d}{4}\sqrt{n^2-1}$$

where "t" denotes the total thickness of the third substrate between said optical modulation layer and a surface of said third transparent substrate in contact with air, "n" denotes the refractive index of said third substrate and "d" denotes a diagonal length of an image display area of the optical modulation layer.

25. A projection display system according to claim 23, wherein said light valve further comprises:

a fourth transparent substrate;

a second optical-coupling layer connecting said second and fourth substrates; and a light-absorbing member formed on a side of one of said third and fourth substrates.

26. The light valve apparatus according to claim 23, said first transparent substrate comprising an anti-reflection member formed on a surface thereof.

27. The projection display system according to claim 26, further comprising another anti-reflection film formed on said third substrate in an image display area on a surface in contact with air, said another anti-reflection film comprising a multi-layer film made of transparent dielectric materials.

28. The projection display system according to claim 26, wherein said anti-reflection film comprises: a first dielectric film of optical thickness of about λ/4 of refractive index between 1.6 and 1.8, a transparent electrically conducting film of optical thickness of about λ/2, the transparent electrically conducting film being layered on the first anti-reflection member, and a second dielectric film of optical thickness of about λ/4 of refractive index between 1.6 and 1.8, the second dielectric film being layered on the transparent electrically conducting film, wherein λ denotes a wavelength of incident light, and wherein the refractive index $n_1$ of the first and second dielectric films and the refractive index $n_2$ of the transparent electrically conducting film satisfy a relationship $n_2 > n_1 > n_3$ wherein $n_3$ denotes the refractive index of the optical modulation layer when an electric field is not applied.

29. The projection display system according to claim 23, further comprising a second light-absorbing film formed on said second substrate on a surface different from the surface on which said electrodes are formed.

30. The projection display system according to claim 23, wherein said optical modulation member comprises a liquid crystal/resin composite including a liquid crystal component and a resin component.

31. The projection display system according to claim 23, wherein said electrodes comprises a plurality of reflection electrodes arranged as a matrix and wherein switching elements for applying signals to the reflection electrodes are formed below the reflection electrodes.

32. The projection display according to claim 23, wherein said anti-reflection film comprises a transparent electrode, and the optical thickness of said transparent electrode is substantially equal to one half the wavelength of light modulated by said optical modulation layer.

33. The projection display system according claim 23, wherein said third substrate has a flat plane and a curved plane and the flat plane thereof is connected optically with said first substrate with the optical coupling layer.

34. The projection display system according to claim 23, wherein said optical coupling layer is made of a photosetting adhesive, a thermosetting adhesive or a silicone resin.

35. The projection display system according to claim 23, wherein said projection device comprises a plurality of lenses and a mirror arranged between the lenses, wherein the light generated by said optical source is converged by the mirror to lead towards said light valve.

36. A light valve apparatus comprising:

a first transparent substrate on which a transparent counter electrode is formed;

a second substrate comprising a plurality of pixel electrodes arranged as a matrix;

an optical modulation layer interposed between the first and second substrates, said optical modulation layer forming an image according to a change in optical scattering state; and a film formed between a first pixel electrode in the pixel electrodes and a second pixel electrode therein adjacent to the first pixel electrode on said second substrate, said film being made of a material of a relative dielectric constant smaller than that of said optical modulation layer.

37. The light valve apparatus according to claim 36, further comprising another dielectric film formed on said transparent electrode for reflecting light.

38. A light valve apparatus comprising:

a first transparent substrate on which a transparent counter electrode is formed;

a second substrate comprising a plurality of pixel electrodes arranged as a matrix;

an optical modulation layer interposed between the first and second substrates, said optical modulation layer forming an image according to a change in optical scattering state;

a third transparent substrate, wherein said first and third transparent substrates comprise a non-image forming portion adapted to be substantially free from light for forming an image being transmitted therethrough;

an optical coupling layer coupling said first and third substrates optically;

a first light-absorbing member formed on a side of at least one of the first and third substrates, wherein said first light-absorbing member is located at said non-image forming portion; and a film made formed between first pixel electrode in the pixel electrodes and a second pixel electrode therein adjacent to the first pixel electrode on said second substrate, said film being made of a dielectric material of relative dielectric constant smaller than that of said optical modulation layer;

wherein said first transparent substrate comprises an anti-reflection member formed on a surface of the first transparent substrate at a side opposing said optical modulation layer.

39. A projection display system comprising:

a light valve apparatus comprising: a first transparent substrate on which a transparent electrode is formed; a second substrate comprising a plurality of pixel electrodes arranged as a matrix; an optical modulation layer interposed between the first and second substrates, said optical modulation layer forming an image according to a change in optical scattering state; and a film formed between a first pixel electrode in the pixel electrodes and a second pixel electrode therein adjacent to the first electrode, said film being made of a material of dielectric index smaller than that of said optical modulation layer;

a light source for generating a light beam;

an optical system for guiding the light beam generated by the light source to the light valve apparatus; and a projection device for projecting the light modulated by the light valve apparatus.

40. The light valve apparatus according to claim 39, wherein a following relation holds:

$$t \geq \frac{d}{4} \sqrt{n^2 - 1}$$

where "t" denotes a thickness of said first substrate, "n" denotes the refractive index of said first substrata and "d" denotes a diagonal length of an image display area of said optical modulation layer.

41. A projection display system comprising:

a light valve apparatus comprising: a first transparent substrate; a second substrate comprising a plurality of pixel electrodes arranged as a matrix; an optical modulation layer interposed between the first and second substrates, said optical modulation layer forming an image according to a change in optical scattering state; a third transparent substrate, wherein said first and third transparent substrates comprise a non-image forming portion adapted to be substantially free from light for forming an image being transmitted therethrough; an optical coupling layer coupling said first and third substrates optically; a first light-absorbing member formed on a side of at least one of the first and third substrates, wherein said first light-absorbing member is located at said non-image forming portion; and a film formed between a first pixel electrode in the pixel electrodes and a second pixel electrode therein adjacent to the first pixel electrode on said second substrate, said film being made of a material of relative dielectric constant smaller than that of said optical modulation layer;

a light source for generating a light beam;

an optical system for guiding the light beam generated by the light source to the light valve apparatus; and a projection device for projecting the light modulated by the display panel.

* * * * *